(12) United States Patent
Dafesh et al.

(10) Patent No.: US 11,588,516 B2
(45) Date of Patent: *Feb. 21, 2023

(54) CIRCUITS AND METHODS FOR REDUCING AN INTERFERENCE SIGNAL THAT SPECTRALLY OVERLAPS A DESIRED SIGNAL

(71) Applicant: The Aerospace Corporation, El Segundo, CA (US)

(72) Inventors: Philip A. Dafesh, Manhattan Beach, CA (US); Phillip Brian Hess, Venice, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/398,992

(22) Filed: Aug. 10, 2021

(65) Prior Publication Data

US 2021/0376878 A1 Dec. 2, 2021

Related U.S. Application Data

(63) Continuation of application No. 16/708,146, filed on Dec. 9, 2019, now Pat. No. 11,133,838, which is a
(Continued)

(51) Int. Cl.
*H04B 7/02* (2018.01)
*H04B 1/7107* (2011.01)
(Continued)

(52) U.S. Cl.
CPC ......... *H04B 1/7107* (2013.01); *H04B 1/1027* (2013.01); *H04B 1/1036* (2013.01); *H04B 1/719* (2013.01)

(58) Field of Classification Search
CPC ........ H04B 1/707; H04B 1/69; H04B 1/7075; H04B 1/7117; H04B 1/7115; H04B 2201/70701; H04B 2201/70707; H04B 1/712; H04B 1/7107; H04B 1/1027; H04B 1/123; H04B 1/1036; H04B 1/30;
(Continued)

(56) References Cited

U.S. PATENT DOCUMENTS

| | | | | |
|---|---|---|---|---|
| 2006/0071841 | A1* | 4/2006 | Yang | H03M 1/185 341/155 |
| 2007/0201548 | A1* | 8/2007 | Badri-Hoeher | H04L 25/03261 375/233 |
| 2014/0177682 | A1* | 6/2014 | Yu | H04B 1/7097 375/148 |

* cited by examiner

*Primary Examiner* — Zewdu A Kassa
(74) *Attorney, Agent, or Firm* — Snell & Wilmer, L.L.P.; Jaime D. Choi

(57) ABSTRACT

Under one aspect, a method is provided for processing a received signal, the received signal including a desired signal and an interference signal that spectrally overlaps the desired signal. The method can include obtaining an amplitude of the received signal. The method also can include obtaining an average amplitude of the received signal based on at least one prior amplitude of the received signal. The method also can include subtracting the amplitude from the average amplitude to obtain an amplitude residual. The method also can include, based upon an absolute value of the amplitude residual being less than or equal to a first threshold, inputting the received signal into an interference suppression algorithm so as to generate a first output including the desired signal with reduced contribution from the interference signal.

28 Claims, 33 Drawing Sheets

Related U.S. Application Data continuation of application No. 15/796,453, filed on Oct. 27, 2017, now Pat. No. 10,574,288, which is a continuation of application No. 15/461,252, filed on Mar. 16, 2017, now Pat. No. 9,923,598, which is a continuation of application No. 14/918,315, filed on Oct. 20, 2015, now Pat. No. 9,654,158.

(51) Int. Cl.
*H04B 1/10* (2006.01)
*H04B 1/719* (2011.01)

(58) Field of Classification Search
CPC .. H04B 1/28; H04J 13/10; H04J 13/00; H04L 27/2647; H04L 1/20; H04N 5/4401
USPC .................. 375/148, 346, 316, 219, 295
See application file for complete search history.

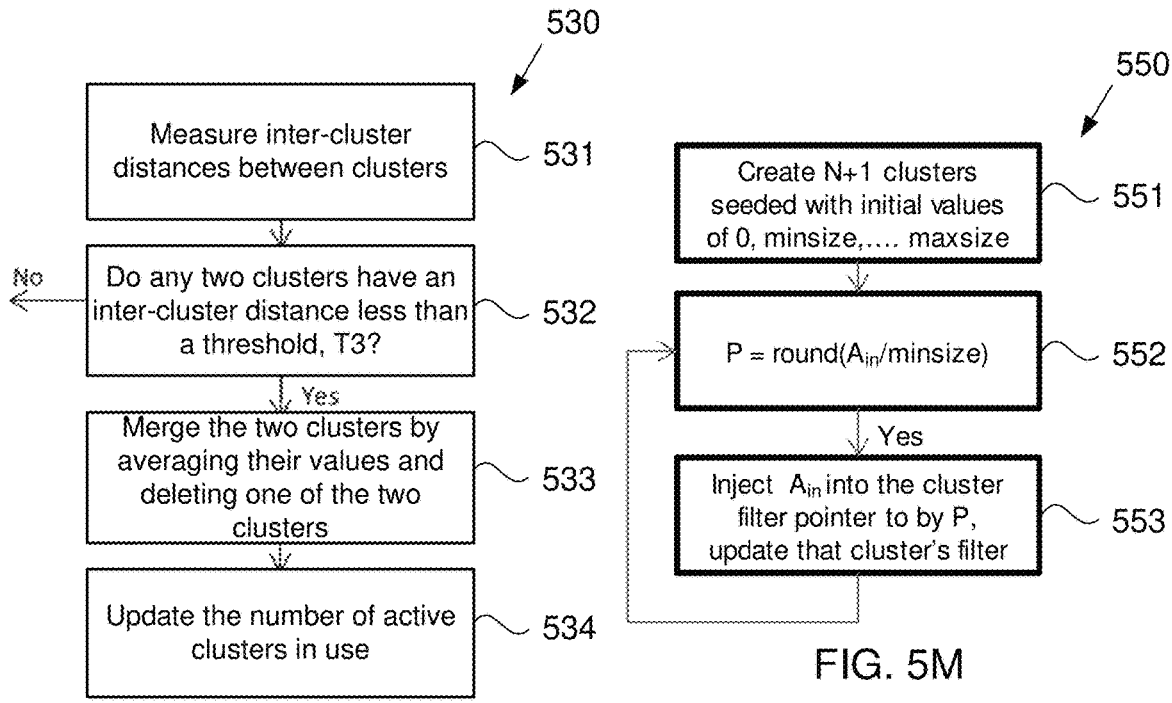
FIG. 5K
FIG. 5M
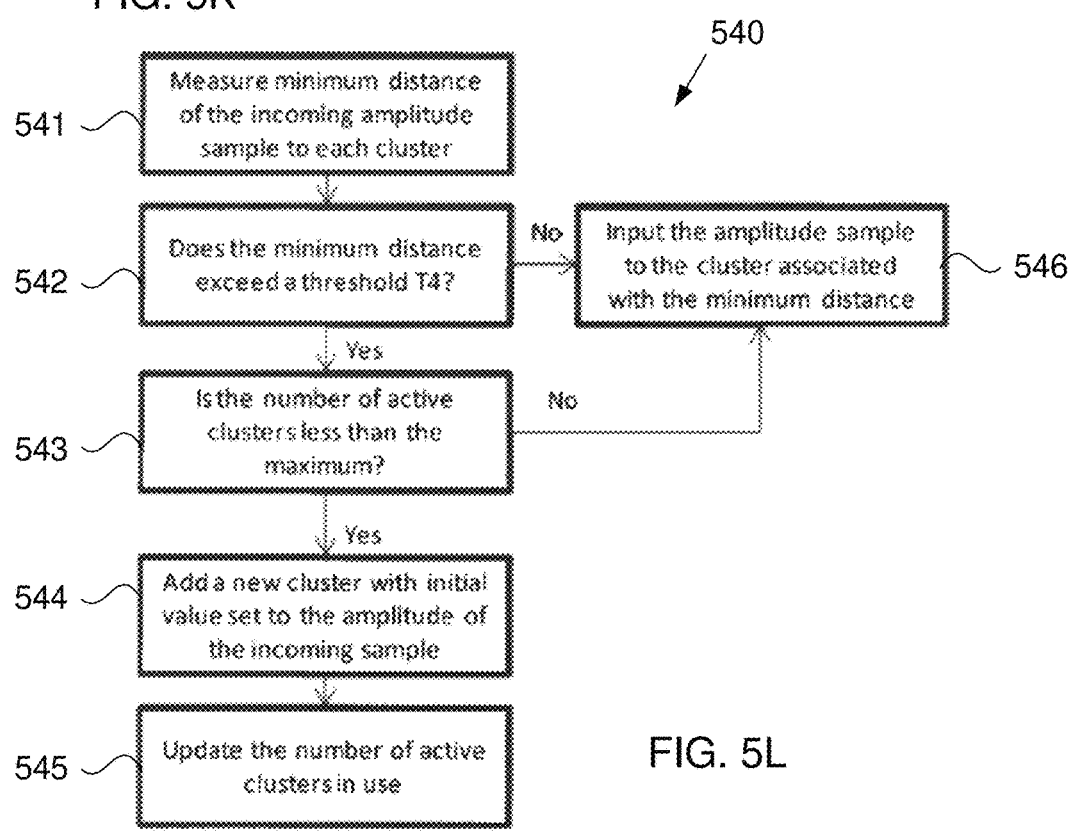
FIG. 5L

CIRCUITS AND METHODS FOR REDUCING AN INTERFERENCE SIGNAL THAT SPECTRALLY OVERLAPS A DESIRED SIGNAL

CROSS-REFERENCE TO RELATED APPLICATIONS

This application is a continuation under 35 U.S.C. § 120 of U.S. patent application Ser. No. 16/708,146, filed Dec. 9, 2019 and entitled "CIRCUITS AND METHODS FOR REDUCING INTERFERENCE THAT SPECTRALLY OVERLAPS A DESIRED SIGNAL," which is a continuation of U.S. patent application Ser. No. 15/796,453, filed Oct. 27, 2017 and entitled "CIRCUITS AND METHODS FOR REDUCING INTERFERENCE THAT SPECTRALLY OVERLAPS A DESIRED SIGNAL," now U.S. Pat. No. 10,574,288, which is a continuation of U.S. patent application Ser. No. 15/461,252, filed Mar. 16, 2017 and entitled "CIRCUITS AND METHODS FOR REDUCING INTERFERENCE THAT SPECTRALLY OVERLAPS A DESIRED SIGNAL," now U.S. Pat. No. 9,923,598, which is a continuation of U.S. patent application Ser. No. 14/918,315, filed Oct. 20, 2015 and entitled "CIRCUITS AND METHODS FOR REDUCING INTERFERENCE THAT SPECTRALLY OVERLAPS A DESIRED SIGNAL," now U.S. Pat. No. 9,654,158, the entire contents of each of which are incorporated by reference herein.

FIELD OF THE INVENTION

This application relates to reducing an interference signal that spectrally overlaps a desired signal.

BACKGROUND OF THE INVENTION

Receivers used in communication, navigation, radar, and other sensor applications can suffer from intentional or unintentional interference. In such systems, it can be useful to use signal processing methods to reduce the effects of an interference signal from those of a desired signal.

In some systems, properties of the interference signal are not known a priori. In such cases, it can be desirable to use a blind technique, in which properties of the desired signal also may not necessarily be a priori known. A number of previously known blind single antenna interference suppression methods have been developed in the time domain and frequency-domain of a signal described in the complex in-phase (I) and quadrature (Q) domain. Some interference suppression techniques excise the interference in a domain in which the interference signal can be separated from the desired signal, and selectively excised. Except for time domain pulse blanking, such methods can assume a particular frequency-domain or time/frequency transform, or utilize adaptive notch filtering in which the interference can be removed by use of a notch filter or frequency domain excision filter in the I/Q domain of the signal. While such approaches potentially can work well for narrowband interference, such approaches can fail when the interference signal spectrally overlaps the desired signal, e.g., is spectrally matched to the desired signal or has a bandwidth that overlaps some or all of the desired signal. For example, previously known notch filtering or frequency domain excision approaches can rely on the interference signal spectrally overlapping only a portion of the desired signal in the I/Q domain. If the interference signal is spectrally matched to the desired signal, then such narrowband excision techniques will remove the desired signal as well as the interference.

Some approaches for reducing interference are non-blind, e.g., are based upon a priori knowledge of the desired signal or of the interference signal. Some of such techniques are sometimes referred to as multi-user detection (MUD) techniques. In such approaches, a copy of the interference can be reconstructed in the receiver, including the precise amplitude, phase, and timing of the interference. The reconstructed interference then is subtracted from the incoming signal. Such approaches can require some time to track any interference that changes form or rapidly varies. Such variation can make it difficult or impossible to reconstruct the interference in a receiver. Moreover, multiple interferers requires removal of each interferer in the presence of the others making it very difficult to reconstruct precise phase, timing and amplitude of each interferer, One such technique to remove the effects of multiple interferers is successive interference cancellation and will fail when the interferers get too close in amplitude.

Although adaptive antenna-array can be used to null out a matched spectral or overlapping interference signal in the spatial domain, where the signal and interference are separated from one another along different spatial directions, spatial domain nulling and beam-forming approaches can be costly and may not support a vast array of single element receiver implementations, such as handheld receivers.

Numerous approaches have been devised to mitigate strong constant envelope co-channel interference received using a single receive antenna. Maximum likelihood sequence estimation (MLSE) in the presence of constant envelope interference is one known technique with a reasonably simple hardware implementation. See, for example, Hui et al., "Maximum Likelihood Sequence Estimation in the Presence of Constant Envelope Interference," IEEE Vehicular Technology Conference 2: 1060-1064 (2003), the entire contents of which are incorporated by reference herein. However, the MLSE algorithm or hardware must be customized for the specific desired signal.

Another approach uses an adaptive filter to cancel interference caused by a constant envelope signal. This adaptive approach requires time to converge, and even then a narrow band signal buried beneath a wide-band strong interference signal might not be recovered because the steady state transfer function is frequency selective. See, for example, Ferrara, "A Method for Cancelling Interference from a Constant Envelope Signal," IEEE Transactions on Acoustics, Speech, and Signal Processing 33(1): 316-319 (1985), the entire contents of which are incorporated by reference herein.

A different approach maps a complex received signal into polar coordinates. Then a fast Fourier transform (FFT) is computed on a block of magnitude samples. The spectrum of the magnitude samples is then excised. An inverse FFT (iFFT) then transforms the excised spectrum into the time domain. Such an approach does not require convergence time or any parameters of the weak signal, and can cancel many interference signals automatically. See, for example, Henttu, "A New Interference Suppression Algorithm Against Broadband Constant Envelope Interference," IEEE Milcom 2: 742-746 (2000), the entire contents of which are incorporated by reference herein. However, such an approach can be computationally complex, and also relies upon the interference having an approximately constant envelope. However, the envelope of some interference can vary by more than 3 dB.

A technique that may be used to mitigate multiple interferers, for example, is successive interference cancellation. This technique, however, requires knowledge of each interferer and that the difference in power of each interferer is sufficient that the strongest interferer can be successively estimated, demodulated and subtracted from the remaining interferers, wherein the process is repeated until all interferers are removed. Without prior knowledge of the interferers or if the interferers are too close in power, successive interference cancellation will fail.

Joint demodulators can sometimes mitigate multiple interferers by demodulating both signals together in a statistically optimum manner. Such techniques can be computationally complex and do not work well with multiple interferers due to rapidly increasing complexity as the number of interferers increases.

In either case, a demodulator for one desired signal type can then require demodulators for many different undesired signal types. As new signals emerge, algorithms must be updated. Unknown signals, such as proprietary waveforms, can render successive interference cancellation or joint demodulators impractical.

Thus, what is needed are improved systems and methods for reducing interference.

SUMMARY OF THE INVENTION

Embodiments of the present invention provide circuits and methods for reducing an interference signal that spectrally overlaps a desired signal.

Under one aspect, a method is provided for processing a received signal, the received signal including a desired signal and an interference signal that spectrally overlaps the desired signal. The method can include obtaining an amplitude of the received signal. The method also can include obtaining an average amplitude of the received signal based on at least one prior amplitude of the received signal. The method also can include subtracting the amplitude from the average amplitude to obtain an amplitude residual. The method also can include, based upon an absolute value of the amplitude residual being less than or equal to a first threshold, inputting the received signal into an interference suppression algorithm so as to generate a first output including the desired signal with reduced contribution from the interference signal.

Some embodiments further include bypassing the interference suppression algorithm based upon the absolute value of the amplitude residual being greater than the first threshold. Some embodiments further include, based upon bypassing the interference suppression algorithm, generating a second output equal to a predetermined value.

Some embodiments further include bypassing the interference suppression algorithm based upon the absolute value of the amplitude being less than a second threshold.

Some embodiments further include bypassing the interference suppression algorithm based upon a power of the received signal being less than a second threshold.

Some embodiments further include bypassing the interference suppression algorithm based upon an interference to noise ratio of the received signal being less than a second threshold. Some embodiments further include, based upon bypassing the interference suppression algorithm, generating a second output equal to the received signal.

In some embodiments, the first threshold is fixed.

In some embodiments, the first threshold varies as a function of the amplitude.

In some embodiments, the received signal includes a digitized time domain signal, wherein the amplitude is that of a first sample of the digitized time domain signal, and wherein the average amplitude is an average of the amplitudes of a plurality of samples of the digitized time domain signal.

Some embodiments further include obtaining a phase of the received signal; and constructing an output based on the phase and the first output.

In some embodiments, the interference suppression algorithm operates in an I/Q time domain of the received signal, in a frequency domain of the received signal, in an amplitude domain of the received signal, in a nonlinear amplitude domain of the received signal, or in a combination of more than one domain of the received signal.

Under another aspect, a circuit is provided for processing a received signal, the received signal including a desired signal and an interference signal that spectrally overlaps the desired signal. The circuit can include an amplitude circuit configured to: obtain an amplitude of the received signal; obtain an average amplitude of the received signal based on at least one prior amplitude of the received signal; and subtract the amplitude from the average amplitude to obtain an amplitude residual. The circuit further can include an arithmetic circuit configured to, based upon an absolute value of the amplitude residual being less than or equal to a first threshold, input the received signal into an interference suppression algorithm so as to generate a first output including the desired signal with reduced contribution from the interference signal.

In some embodiments, the arithmetic circuit further is configured to bypass the interference suppression algorithm based upon the absolute value of the amplitude residual being greater than the first threshold. In some embodiments, the arithmetic circuit further is configured, based upon bypassing the interference suppression algorithm, to generate a second output equal to a predetermined value.

In some embodiments, the arithmetic circuit further is configured to bypass the interference suppression algorithm based upon the absolute value of the amplitude being less than a second threshold.

In some embodiments, the arithmetic circuit further is configured to bypass the interference suppression algorithm based upon a power of the received signal being less than a second threshold.

In some embodiments, the arithmetic circuit further is configured to bypass the interference suppression algorithm based upon an interference to noise ratio of the received signal being less than a second threshold.

In some embodiments, the arithmetic circuit further is configured, based upon bypassing the interference suppression algorithm, to generate a second output equal to the amplitude of the received signal.

In some embodiments, the first threshold is fixed.

In some embodiments, the first threshold varies as a function of the first amplitude.

In some embodiments, the received signal includes a digitized time domain signal, wherein the amplitude is that of a first sample of the digitized time domain signal, and wherein the average amplitude is an average of the amplitudes of a plurality of samples of the digitized time domain signal.

In some embodiments, the amplitude circuit further is configured to obtain a phase of the received signal; and the circuit further includes a signal construction circuit coupled to the amplitude circuit and to the arithmetic circuit, the signal construction circuit being configured to construct an output based on the phase and the first output.

In some embodiments, the interference suppression algorithm operates in an I/Q time domain of the received signal, in a frequency domain of the received signal, in an amplitude domain of the received signal, in a nonlinear amplitude domain of the received signal, or in more than one domain of the received signal.

Under another aspect, a method is provided for processing a received signal including a desired signal and an interference signal that spectrally overlaps the desired signal. The method can include obtaining amplitudes of samples of the received baseband signal. The method also can include applying a linear time domain filter to the amplitudes so as to obtain processed amplitudes of the samples with reduced interference. The method also can include generating an output signal with reduced interference based on the processed amplitudes.

In some embodiments, the linear time domain filter includes a time domain notch filter.

In some embodiments, the linear time domain filter includes a time domain high pass filter.

In some embodiments, the method further includes estimating a signal quality metric; and adaptively adjusting one or more parameters of said linear time domain filter so as to optimize said signal quality metric. In some embodiments, optimizing said signal quality metric minimizes an interference to noise power ratio (INR) or maximizes a carrier power to noise spectral density ratio (C/No) or maximizes a signal power to noise power ratio (SNR).

Under another aspect, a circuit is provided for processing a received baseband signal including a desired signal and an interference signal that spectrally overlaps the desired signal. The circuit can include an amplitude circuit configured to obtain amplitudes of samples of the received signal. The circuit also can include a linear time domain amplitude filter configured to receive the obtained amplitudes and to output processed amplitudes of the samples with reduced interference. The circuit also can include a signal construction circuit configured to generate an output signal with reduced interference based on the processed amplitudes.

In some embodiments, the linear time domain filter includes a time domain notch filter.

In some embodiments, the linear time domain filter includes a time domain high pass filter.

In some embodiments, the circuit further includes circuitry configured to estimate a signal quality metric; and circuitry configured to adaptively adjust one or more parameters of said linear time domain filter so as to optimize said signal quality metric.

In some embodiments, optimizing said signal quality metric minimizes an interference to noise power ratio (INR) or maximizes a carrier power to noise spectral density ratio (C/No) or maximizes a signal power to noise power ratio (SNR).

Under still another aspect, a method is provided for processing a received signal, the received signal including a desired signal and an interference signal that spectrally overlaps the desired signal. The method can include obtaining first non-unity power of amplitude of the received signal. The method also can include inputting the first non-unity power of the amplitude into an interference suppression algorithm to output a processed amplitude with reduced contribution from the interference signal. The method also can include generating an output signal with reduced contribution from the interference signal based on the phase and the processed amplitude.

In some embodiments, the first non-unity power of the amplitude is obtained directly from the received signal.

In some embodiments, the first non-unity power of the amplitude is obtained by determining an amplitude of the received signal, and then taking that amplitude to a first non-unity power.

In some embodiments, the interference suppression algorithm includes applying a time domain notch filter.

In some embodiments, the interference suppression algorithm includes applying a time domain high pass filter.

In some embodiments, the interference suppression algorithm includes applying a Fourier transform based frequency excision algorithm.

In some embodiments, the method further includes applying interference suppression to the amplitude of the received signal, wherein the processed amplitude is based on the interference suppressed amplitude.

In some embodiments, the method further includes obtaining a second non-unity power of the amplitude, wherein the first non-unity power is different than the second non-unity power; and applying interference suppression to the second non-unity power of the amplitude. The processed amplitude can be based on the interference suppressed second non-unity power of the amplitude.

In some embodiments, the first non-unity power is $\frac{1}{2}$, 2, $\frac{1}{3}$, or 3.

Under another aspect, a circuit is provided for processing a received signal, the received signal including a desired signal and an interference signal that spectrally overlaps the desired signal. The circuit can include a non-unity circuit configured to obtain a first non-unity power of amplitude of the received signal. The circuit further can include an interference suppressor configured to apply an interference suppression algorithm to the first non-unity power of the amplitude to output a processed amplitude with reduced contribution from the interference signal. The circuit further can include a signal construction circuit configured to generate an output signal with reduced contribution from the interference signal interference based on the processed amplitude.

In some embodiments, the non-unity circuit is configured to obtain the first non-unity power of the amplitude directly from the received signal.

In some embodiments, the non-unity circuit is configured to obtain the first non-unity power of the amplitude based on determining an amplitude of the received signal, and then taking that amplitude to a first non-unity power.

In some embodiments, the interference suppressor includes a time domain notch filter.

In some embodiments, the interference suppressor includes a time domain high pass filter.

In some embodiments, the interference suppressor includes a Fourier transform based frequency domain excisor.

In some embodiments, the interference suppressor further is configured to apply interference suppression to the amplitude of the received signal, and to output the processed amplitude based on the interference suppressed amplitude.

In some embodiments, the non-unity circuit further is configured to obtain a second non-unity power of the amplitude, wherein the first non-unity power is different than the second non-unity power; and the interference suppressor further is configured to apply interference suppression to the second non-unity power of the amplitude to output the processed amplitude based on the interference suppressed second non-unity power of the amplitude.

In some embodiments, the first non-unity power is ½, 2, ⅓, or 3.

Under still another aspect, a method is provided for processing samples of a received signal, the received signal including a desired signal and an interference signal that spectrally overlaps the desired signal. The method can include obtaining amplitudes of the samples of the received signal. The method also can include defining a plurality of clusters, each cluster of the plurality having a corresponding cluster amplitude. The method also can include assigning each sample of a first subset of the samples to one of the clusters based on the amplitude of that sample and based on one or more of the cluster amplitudes. The method also can include suppressing contribution of interference to each sample of the first subset of the samples based on the amplitude of that sample and based on the cluster amplitude of the cluster to which that sample is assigned so as to obtain a processed amplitude of that sample with reduced interference. The method also can include generating an output signal with reduced interference based on the processed amplitudes of the samples of the first subset of the samples.

In some embodiments, the method further includes determining that contribution of interference need not be suppressed for at least one sample of a second subset of the samples.

In some embodiments, the method further includes, based upon the amplitude of at least one of the samples of the second subset and a threshold, outputting a predetermined value as the processed amplitude of that sample.

In some embodiments, the method further includes, based upon the amplitude of at least one of the samples of the second subset and a threshold, outputting the amplitude of that sample as the processed amplitude of that sample.

In some embodiments, said suppressing further comprises transforming samples into a transform domain representation, excising at least a portion of the interference in the transform domain, and performing an inverse transform to obtain the processed amplitudes. In some embodiments, the transform is a Fourier transform. In some embodiments, the transform is a wavelet transform.

In some embodiments, said suppressing includes subtracting the amplitude of that sample from the cluster amplitude of the cluster to which that sample is assigned.

In some embodiments, the method further includes estimating each cluster amplitude over a period of time.

In some embodiments, said suppressing comprises subtracting the amplitude of that sample from the estimated cluster amplitude of the cluster to which that sample is assigned. In some embodiments, estimating the cluster amplitude of each cluster comprises averaging, over the period of time, the amplitudes of the samples assigned to that cluster. In some embodiments, said averaging comprises using a finite impulse response (FIR) or infinite impulse response (IIR) type digital filter. In some embodiments, the FIR or IIR type digital filter receives as input only the amplitudes of the samples assigned to the corresponding cluster, and updates an output of the filter only when a new amplitude is assigned to the corresponding cluster. Some embodiments further include compensating for the group delay of the FIR or IIR type filter prior to performing the subtraction. In some embodiments, the filter includes an IIR type filter, an output of which is generated using steps that include storing the cluster average into a random access memory (RAM) at an address corresponding to the cluster; updating the respective cluster average every sample by reading a value of the average from the RAM; multiplying the read value of the average by a coefficient; adding the multiplied coefficient to a multiplied version of the amplitude of that sample to produce the filter output; and re-writing the new cluster average back into RAM at the address corresponding to the cluster. In some embodiments, the filter includes an FIR moving average filter. In some embodiments, the FIR moving average filter is implemented as a recursive running sum.

Some embodiments include assigning each sample of the first subset of the samples to one of the clusters includes computing respective minimum distances between the amplitude of that sample and a plurality of the cluster amplitudes, and assigning the sample to the cluster for which the minimum distance is the smallest.

Some embodiments include defining the clusters at a first time based on a histogram of the amplitudes of the samples of the received signal at the first time. Some embodiments further include re-defining the clusters at a second time based on a histogram of the amplitudes of the samples of the received signal at the second time.

Some embodiments include creating or destroying at least one cluster or merging at least two clusters according to a set of rules. Some embodiments include measuring respective intra-cluster distances between pairs of clusters based on the cluster amplitudes of those clusters, and wherein the set of rules defines that based upon any two clusters having an intra-cluster distance that is less than a threshold, those two clusters are to be merged. In some embodiments, said merging includes averaging the cluster amplitudes of those two clusters; deleting one of the two clusters; and assigning the average of the cluster amplitudes of those two clusters to the other of the two bins. Some embodiments include comprising measuring a minimum distance between the amplitude of at least one of the samples and at least a subset of the cluster amplitudes, and wherein the set of rules defines that based upon the smallest minimum distance between that amplitude and any of the cluster amplitudes of the subset exceeding a threshold, a new cluster having a cluster amplitude equal to the amplitude for that sample is to be added.

In some embodiments, said defining the plurality of clusters comprises partitioning an available digital amplitude space into a plurality of bins. In some embodiments, the bins are spaced approximately evenly across the available amplitude space. In some embodiments, the bins are spaced unevenly across the available amplitude space. Some embodiments further include updating the number of bins and locations of bins based upon one or more properties of the received signal.

Under another aspect, a circuit is provided for processing samples of a received signal, the received signal including a desired signal and an interference signal that spectrally overlaps the desired signal. The circuit can include an amplitude circuit configured to obtain amplitudes of samples of the received signal. The circuit further can include a cluster definition circuit configured to define a plurality of clusters, each cluster of the plurality having a corresponding cluster amplitude. The circuit further can include a cluster assignment circuit configured to assign each sample of a subset of the samples to one of the clusters based on the amplitude of that sample and based on one or more of the cluster amplitudes. The circuit further can include an interference suppressor circuit configured to suppress interference to each sample of the first subset of the samples based on the amplitude of that sample and based on the cluster amplitude of the cluster to which that sample is assigned so as to obtain a processed amplitude of that sample with reduced interference. The circuit further can include a signal construction circuit configured to generate an output signal with reduced interference based on the processed amplitudes.

In some embodiments, the interference suppressor circuit further is configured to determine that contribution of interference need not be suppressed for at least one sample of a second subset of the samples. In some embodiments, the interference suppressor circuit further is configured, based upon the amplitude of at least one of the samples of the second subset and a threshold, to output a predetermined value as the processed amplitude of that sample. In some embodiments, the interference suppressor circuit further is configured, based upon the amplitude of at least one of the samples of the second subset and a threshold, to output the amplitude of that sample as the processed amplitude of that sample.

In some embodiments, the interference suppressor circuit further is configured to transform samples into a transform domain representation, excise at least a portion of the interference in the transform domain, and perform an inverse transform to obtain the processed amplitude samples. In some embodiments, the transform is a Fourier transform. In some embodiments, the transform is a wavelet transform.

In some embodiments, the interference suppressor circuit further is configured to subtract the amplitude of that sample from the cluster amplitude of the cluster to which that sample is assigned.

In some embodiments, the cluster definition circuit further is configured to estimate each cluster amplitude over a period of time. In some embodiments, the interference suppressor circuit further is configured to subtract the amplitude of that sample from the estimated cluster amplitude of the cluster to which that sample is assigned. In some embodiments, the cluster definition circuit is configured to estimate the cluster amplitude of each cluster based on averaging, over the period of time, the amplitudes of the samples assigned to that cluster. In some embodiments, the cluster definition circuit comprises a finite impulse response (FIR) or infinite impulse response (IIR) type digital filter configured to perform said averaging. In some embodiments, the FIR or IIR type digital filter is configured to receive as input only the amplitudes of the samples assigned to the corresponding cluster, and to update an output of the filter based only upon a sample having a new amplitude being assigned to the corresponding cluster. In some embodiments, the interference suppressor circuit further is configured to compensate for the group delay of the FIR or BR type filter prior to performing the subtraction. In some embodiments, the circuit further includes a random access memory (RAM), the filter includes an IIR type filter, and the cluster definition circuit is configured to generate an output of the filter using steps comprising: storing the cluster average into a RAM at an address corresponding to the cluster; updating the respective cluster average every sample by reading a value of the average from the RAM; multiplying the read value of the average by a coefficient; adding the multiplied coefficient to a multiplied version of the amplitude of that sample to produce the filter output; and re-writing the new cluster average back into RAM at the address corresponding to the cluster. In some embodiments, the filter includes an FIR moving average filter. In some embodiments, the FIR moving average filter is configured to implement a recursive running sum.

In some embodiments, the cluster assignment circuit is configured to assign each sample of the first subset of the samples to one of the clusters based on a respective minimum distance between the amplitude of that sample and a plurality of the cluster amplitudes, and to assign the sample to the cluster for which the minimum distance is the smallest.

In some embodiments, the cluster definition circuit is configured to define the clusters at a first time based on a histogram of the amplitudes of the samples of the received signal at the first time. In some embodiments, the cluster definition circuit is configured to re-define the clusters at a second time based on a histogram of the amplitudes of the samples of the received signal at the second time.

In some embodiments, the cluster definition circuit is configured to create or destroy at least one cluster or merging at least two clusters according to a set of rules.

In some embodiments, the cluster definition circuit further is configured to measure respective intra-cluster distances between pairs of clusters based on the cluster amplitudes of those clusters, and wherein the set of rules defines that based upon any two clusters having an intra-cluster distance that is less than a threshold, those two clusters are to be merged. In some embodiments, the cluster definition circuit is configured to merge two clusters using steps comprising: averaging the cluster amplitudes of those two clusters; deleting one of the two clusters; and assigning the average of the cluster amplitudes of those two clusters to the other of the two bins.

In some embodiments, the cluster definition circuit further is configured to measure a minimum distance between the amplitude of at least one of the samples and at least a subset of the cluster amplitudes, and wherein the set of rules defines that based upon the smallest minimum distance between that amplitude and any of the cluster amplitudes of the subset exceeding a threshold, a new cluster having a cluster amplitude equal to the amplitude for that sample is to be added.

In some embodiments, the cluster definition circuit is configured to define the plurality of clusters based on partitioning an available digital amplitude space into a plurality of bins. In some embodiments, the bins are spaced approximately evenly across the available amplitude space. In some embodiments, the bins are spaced unevenly across the available amplitude space. In some embodiments, the cluster definition circuit is configured to update the number of bins and locations of bins based upon one or more properties of the received signal.

BRIEF DESCRIPTION OF DRAWINGS

FIG. 5K illustrates an exemplary method of merging amplitude clusters, according to some embodiments of the present invention.

FIG. 5L illustrates an exemplary method of adding new amplitude clusters, according to some embodiments of the present invention.

FIG. 5M illustrates steps in an exemplary method for initializing and updating amplitude cluster values, according to some embodiments of the present invention.

FIG. 5O illustrates the C/No for different exemplary interference suppression techniques, according to one non-limiting example of the present invention.

DETAILED DESCRIPTION

Embodiments of the present invention provide circuits and methods for reducing an interference signal that spectrally overlaps a desired signal. For example, if the desired signal and the interference signal share a channel, that is, if they spectrally overlap with one another, and if desired signal is much stronger than the interference signal, then the desired signal can be relatively easy to detect and demodulate. However, in some circumstances, the interference signal can make it hard to detect and demodulate the desired signal. As described in greater detail herein, the present circuits and methods need not require detailed knowledge of the desired signal or the interference signal, and as such, readily can be implemented in a variety of practical applications. For example, the present circuits and methods can use any suitable combination of one or more of the interference reduction circuits or methods provided herein so as to provide an output that includes the desired signal with reduced contribution from the interference signal. Such circuits and methods can reduce interference based on any suitable combination of one or more of: estimating the amplitude of the interference signal; applying thresholds based on the difference between the measured amplitudes and the estimated interference amplitude, applying a sliding window average finite impulse response (FIR) filter to the signal amplitude; using a linear time domain amplitude filter; processing with a non-unity power of the amplitude of the signals; or clustering the amplitudes of the signals.

In the following discussions, the subscript k will be used to indicate the kth value of the residual or amplitude respectively. This nomenclature can be applied to digital signal processing but embodiments of the present invention can be implemented though analog signal processing circuitry as well as digital signal processing. In the case of analog signal processing, the subscript k may be replaced with the continuous time variable t, as would be known to one skilled in the art. For example, the kth amplitude $A_k$ can be replaced with the value of the amplitude at time t, A(t).

Figure 1A:
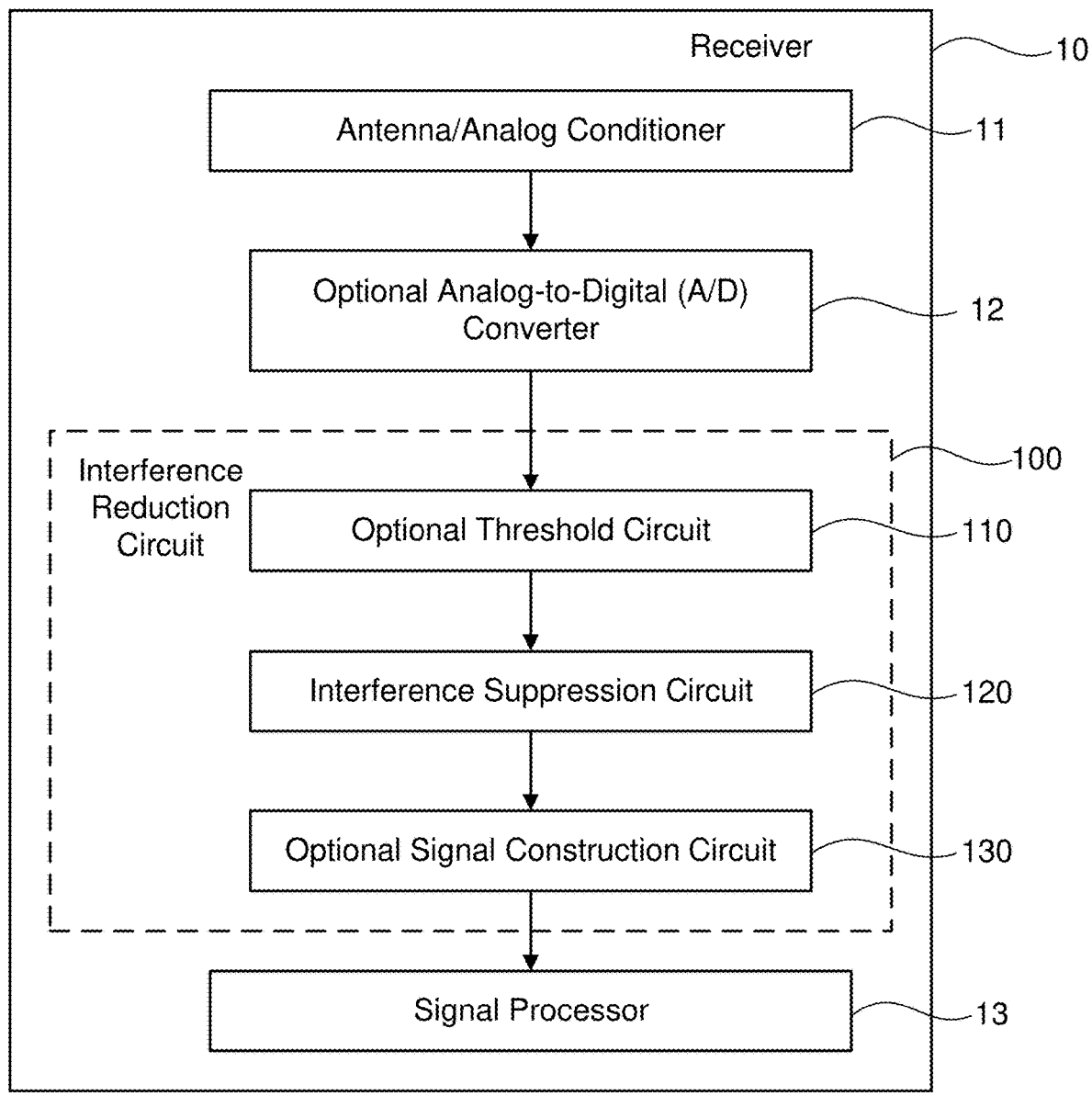
FIG. 1A schematically illustrates a circuit for reducing an interference signal that spectrally overlaps a desired signal in a receiver, according to some embodiments of the present invention.

Circuits for Processing Signals Including Desired Signals and Interference Signals that Spectrally Overlap the Desired Signals FIG. 1A schematically illustrates a circuit for reducing an interference signal that spectrally overlaps a desired signal in a receiver, according to some embodiments of the present invention. As illustrated in FIG. 1A, receiver 10 can include an antenna/analog conditioner 11 configured to receive a signal that includes the interference signal and the desired signal; optional analog-to-digital (A/D) converter 12; signal processor 13 configured to process the received signals in order to perform conventional receiver functions such as synchronization, demodulation, decoding and other functions; and interference reduction circuit 100 disposed therebetween. In the illustrated embodiment, interference reduction circuit 100 optionally includes threshold circuit 110 connected to A/D converter 112; interference suppression circuit 120 coupled to optional threshold circuit 110; and optional signal construction circuit 130 coupled to interference suppression circuit 120 and coupled to signal processor 13. Signal processor 13 can be implemented using digital or analog circuitry. Note that in embodiments that exclude A/D converter 12, antenna/analog conditioner 11 instead suitably can be connected to optional threshold circuit 110 or to interference suppression circuit 120. In such embodiments, optional threshold circuit 110 or interference suppression circuit 120 can be implemented using analog circuits. Interference suppression circuit 120, optional threshold circuit 110, and signal processor 130 also can be implemented in various combinations of analog and/or digital circuitry.

Optional threshold circuit 110 can be configured so as to compute the amplitude, average amplitude, and amplitude residual determined from the difference between the amplitude and the average amplitude, or optional threshold circuit 110 can be configured so as to accept the amplitude and amplitude residual that is computed by interference suppression circuit 120 or some other circuit in receiver 10. Optional threshold circuit 110 can be configured so as to provide a gating signal to control the signal values going into interference suppression circuit 120 and/or can be configured so as to provide a second gating signal to bypass interference suppression circuit 120 based upon the amplitude being below a predetermined value. Optional threshold circuit 110 can be configured so as to provide a replacement signal that will set the output of interference suppression circuit 120 to a predetermined value. Optional threshold circuit 110 also can be configured so as to compute or accept signal power, signal to noise ratio, or interference to noise power ratio from determined outside of optional threshold circuit 110 so as to trigger a second threshold as to whether or not interference suppression circuit 120 should be applied or bypassed.

Additionally, in embodiments that exclude optional threshold circuit 110, interference suppression circuit 120 suitably can be connected to A/D converter 12 (if present) or to antenna/analog conditioner 11. Receiver 10 illustrated in FIG. 1A can include, but is not limited to, a global navigation satellite system receiver (GNSS) such as GPS, Glonass, Compass, or Galileo, a cellular wireless communications receiver, a WiFi, Bluetooth, or other radio frequency receiver, or a radar receiver or satellite communication system receiver.

Antenna/analog conditioner 11 illustrated in FIG. 1A can be configured to wirelessly receive a signal that includes the desired signal and the interference signal that spectrally overlaps the desired signal. In one example, antenna/analog conditioner 11 can be configured to receive the signal, which can fall within a pre-defined spectral band, and antenna/analog conditioner 11 can include one or more filters configured to block signals having frequencies that fall outside of this band. Appropriate antenna designs for a variety of signals in a variety of contexts, e.g., terrestrial, aircraft, or space-based antennas, are known in the art. In some embodiments, antenna/analog conditioner 11 can be or include a pre-existing structure to which inventive circuit 100 can be coupled. Antenna/analog conditioner 11 also can include an input radio frequency (RF) filter to select the bandwidth containing desired signal components and reject other signals at frequencies outside of that bandwidth, a low noise amplifier to establish the system noise level, and can contain one or more downconverters to translate the RF bandwidth containing the user signals into the bandwidth over which the optional A/D converter 12 operates. Such components can be considered together to constitute analog conditioning circuitry.

The received signal can be digital or analog, and can be in the time domain or the frequency domain. For example, in some embodiments in which the present circuits and methods are used to reduce interference for GPS C/A code receivers, the desired signal can include a sum of binary-phase shift keyed (BPSK) modulated signals received at a power level below the power level of the thermal noise present in the GPS C/A code receiver. In such embodiments, the interference can include a signal which completely overlaps the desired signal. Such an example interferer can be referred to as a matched spectral interferer. One type of matched spectral C/A code interferer is a BPSK signal transmitted at the same symbol rate of the C/A code (e.g., 1.023 Mchips/sec), or QPSK/QAM interference using the same symbol rate of the C/A code. In some embodiments, the interference signal can partially spectrally overlap the signal, such as BPSK at lower or higher symbol rates than the desired signal. Another non-limiting example of an interference signal is a frequency modulated signal which sweeps a tone over the desired signal bandwidth. FM swept-tone interference is a common type of signal used to disrupt GPS receivers in intentional GPS jamming equipment (see, e.g., Mitch et al., "Signal Characteristics of Civil GPS Jammers," Proceedings of the 24$^{th}$ International Technical Meeting of the Satellite Division of the Institute of Navigation ION GNSS 2011, Portland Oreg., pp. 1907-1919, September 2011, the entire contents of which are incorporated by reference herein).

As is known to one skilled in the art, other types of spectrally overlapping interference signals may also be present. These signals can be modulated in a number of ways, including, but not limited to, AM modulation, FM modulation, direct sequence spreading, frequency hopped spreading, or phase shift keying.

The interference signal can have, but need not necessarily have, a greater power than that of the desired signal. In some embodiments, the power of the interference signal can be significantly larger than the desired signal, and can be anywhere from 10 times larger than the desired signal (10 dB) to 1,000,000,000 times larger than the desired signal (90 dB). In other embodiments, the interference to signal power ratio can be greater than 1,000,000,000 (90 dB).

Optional A/D converter 12 can include an input port configured to be coupled to antenna/analog conditioner 11 via a suitable element (not specifically illustrated), such that optional A/D converter 12 receives the signal received and suitably processed by antenna/analog conditioner 11. The element connecting antenna/analog conditioner 11 and optional A/D converter 12 can include a conductive element such as a coaxial cable, a transmission line, or any other suitable conductor configured to transmit signals within a pre-defined spectral band from antenna/analog conditioner 11 to A/D converter 12 via the input port. Note, however, that the element can include any path suitably configured to transmit the signal from antenna/analog conditioner 11 to A/D converter 12 and need not necessarily include a continuous conductor, e.g., the element can include a capacitor or transformer.

Optional A/D converter 12 is configured to digitize and quantize the signal that it receives from antenna/analog conditioner 11, and provide as output digitized samples of the signal. As known to those of skill in the art of digital signal processing, A/D converters are commercially available devices that generate a digital version of an analog signal by sampling that signal at a specified rate. Note that in some embodiments, antenna/analog conditioner 11 can include its own A/D converter configured to digitize the received signal, or even can receive the signal in a digital format. In embodiments including A/D converter 12, the A/D converter can provide the digitized samples as output to interference reduction circuit 100, e.g., to optional threshold circuit 110 or to interference suppression circuit 120, via an output port and a suitable path (not specifically illustrated). In one exemplary embodiment, antenna/analog conditioner 11 includes an analog quadrature downconverter, and A/D converter 12 includes two parallel A/D converters that are configured so as to provide digitized samples as output to interference reduction circuit 100.

In the embodiment illustrated in FIG. 1A, optional threshold circuit 110 is configured to receive the signal from optional A/D converter 12 via an input port and any suitable path. Or, for example, optional threshold circuit 110 can be configured to receive the signal from antenna/analog conditioner 11 via an input port and any suitable path. In analog implementations of the present circuits and methods, the A/D converter can be omitted and threshold circuit 110 can be implemented using analog circuitry. In such cases, the discrete time samples (represented by the subscript k) can be replaced by a continuous time variable represented by the variable t.

Optional threshold circuit 110 can be configured to provide the signal to interference suppression circuit 120 based upon the amplitude of the signal, e.g., in a manner such as described in greater detail below with reference to FIGS. 2A-2E. In alternative embodiments, optional threshold circuit 110 can be omitted, and interference suppression circuit 120 can be configured to receive the signal from optional A/D converter 12 via an input port and any suitable path, or from antenna/analog conditioner 11 via an input port and any suitable path.

Interference suppression circuit 120 can be configured so as to reduce the contribution of the interference signal using any suitable circuitry. For example, in some embodiments, interference suppression circuit 120 can be configured to reduce the interference signal based on using a linear time domain amplitude filter, e.g., in a manner such as described in greater detail below with reference to FIGS. 3A-3H. As another example, in some embodiments, interference suppression circuit 120 can be configured to reduce the interference signal based on a non-unity power of the amplitude of the signals, e.g., in a manner such as described in greater detail below with reference to FIGS. 4A-4L. As another example, in some embodiments, interference suppression circuit 120 can be configured to reduce the interference signal based on clustering the amplitudes of the signals, e.g., in a manner such as described in greater detail below with reference to FIGS. 5A-5Q. Any suitable combination of two or more of such techniques can be implemented using interference suppression circuit 120.

Optional signal construction circuit 130 is configured to receive one or more outputs from interference suppression circuit 120 and, based on such output(s), to construct a signal that includes the desired signal with reduced contribution from the interference signal as compared to the signal received by antenna/analog conditioner 11. For example, in some embodiments, interference suppression circuit 120 can be configured to obtain the amplitude and the phase of the received signal, and to modify the amplitude so as to reduce contribution from the interference signal. Optional signal construction circuit 130 can be configured to receive the phase and the modified amplitude from interference suppression circuit 120, and to construct an output signal based on the phase and the modified amplitude. In other embodiments, interference suppression circuit 120 can be configured so as to output a signal having phase and an amplitude with reduced contribution from the interference signal, and signal construction circuit 130 can be omitted.

Signal processor 13 can be configured so as to receive the output from interference reduction circuit 100, e.g., from interference suppression circuit 120 or from optional signal construction circuit 130, and can be configured so to extract the desired signal from the output of 120, which includes reduced contribution from the interference signal.

Note that optional A/D converter 12, optional threshold circuit 110, interference suppression circuit 120, and optional signal construction circuit 130 can be implemented using any suitable circuits or components known in the art. For example, hardware circuits for performing A/D conversion are readily commercially available. As another example, optional threshold circuit 110, interference suppression circuit 120, and optional signal construction circuit 130 can be implemented using any suitable combination of arithmetic circuits that are known in the art for arithmetically operating on analog or digital signals (e.g., IIR filter, FIR filter, subtractor, adder, multiplier, divider, or the like).

Any such analog or digital hardware components suitably can be coupled together with any suitable paths, such as conductive elements or non-conductive elements. Other circuits could be employed in the analog or digital domain including comparators or envelope detectors, as is known to one skilled in the art. In other embodiments, the functionalities of one or more of optional A/D converter 12, optional threshold circuit 110, interference suppression circuit 120, and optional signal construction circuit 130 can be provided by a suitably programmed field-programmable gate array (FPGA), application-specific integrated circuit (ASIC). FPGAs and ASICs are commercially available, and methods of programming same to achieve desired logical programming are known in the art. In still other embodiments, the functionalities of one or more of optional A/D converter 12, optional threshold circuit 110, interference suppression circuit 120, and optional signal construction circuit 130 can be provided by a suitably programmed computer, e.g., a personal computer including a processor and a non-transitory computer-readable medium storing instructions to cause the processor to perform the steps of the present methods or to implement the functionality of the present circuits. Alternatively, the processor can include a digital processor, such as a central processing unit (CPU) or graphics processor unit (GPU), or an analog processor. Additionally, note that circuitry other than optional threshold circuit 110, interference suppression circuit 120, and optional signal construction circuit 130 can be used to provide interference reduction circuit 100 with functionality analogous to that described herein.

Figure 1B:
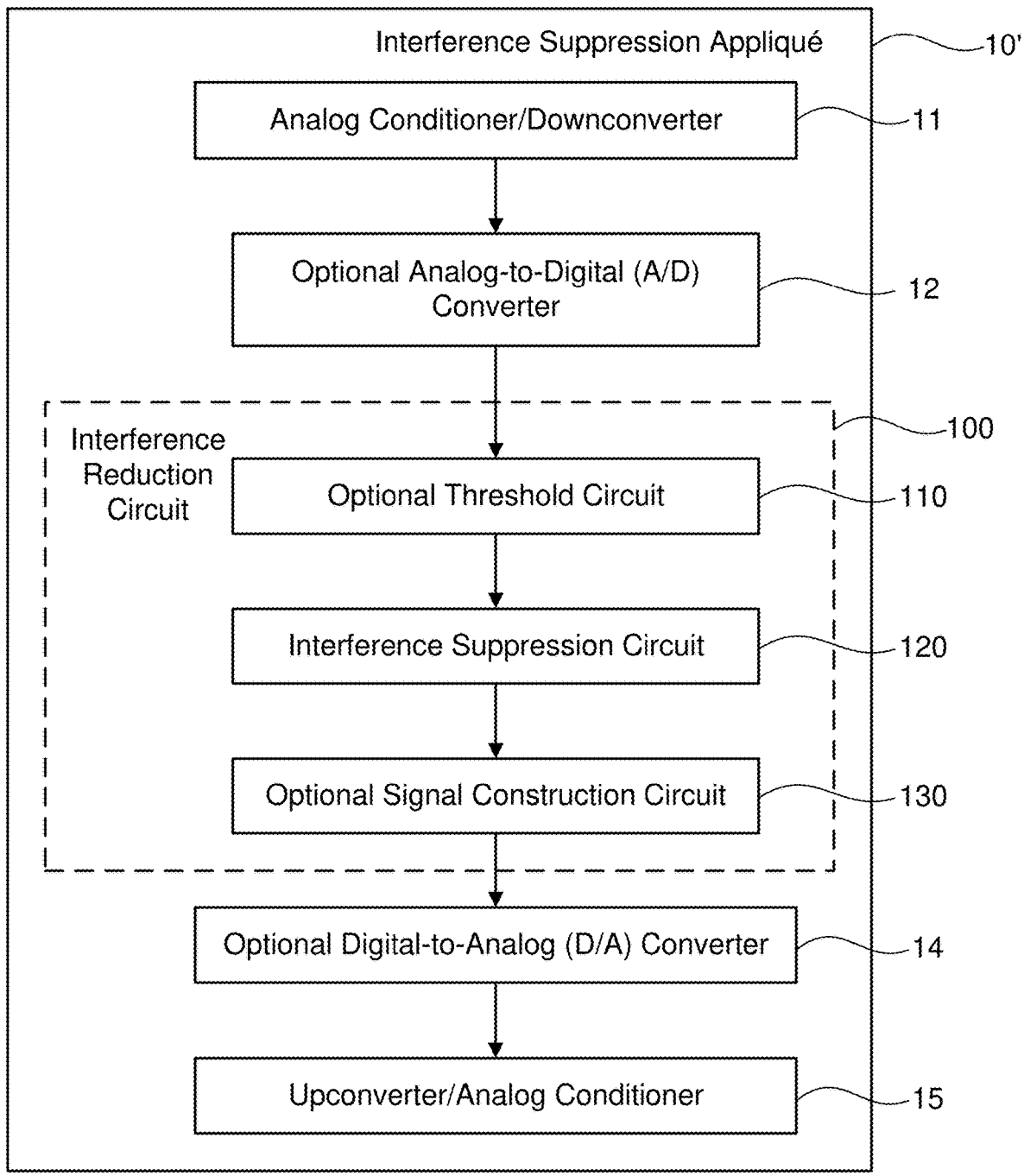
FIG. 1B schematically illustrates a circuit for reducing an interference signal that spectrally overlaps a desired signal in a interference suppression appliqué, according to some embodiments of the present invention.

In an alternative embodiment, interference suppression appliqué 10' illustrated in FIG. 1B includes some similar components as receiver 10 illustrated in FIG. 1A. Interference suppression appliqué 10' includes analog conditioner/downconverter 11; optional A/D converter 12 which can be configured similarly as optional A/D converter 12 described above with reference to FIG. 1A; optional threshold circuit 110 which can be configured similarly as optional threshold circuit 110 described above with reference to FIG. 1A; interference suppression circuit 120 which can be configured similarly as interference suppression circuit 120 described above with reference to FIG. 1A; optional signal construction circuit 130 which can be configured similarly as signal construction circuit 130 described above with reference to FIG. 1A; optional digital-to-analog (D/A) converter 14; and upconverter/analog conditioner. Interference suppression appliqué can be inserted between a receiver's antenna and analog conditioner and configured so as to suppress the effects of interference before it reaches an unmodified receiver. For example, interference suppression appliqué 10 can be inserted between a GPS receiver antenna and an unmodified receiver or between a cellular base station antenna and an unmodified receiver. In interference suppression applique 10', interference reduction circuit 100 can be configured to provide its output to digital-to-analog (D/A) converter 14, which is configured to convert the output to the analog domain. Upconverter and analog conditioner 15 are configured to receive the analog output from D/A converter via a suitable path and an input port, and to amplify and upconvert the analog output to an appropriate level expected by an unmodified receiver. As will be recognized by those skilled in the art, upconverter and analog conditioner 15 suitably can include an optional digital-to-analog converter and a frequency up-converter to translate the user signals into an analog RF signal. Appropriate analog conditioner designs for a variety of signals in a variety of contexts, e.g., terrestrial, aircraft, or space-based antennas, are known in the art.

Some exemplary circuits and methods for use in reducing interference in circuits such as described with reference to FIGS. 1A and 1B now will be described.

Reducing Interference Based on Applying Thresholds to the Signals

Figure 2A:
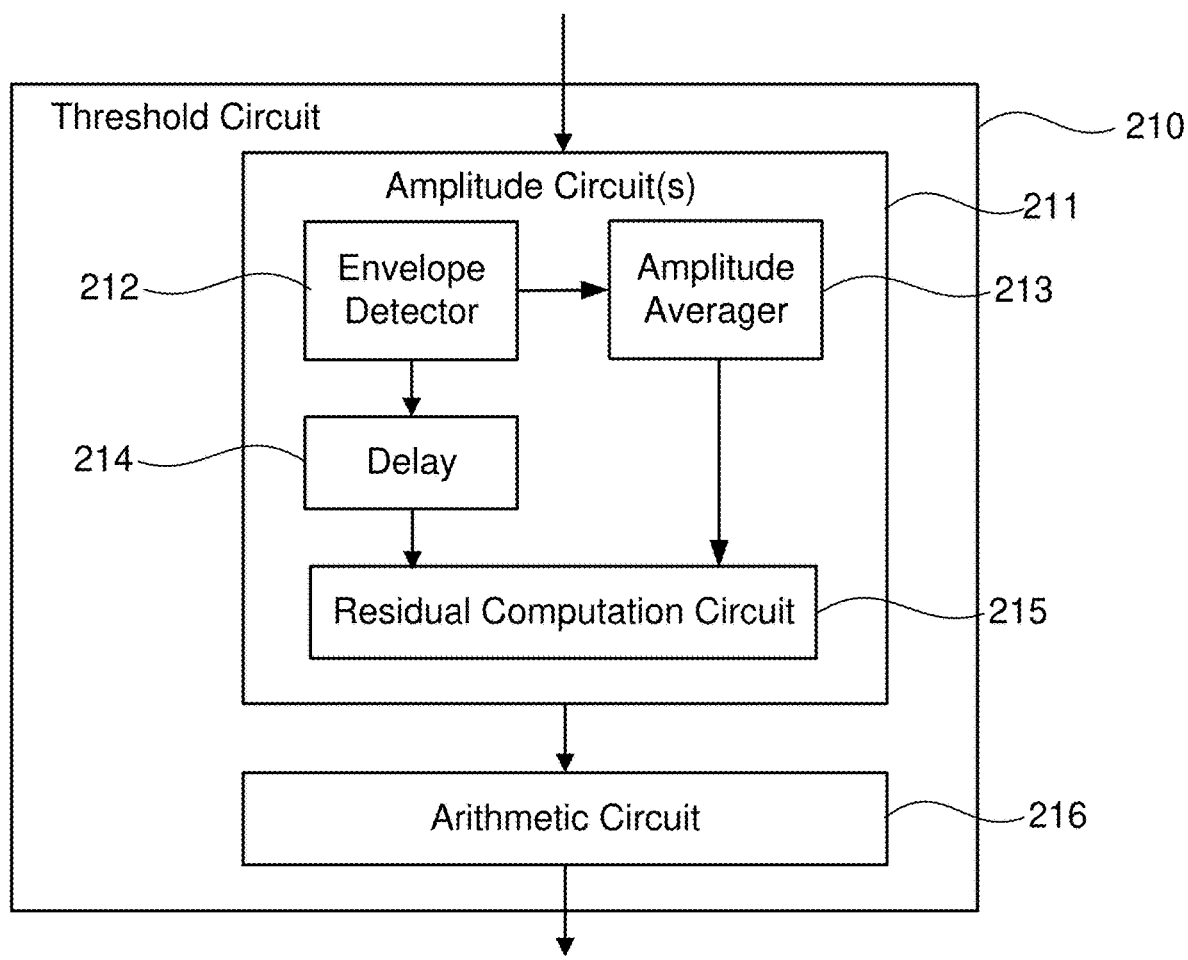
FIG. 2A schematically illustrates an exemplary threshold circuit for use in reducing an interference signal that spectrally overlaps a desired signal by applying one or more thresholds to that signal, according to some embodiments of the present invention.

FIG. 2A schematically illustrates an exemplary threshold circuit for use in reducing an interference signal that spectrally overlaps a desired signal by applying one or more thresholds to that signal, according to some embodiments of the present invention. Threshold circuit 210 illustrated in FIG. 2A includes one or more amplitude circuits 211 and arithmetic circuit 216. Optionally, the one or more amplitude circuits 211 include an optional rectangular to polar converter (not specifically illustrated), in which embodiments threshold circuit 210 also optionally includes a polar to rectangular converter (not specifically illustrated).

Amplitude circuit(s) 211 can be configured so as to receive a signal including a desired signal and an interference signal that spectrally overlaps the desired signal. For example, referring to FIG. 1A, amplitude circuit(s) 211 can be configured so as to receive the signal in the analog domain from antenna/analog conditioner 11, or can be configured so as to receive digitized samples of the signal from optional A/D converter 12. Optionally, the received signal can include a time domain signal, or can include a frequency-domain signal.

Amplitude circuit(s) 211 can be configured to obtain an amplitude of the received signal. For example, in some embodiments, amplitude circuit(s) 211 illustrated in FIG. 2A can include envelope detector 212, amplitude averager 213, delay circuit 214, and residual computation circuit 215. Envelope detector 212 can be configured so as to receive the signal, including the desired signal and the interference signal, from antenna/analog conditioner 11 or optional A/D converter 12. Envelope detector 212 can include suitable circuitry configured so as to detect an envelope of the signal, e.g., so as to detect the amplitude of the signal at a given moment. Amplitude averager 213 can be configured so as to receive the envelope of the signal from envelope detector 212 and to compute an average of the envelope of the signal, e.g., over a predetermined time or over a number of samples of the signal. In a nonlimiting example, the input to amplitude averager 213 can be gated such that certain values or samples at the output of envelope detector 212 are not input into the amplitude averager 213. In this way these certain values or samples will not contribute to the average. Delay circuit 214 can be configured so as to receive the signal from envelope detector 212 and to delay the signal, e.g., to compensate for any delay caused by the computation of the average amplitude by amplitude averager 213. The delay block 214 is optional. Residual computation circuit 215 can be configured so as to receive the delayed signal from delay circuit 214 and the average amplitude 213, as so as to compute a residual value, e.g., an arithmetic difference between the amplitude (detected by envelope detector 212) and the average amplitude (computed by amplitude averager 213). Additionally, amplitude circuit(s) 211 optionally can be configured to obtain a phase of the received signal. For example, in some embodiments, the received signal can be in rectangular coordinates, and amplitude circuit(s) 211 can include an optional rectangular to polar converter (not specifically illustrated) configured to obtain an amplitude and a phase of the received signal. Amplitude circuit 211 can be coupled so as to provide the amplitude to arithmetic circuit 216, and, in embodiments in which the phase also is obtained, optionally can be coupled so as to provide the phase to an optional polar to rectangular converter (not specifically illustrated) of arithmetic circuit 216. In a nonlimiting example, arithmetic circuit 216 can be configured to measure the size of the residual computed by residual circuit 215 and compare it to a threshold so as to determine if certain samples or values of the output of envelope detector 212 should be gated or blocked from entering the amplitude averager 213.

For example, a signal can be described by $s(t) = \mathrm{Re}(Ae^{j\theta}e^{4\omega}))=I\cos(\omega t)-Q\sin(\omega t)$. I corresponds to the in-phase component of the signal and Q corresponds to the quadrature component of the signal. Envelope detector 212 can be configured so as to compute the amplitude (envelope) from these components by:

$$A(t) = \sqrt{I^2 + Q^2} = \sqrt{(I+jQ) \times (I+jQ)^*} \quad (1)$$

The desired signal, which in some circumstances can be weak relative to the interference, can be described by $S_w(t) = I_w + jQ_w$. The interference signal, which in some circumstances can be strong relative to the desired signal, can be described by $S_I(t) = I_I + jQ_w$. Additionally, the noise in the circuit can be described by $n(t) = n_I + jn_Q$.

The received signal can be expressed as the sum $S(t) = S_w(t) + S_I(t) + n(t)$. Thus, the composite amplitude of S(t) can be expressed as:

$$A(t) = \sqrt{(I_I + I_w + n_I)^2 + (Q_I + Q_w + n_Q)^2} \quad (2)$$

Equation (2) can be rewritten in terms of component amplitudes and expressed as:

$$A(t) = \sqrt{A_I^2 + A_w^2 + A_n^2 + 2(I_w I_I + I_I n_I + I_w n_I) + 2(I_w I_I + I_I n_I + I_w n_I)} \quad (3)$$

In Equation (3), $A_I$ corresponds to the amplitude of the interference, which can be strong relative to the amplitude $A_w$ of the desired signal. In the case where the interference signal is significantly greater than the amplitude of the noise or of the desired signal, e.g., is over 1000 times greater than the amplitude of the noise or of the desired signal, the amplitude of the received signal, A(t), obtained by envelope detector 212 can be approximated as:

$$A(t) \approx \sqrt{A_I^2} = |A_I| \quad (4)$$

Amplitude averager 213 illustrated in FIG. 2A can be configured so as to obtain an average amplitude A(t) of the received signal based on at least one prior amplitude of the received signal received from envelope detector 212. For example, amplitude averager 213 can be configured so as to receive a stream of amplitudes from envelope detector 212, and can be configured so as to obtain an average, e.g., a running average, of the amplitude of the received signal over a predetermined window of time, or over a predetermined number of digitized samples of the signal (in embodiments in which the signal is digitized). Exemplary hardware implementations of amplitude averager 213 include suitably configured infinite impulse response (IIR) filters, finite impulse response (FIR) filters, and arithmetic circuits configured to calculate a weighted average of a signal over a predetermined window of time or over a predetermined number of samples.

Embodiments of the present invention can be implemented using discrete time sampled data in the digital domain or continuous time data in the analog domain.

In some embodiments, the predetermined window of time can be defined to be a fraction or multiple of the desired signal's signaling rate, for example the C/A code chip/symbol duration of 1/1.023 MHz in the embodiments where the present circuits and methods can be used to suppress GPS C/A code interference. Choosing a relatively long time window over which to average can increase the effectiveness of the suppression algorithm in constant envelope interference. In some embodiments, the predetermined window of time can be defined to be the minimum fraction of the desired signal's symbol duration that permits adequate suppression of constant envelope interference, so as to also permit the suppression of time varying amplitudes. In some embodiments, the minimum fraction can be a quarter of a desired signal symbol period, or half of a desired signal symbol period, or one symbol period, for example. In some embodiments, the predetermined window of time or the predetermined number of samples can be defined such that the amplitude of the interference signal is constant, or approximately constant, over that window or that number of samples (e.g., such that the amplitude of the interference signal varies by about 10% or less over the window or that number of samples). Alternatively, the predetermined window of time or the predetermined number of samples can be based on Cramer-Rao bound known in the art.

Some constant envelope signals can have widely varying amplitudes when received in actual receivers with finite bandwidth front ends. For example, FIG. 2C illustrates an exemplary signal that includes an interference signal that spectrally overlaps a desired signal. More specifically, the signal illustrated in FIG. 2C corresponds to a non-ideally generated Binary Phase Shift Keying (BPSK) pseudorandom noise (PRN) code interference signal that is spectrally matched to the 1.023 MCPS GPS C/A code. Ideal BPSK signals have a constant amplitude, however a bandlimited or filtered BPSK signal can have amplitude variation near the symbol transitions. An ideal BPSK signal transmitted from a transmitter, through a channel, and subsequently received at a receiver can experience effective filtering due to the combination of the transmitter frequency response, channel frequency response, and receiver frequency response. FIG. 2C shows amplitude samples computed in real time at a 122 million sample per second rate, and it can be seen that although the average amplitude is approximately constant at a value 1000, there are times near symbol transitions that the amplitude deviates dramatically from this average as the symbol transitions from +1000 to −1000. These rapid variations in amplitude can negatively affect the estimate of the average amplitude, and can degrade performance of the suppression algorithm if not mitigated. The averaging time window can be selected so as to sample a suitable number of symbols of the BPSK interferer. Note that although FIG. 2C illustrates just one example of a C/A code matched spectral interference signal, it should be appreciated that any communication, navigation, or sensor receiver can suffer from interference of similar type, including but not limited to 3G, 4G wireless systems, Bluetooth, or WiFi receivers, or other GPS receivers such as the P(Y) code receivers or M-code receivers, or satellite position system receivers including Galileo, Compass, and Glonass. Additionally, note that the thresholds illustrated in FIG. 2C are described elsewhere herein.

Referring back to FIG. 2A, residual computation circuit 215 can be configured to receive the average amplitude of the signal from amplitude averager 213, can be configured to receive the amplitude of the signal (optionally delayed by delay circuit 214) from envelope detector 212, and can be configured to subtract the amplitude from the average amplitude to obtain an amplitude residual. In one nonlimiting example, the received signal includes a digitized time domain signal, the amplitude is that of a first sample of the digitized time domain signal, and the average amplitude is an average of the amplitudes of a plurality of samples of the digitized time domain signal.

It should be appreciated that alternative embodiments of the present invention can be configured to employ a power residual instead of an amplitude residual as discussed below.

Additionally, or alternatively, residual computation circuit 215 can be configured to subtract the average amplitude from the amplitude, or can be configured to subtract the amplitude from the average amplitude. Both techniques can provide an amplitude residual which can be used in further processing to suppress the interference and recover the desired signal.

In some embodiments, arithmetic circuit 216 illustrated in FIG. 2A can be configured so as to receive the amplitude residual from residual computation circuit 215 and can be configured, based upon an absolute value of the amplitude residual being less than or equal to a first threshold, to input the received signal into an interference suppression algorithm so as to generate a first output including the desired signal with reduced contribution from the interference signal. For example, referring again to FIGS. 1A and 1B, optional threshold circuit 110 can be coupled so as to input the received signal (or the amplitude thereof) to interference suppression circuit 120, which can be configured so as to generate an output including the desired signal with reduced contribution from the interference signal. Exemplary interference suppression circuits and methods are provided elsewhere herein, although it should be appreciated that any suitable interference suppression technique can be used. One exemplary interference suppression algorithm suitable for use is that described in U.S. patent application Ser. No. 14/262,532, filed Apr. 25, 2014 and entitled "Systems and Methods for Reducing a Relatively High Power, Approximately Constant Envelope Interference Signal that Spectrally Overlaps a Relatively Low Power Desired Signal," the entire contents of which are incorporated by reference herein. Other interference suppression algorithms include, but are not limited to, those described in the following references, the entire contents of each of which are incorporated by reference herein: Przyjemski et al., "GPS Antijam Enhancement Techniques," Proceedings of the 49th Annual Meeting of The Institute of Navigation (1993), Jun. 21-23, 1993, Royal Sonesta Hotel, Cambridge, Mass.; Henttu, "A new interference suppression algorithm against broadband Constant envelope interference," MILCOM 2000, 21st Century Military Communications Conference Proceedings Vol 2.; and Amoroso, "Adaptive A/D Converter to Suppress CW Interference in DSPN Spread-Spectrum Communications," IEEE Transactions On Communications, Vol. COM-31, No. 10, October 1983.

Illustratively, the first threshold can be selected such that for amplitude residuals above the threshold, the expected performance of the interference suppression algorithm can produce a more degraded output signal than by not disabling the input to the interference suppression algorithm when the threshold is exceeded. Additionally, the first threshold can be selected such that for amplitude residuals less than or equal to the threshold, the expected performance of the suppression algorithm can be improved relative to the case of not thresholding the input based on the amplitude residual. For example, in some embodiments, arithmetic circuit 216 illustrated in FIG. 2A can be configured to bypass the interference suppression algorithm, e.g., can be configured to bypass interference suppression circuit 120 illustrated in FIGS. 1A-1B, based upon the absolute value of the amplitude residual being greater than the first threshold. Illustratively, arithmetic circuit 216 can be configured, based upon bypassing the interference suppression algorithm, to generate a second output equal to a predetermined value. In one example, the predetermined value can be zero, although any suitable value can be used. Arithmetic circuit 216 can provide such a second output to signal construction circuit 130 illustrated in FIGS. 1A-1B. Alternatively, arithmetic circuit 216 can be configured to provide the second output to interference suppression circuit 120, which can be configured so as to pass through the second output to signal construction circuit 130 and signal processor(s) 13 illustrated in FIG. 1A or D/A converter 14 illustrated in FIG. 1B.

Optionally, arithmetic circuit 216 can be configured to bypass the interference suppression algorithm based upon the absolute value of the amplitude being less than a second threshold. For example, the second threshold can be selected such that for amplitude values below the second threshold, the desired signal is sufficiently strong relative to the interference signal that interference suppression may not be needed in order to recover the desired signal. In one example, arithmetic circuit 216 can be configured, based upon bypassing the interference suppression algorithm, to generate a third output equal to the amplitude of the received signal.

Alternatively, the interference suppression algorithm can be bypassed based upon the signal to noise level being greater than the second threshold. Moreover, the interference suppression algorithm also can be bypassed based upon the total power or interference to noise level being below the second threshold. In such cases, the received signal power can sufficiently strong relative to the interference that interference suppression is not necessarily useful or efficient.

Arithmetic circuit 216 can be configured so as to provide such a third output to signal construction circuit 130 illustrated in FIGS. 1A-1B. Alternatively, arithmetic circuit 216 can be configured to provide the third output to interference suppression circuit 120, which can be configured so as to pass through the third output to signal construction circuit 130 and signal processor 13 illustrated in FIG. 1A or D/A converter 14 illustrated in FIG. 1B. In some embodiments, signal construction circuit 130 is configured so as to construct a composite recovered signal that includes one or more segments corresponding to the first output of arithmetic circuit 216, one or more segments corresponding to the second output of arithmetic circuit 216, and optionally also includes one or more segments corresponding to the third output of arithmetic circuit 216.

It will be apparent to those skilled in the art that the first threshold can be applied to the amplitude residual signal (e.g., after subtraction by residual computation circuit 215), or can be equivalently applied prior to subtraction on both the amplitude signal obtained by envelope detector 212 and the averaged amplitude signal obtained by amplitude averager 213. For example, assume a residual amplitude signal R is produced by residual computation circuit 215 subtracting an amplitude estimate $A_e$ from an (optionally delayed by delay circuit 214) signal $A_d$, therefore $R=A_d-A_e$. Assume for illustrative purposes that TH1 is set to 100, and is applied to the absolute value of residual R, and that some logic circuit (e.g., arithmetic circuit 216) operates based upon whether or not the absolute value of R is less than TH1, e.g., whether or not |R| is less than 100 in one non-limiting example. An alternate implementation of threshold circuit 110 can be configured so as to apply TH1 to $A_d$ (obtained by envelope detector 212 and optionally delayed by delay circuit 214) and $A_e$ (obtained by amplitude averager 213) directly. In one non-limiting example, such an application of TH1 can be accomplished by ensuring that $A_d<(A_e+100)$ and $A_d<(A_e-100)$. Also, a similar embodiment may be constructed when the thresholds are not constant but instead functions of the averaged amplitude estimate, for example if they are some scaled version of the average amplitude.

In some embodiments, one or both of the first threshold and the second threshold are fixed. Alternatively, one or more of the first threshold and the second threshold can vary, e.g., can vary as a function of the amplitude of the signal or as a function of the amplitude's deviation from a constant value, for example, the threshold may be varied in response to the measured peak to average power ratio.

Denote the input sample amplitude as "$A_k$" to arithmetic circuit 216, and denote the output of arithmetic circuit 216 as "$A'_k$". Arithmetic circuit 216 can be configured to use a first threshold (TH1) to determine the allowable deviation between the amplitude of the input sample amplitude $A_k$ and the average amplitude of the received signal, e.g., the kth estimate of the interference signal under the approximation of Equation (4). The $k^{th}$ amplitude residual after subtraction can be expressed as $R_k$, and the kth output, denoted here as $A'_k$, can be set to $R_k$ based upon the absolute value of the kth amplitude residual being less than TH1. Otherwise, the output value can be set equal to a predetermined value, $A'_k=A_0$:

$$\text{If } |R_k|<TH1, A_k=R_k, \text{ Else } A'_k=A_0 \quad (5)$$

The predetermined value $A_0$ can be zero or some other value such as the average of the last several amplitude values.

It should also be appreciated that in some embodiments the residual R (or $R_k$ in a discrete time version) may be determined from differences in the power and the average power, so that interference suppression circuit 120 is triggered by a power residual instead of an amplitude residual.

The first threshold (TH1) can be used to determine the allowable deviation between the amplitude of the input amplitude signal and the average amplitude of the received signal or the allowable deviation between other quantities like input power and average power of the received signal. Threshold TH1 can be determined according to the tolerable loss, L, in signal to noise ratio (SNR). As one nonlimiting example, TH1 can be selected so as to guarantee that the loss in SNR due to errors in the estimate of the interference signal (e.g., the average amplitude of the received signal under the approximation of Equation (4)) is less than or equal to 10 dB or other desired value. Alternatively, as another nonlimiting example, TH1 can be selected so that the loss in received carrier power to noise power spectral density ratio, $C/N_0$ in dBW/Hz, is less than or equal to 10 dB or other desired value. In still another nonlimiting example, TH1 can be selected so as to maximize the average SNR of the desired signal or to minimize a measured jammer to noise ratio, or both. For example, a least mean-square (LMS) algorithm, or other suitable minimization algorithm, can adapt one or both of TH1 and TH2 to maximize the SNR of the desired signal, or to minimize the measured interference to noise ratio (INR). Such maximization or minimization can be performed, for example, using a metric such as the measured interference to signal ratio (ISR) or the measured INR.

In another example, arithmetic circuit 216 optionally can include an averaging filter that is be "gated" at the input so as to prevent the amplitude values that do not meet a threshold criteria from contributing to the average amplitude of the received signal, e.g., the estimate of the interference signal under the approximation of Equation (4). For example, in embodiments in which a FIR filter is used to average the amplitude signal, the filter input optionally can be gated so that only those input amplitude signal values which produce amplitude residual values less than TH1 can contribute to the average. Similar gating can be used to prevent the amplitude of a given sample from creating an error in the current amplitude estimate for alternative filter implementations, such as IIR filters, integrate and dump filters, or other filters that can be used to obtain the average amplitude of the received signal, e.g., the estimate of the interference signal under the approximation of Equation (4).

In another non-limiting example, the second threshold (TH2) can be selected so that the interference suppression algorithm is bypassed when the amplitude values are less than a second threshold. Referring to Equations (1)-(4) above, based upon inputting to arithmetic circuit 216 the $k^{th}$ amplitude value $A_k$, arithmetic circuit 216 suitably can be configured so as to output a modified amplitude $A'_k$ based on:

$$\text{if } A_k < TH2, A_k = A'_k \tag{6}$$

In other words, in this example, do not apply interference suppression based upon the amplitude value being less than a predetermined value (TH2).

Figure 2B:
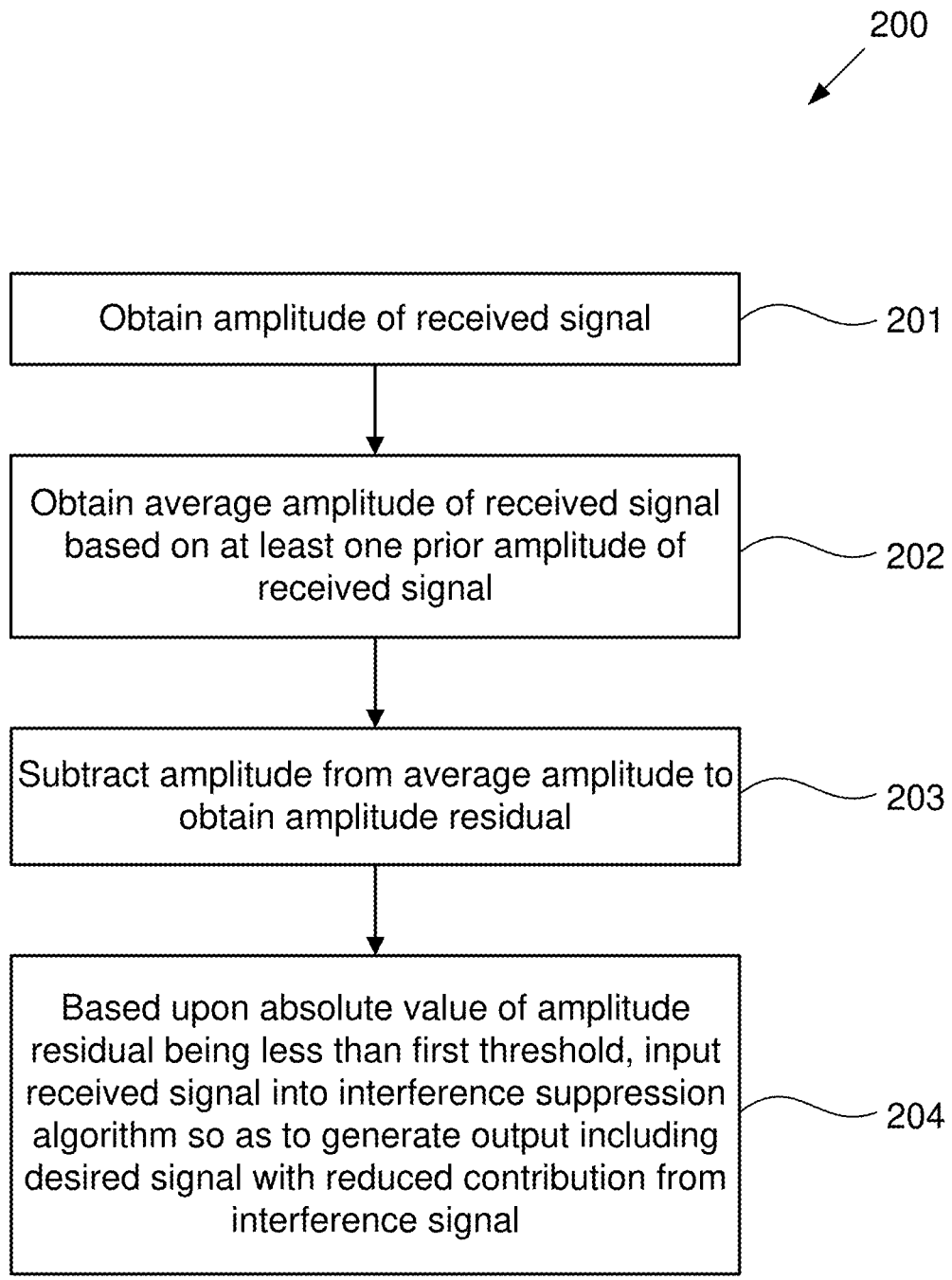
FIG. 2B illustrates a method for reducing an interference signal that spectrally overlaps a desired signal by applying one or more thresholds to that signal, according to some embodiments of the present invention.
Figure 2C:
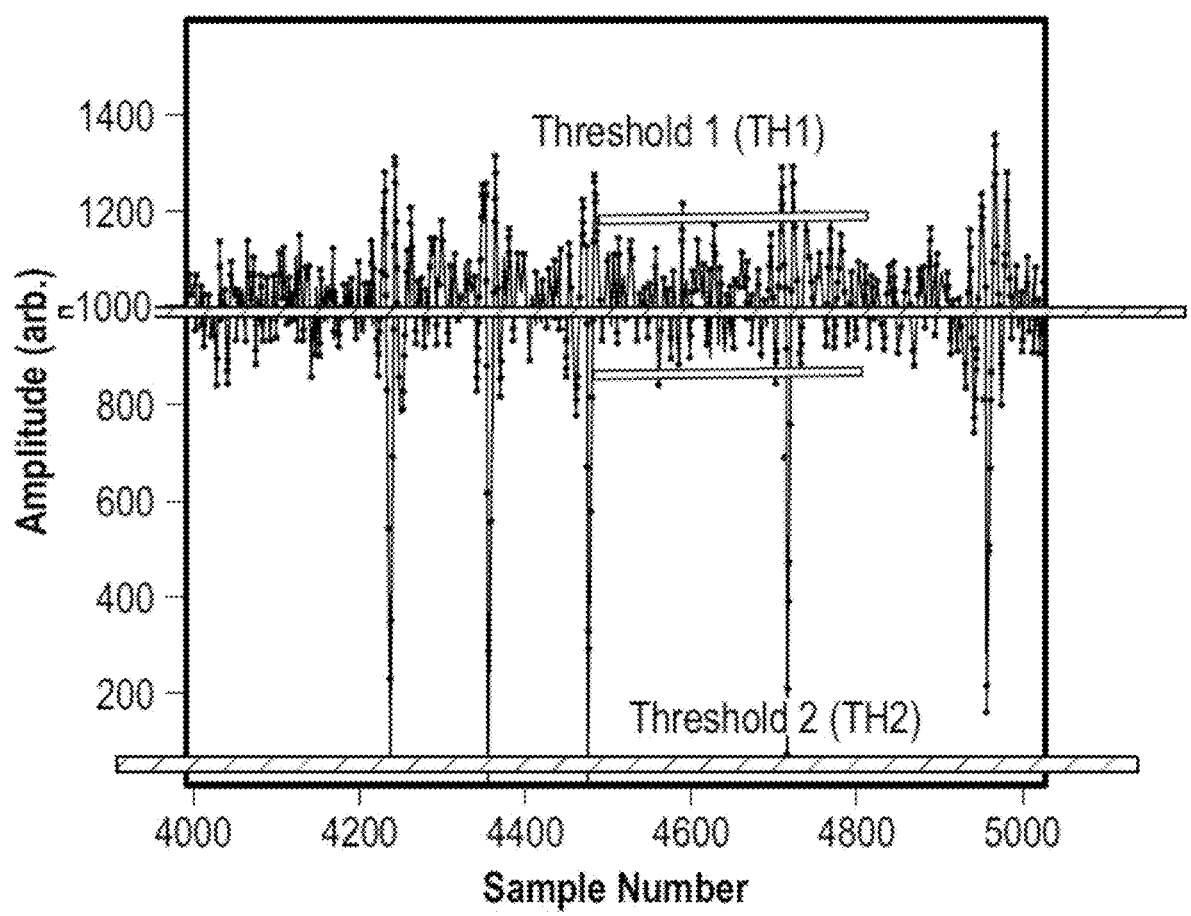
FIG. 2C schematically illustrates application of exemplary thresholds to an exemplary signal that includes an interference signal that spectrally overlaps a desired signal, according to some embodiments of the present invention.
Figure 2D:
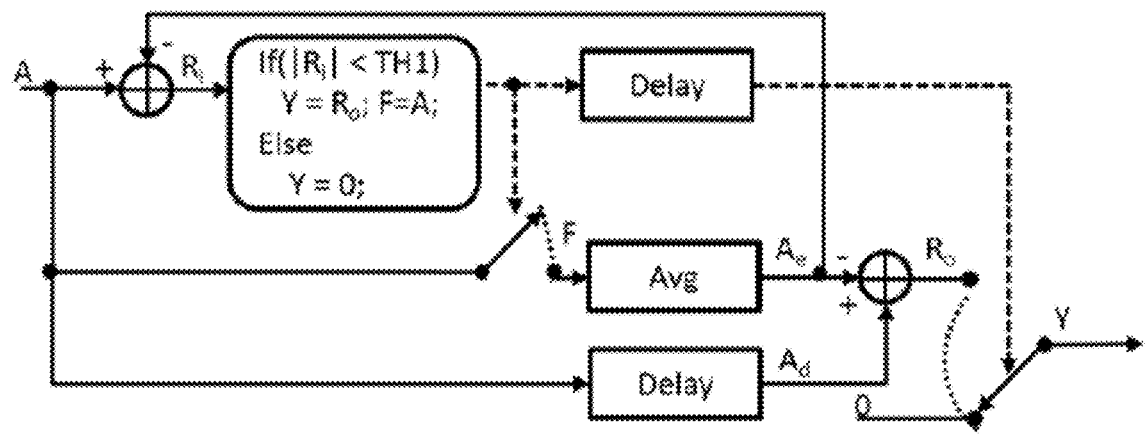
FIG. 2D schematically illustrates selected components of an exemplary threshold circuit for use in reducing an interference signal that spectrally overlaps a desired signal by applying a first threshold to that signal, according to some embodiments of the present invention.

FIG. 2D schematically illustrates selected components of an exemplary threshold circuit for use in reducing an interference signal that spectrally overlaps a desired signal by applying a first threshold to that signal, e.g., shows an exemplary circuit of such filter gating. Similar gating circuitry can be used so as to prevent a given input amplitude sample that is less than TH2 from contributing to the average amplitude of the received signal, e.g., the estimate of the interference signal under the approximation of Equation (4). Gating the input samples in this way can provide significant improvement in estimating the interference signal under the approximation of Equation (4), e.g., for samples in which the amplitude of the interference signal varies faster than the filter response time. For example, interference that is impulsive in nature can be expected not to degrade the performance of the filter estimates of the interference signal under the approximation of Equation (4) that otherwise can be caused by changes in interference that are significantly faster than the averaging time of the filter.

FIG. 2B illustrates a method 200 for reducing an interference signal that spectrally overlaps a desired signal by applying one or more thresholds to that signal, according to some embodiments of the present invention. The received signal can include a desired signal and an interference signal that spectrally overlaps the desired signal. Exemplary method 200 illustrated in FIG. 2B can include obtaining an amplitude of the received signal (step 201). For example, envelope detector 212 of amplitude circuit(s) 211 such as described above with reference to FIG. 2A can obtain the amplitude of the received signal, and optionally can include rectangular to polar converter 212.

Exemplary method 200 illustrated in FIG. 2B further can include obtaining an average amplitude of the received signal based on at least one prior amplitude of the received signal (step 202). For example, amplitude averager 213 of amplitude circuit(s) 211 such as described above with reference to FIG. 2A can obtain an average amplitude of the received signal.

Exemplary method 200 illustrated in FIG. 2B also can include subtracting the amplitude from the average amplitude to obtain an amplitude residual (step 203). For example, residual computation circuit 215 illustrated in FIG. 2A can obtain the amplitude of the received signal from envelope detector 212, optionally delayed by delay 214, can obtain the average amplitude from amplitude averager 213, and can subtract the amplitude from the average amplitude.

Exemplary method 200 further can include, based upon an absolute value of the amplitude residual being less than a first threshold, inputting the received signal into an interference suppression algorithm so as to generate a first output including the desired signal with reduced contribution from the interference signal (step 204). For example, arithmetic circuit 216 such as described above with reference to FIG. 2A can be configured so as to implement step 204. In one nonlimiting example, the received signal includes a digitized time domain signal, the amplitude is that of a first sample of the digitized time domain signal, and the average amplitude is an average of the amplitudes of a plurality of samples of the digitized time domain signal.

Optionally, method 200 illustrated in FIG. 2B also can include bypassing the interference suppression algorithm based upon the absolute value of the amplitude residual being greater than the first threshold in a manner analogous to that described above with reference to FIG. 2A. For example, arithmetic circuit 216 can be configured so as to perform such bypassing in a manner such as described above with reference to FIG. 2A. Illustratively, method 200 further can include, based upon bypassing the interference suppression algorithm, generating a second output equal to a predetermined value in a manner analogous to that described above with reference to FIG. 2A.

Optionally, method 200 illustrated in FIG. 2B also can include bypassing the interference suppression algorithm based upon the absolute value of the amplitude being less than a second threshold in a manner analogous to that described above with reference to FIG. 2A. For example, arithmetic circuit 216 can be configured so as to perform such bypassing in a manner such as described above with reference to FIG. 2A. Illustratively, method 200 further can include, based upon bypassing the interference suppression algorithm, generating a third output equal to the amplitude of the received signal in a manner analogous to that described above with reference to FIG. 2A. Exemplary interference suppression algorithms are provided elsewhere herein. As noted above, the first threshold or the second threshold, or both, can be fixed, or can vary as a function of the first amplitude.

In some embodiments, method 200 illustrated in FIG. 2B can include obtaining a phase of the received signal; and constructing an output based on the phase and the first output. For example, amplitude circuit 211 illustrated in FIG. 2A can provide the phase of the received signal to signal construction circuit 130, and arithmetic circuit 216 can be configured so as to provide the first output (and optional second and third outputs, if present) to signal construction circuit 130 illustrated in FIGS. 1A-1B for use in constructing an output signal based on the phase and the first (and optional second and third) outputs.

FIG. 2D schematically illustrates selected components of an exemplary threshold circuit for use in reducing an interference signal that spectrally overlaps a desired signal by applying a first threshold to that signal, according to some embodiments of the present invention. In the exemplary embodiment illustrated in FIG. 2D, the first threshold can be applied at the input of the interference suppression circuit. An output amplitude residual $R_o$ can be created by subtracting an average of the input amplitude $A_e$ by an (optionally delayed) input amplitude signal $A_d$. A second input amplitude residual $R_i$ can be created by subtracting an average of the input amplitude $A_e$ by the input amplitude A. Based upon the absolute value of the residual $R_i$ being less than the first threshold TH1, then, the amplitude can be input into the averaging circuit, and after an optional delay corresponding to the optional delay of the signal $A_d$, residual $R_o$ is passed to the output Y for further processing. Based on the absolute value of residual $R_i$ being greater than (or equal to) TH1, the input amplitude which caused this large residual can be blocked from the averaging computation, and after an optional delay, a constant value can be sent to the output Y. In FIG. 2D the constant value is zero for illustrative purposes; other values suitable can be used.

Figure 2E:
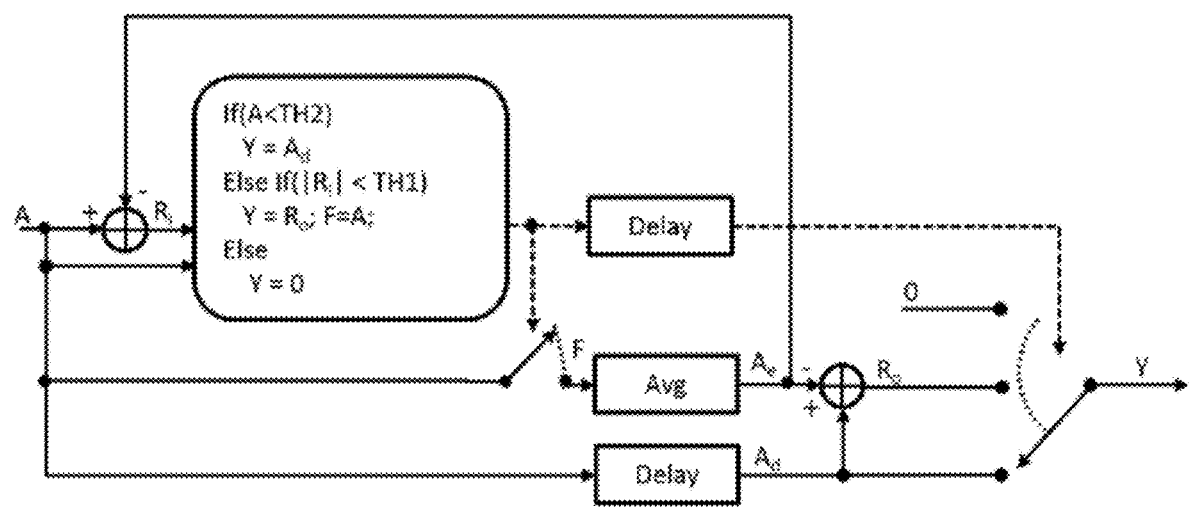
FIG. 2E schematically illustrates selected components of an exemplary threshold circuit for use in reducing an interference signal that spectrally overlaps a desired signal by applying a first and a second threshold to that signal, according to some embodiments of the present invention.

FIG. 2E schematically illustrates selected components of an exemplary threshold circuit for use in reducing an interference signal that spectrally overlaps a desired signal by applying a first and second threshold to that signal, according to some embodiments of the present invention. In the exemplary embodiment illustrated in FIG. 2E, the first and second threshold can be applied at the input of the interference suppression circuit. An output amplitude residual $R_o$ can be created by subtracting an average of the input amplitude $A_e$ by an (optionally delayed) input amplitude signal $A_d$. A second input amplitude residual $R_i$ is created by subtracting an average of the input amplitude $A_e$ by the input amplitude A. Based upon the input amplitude A being less than a second threshold TH2, then that input amplitude can be, after an optional delay (corresponding to the optional delay of the signal $A_d$, residual $R_o$), passed to the output. For example, TH2 can be set such that based upon the interference being sufficiently low, suppression is not necessary for that input amplitude value. Based upon the absolute value of the residual $R_i$ being less than the first threshold TH1, then the amplitude can be input into the averaging circuit, and after an optional delay (corresponding to the optional delay of the signal $A_d$,) residual $R_o$ can be passed to the output Y for further processing. Based upon none of these conditions being met, e.g., based upon |$R_i$| being larger than TH1, the input amplitude which caused this large residual can be blocked from the averaging computation, and after an optional delay, a constant is sent to the output Y. In FIG. 2E, the constant is zero for illustrative purposes; other values suitably can be used.

In an alternative implementation, the first and optional second thresholds and integration period parameters can be adapted based on the characteristics of the measured signal and noise parameters in a manner analogous to that described in U.S. Pat. No. 8,515,335, the entire contents of which are incorporated by reference herein.

Reducing Interference Based on Using a Linear Time Domain Filter in the Amplitude Domain As noted above with reference to FIGS. 1A-1B, interference suppression circuit 120 can be configured so as to receive a signal that includes a desired signal and an interference signal that spectrally overlaps the desired signal, and to reduce the contribution of the interference signal using any suitable circuitry. For example, in some embodiments, interference suppression circuit 120 can be configured to reduce the interference signal based on using a linear time domain amplitude filter, e.g., in a manner such as described with reference to FIGS. 3A-3H. Interference suppression circuit 120 suitably can receive the signal from optional threshold circuit 110, from A/D converter 12, from antenna/analog conditioner 11 or any other suitable source. Although interference suppression circuit 120 is compatible with optional threshold circuit 110, note that threshold circuit 110 suitably can be omitted.

Figure 3A:
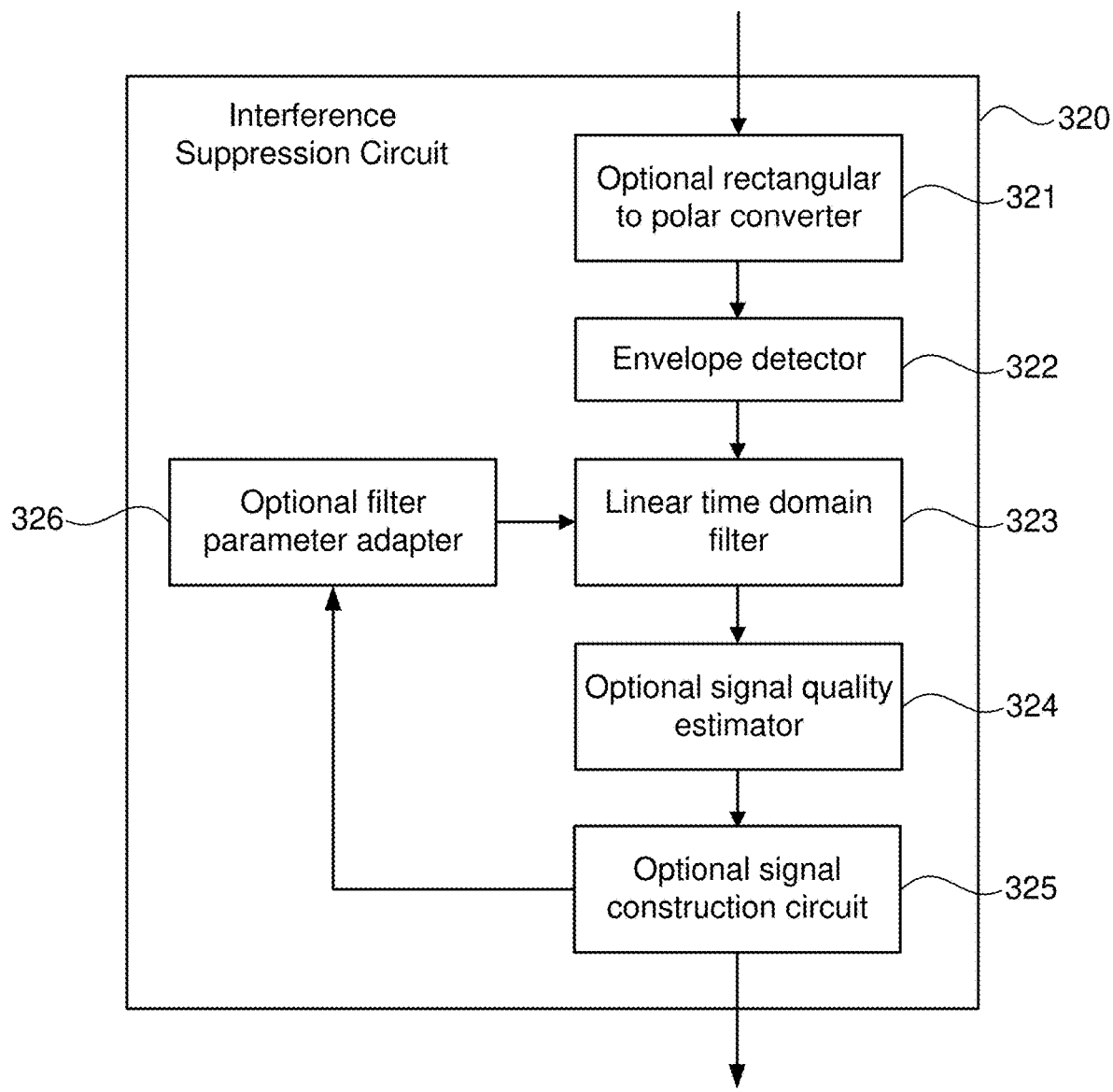
FIG. 3A schematically illustrates an exemplary interference suppression circuit for use in reducing an interference signal that spectrally overlaps a desired signal based on a linear time domain amplitude filter, according to some embodiments of the present invention.

FIG. 3A schematically illustrates an exemplary interference suppression circuit for use in reducing an interference signal that spectrally overlaps a desired signal based on a linear time domain amplitude filter, with optional filter adaptation, according to some embodiments of the present invention. Interference suppression circuit 320 illustrated in FIG. 3A includes optional rectangular to polar converter 321, envelope detector 322, linear time domain amplitude filter 323, optional signal quality estimator 324, optional signal construction circuit 325, and optional filter parameter adapter 326. In some embodiments, linear time domain amplitude filter 323 can be coupled to optional threshold circuit 110 or 210 via a suitable pathway so as to receive amplitudes of the received signal from optional threshold circuit 110 or 210. In other embodiments, interference suppression circuit 320 can include envelope detector 322 configured to receive the signal from optional threshold circuit 110, from A/D converter 12, from antenna/analog conditioner 11, or from any other suitable source, and configured to obtain an amplitude of the received signal. Additionally, the envelope detector 322 optionally can be configured to obtain a phase of the received signal.

For example, in some embodiments, the received signal can be in rectangular coordinates, and interference suppression circuit 320 can include an optional rectangular to polar converter 321 configured to obtain an amplitude and a phase of the received signal. Envelope detector 322 can be coupled so as to provide the amplitude to linear time domain amplitude filter 323, and, in embodiments in which the phase also is obtained, optionally can be coupled so as to provide the phase to signal construction circuit 130 illustrated in FIGS. 1A-1B or to optional signal construction circuit 325 illustrated in FIG. 3A. In one nonlimiting embodiment, the received signal is a digitized baseband signal, and the amplitude circuit is configured to obtain amplitudes and phases of the complex in-phase and quadrature samples of the received baseband signal. Other embodiments may perform signal processing at on the intermediate frequency or radio frequency representation of the signal.

In the exemplary interference suppression circuit in FIG. 3A, linear time domain filter 323 can be configured to as to estimate the amplitude of the interference in the received signal. Some exemplary embodiments of estimating the amplitude of the interference are provided further above with reference to FIGS. 2A-2E. In one nonlimiting embodiment, linear time domain amplitude filter 323 is configured to receive the obtained amplitudes and to output processed amplitudes of the samples with reduced interference. For example, in some embodiments, linear time domain filter 323 includes a time domain notch filter. In some embodiments, linear time domain filter 323 includes a plurality of time domain notch filters, at least one of said time domain notch filters being centered at DC (e.g., a high pass filter). Illustratively, an approximately constant envelope interference signal will have a relatively large DC component in the amplitude domain. The bandwidth of this DC component will depend on how rapidly the envelope varies over time. A high pass filter (e.g., a notch filter centered at DC) with a cutoff bandwidth set to the approximate bandwidth of the interference envelope variation can remove this large amplitude at DC without removing additional amplitude information.

In some embodiments, linear time domain filter 323 operates directly on real-valued amplitude samples of the signal, $A_k = \sqrt{I_k^2 + Q_k^2}$. Linear time domain filter 323 can be unlike an I/Q notch filter that instead would operate on the I and Q samples directly, $z_k = I_k + jQ_k$. By operating in the amplitude domain, the present linear time domain filter 323 can filter out interference components without filtering away the desired signal, even for an interference signal that is spectrally matched to the desired signal. For example, constant envelope signals, when converted to the amplitude domain, have a strong zero-frequency (DC) component. A high pass filter can be viewed as a differentiator. Therefore a high pass filter (e.g., a notch filter centered at DC) in the amplitude domain can be used to perform an operation analogous to that performed in steps 202 and 203 of method 200 described above with reference to FIG. 2B, .e.g., the high pass filter can be configured so as to remove the low frequency constant amplitude component. Whereas some embodiments of steps 202 and 203 of method 200 (with reference to FIG. 2B) can explicitly estimate (e.g., via averaging) and then subtract the low-frequency content, a high pass filter removes the low frequency content in one filtering operation.

In some embodiments, interference suppression circuit 320 also includes circuitry, e.g., optional filter parameter adapter 326, configured to adaptively adjust linear time domain filter 323, e.g., so as to minimize an interference to noise ratio (INR) or to maximize a carrier power to noise spectral density ratio (C/No) or a signal to noise ratio (SNR). Illustratively, such circuitry can be configured so as to use a LMS or similar algorithm so as automatically to minimize one or more of such metrics, which can be estimated by a receiver, digital processor, or the like. The filter parameters also can be manually adjusted so as to enhance performance for a given interference type. Optional filter parameter adapter 326 can be coupled to optional signal construction circuit 325 and configured so as to adaptively adjust linear time domain filter 323 based on one or more characteristics of the signal, e.g., one or more metrics of signal quality such as estimated by optional signal quality estimator 324 coupled between linear time domain filter 323 and optional signal construction circuit 325. For example, optional signal quality estimator 324 can be configured so as to estimate a signal quality metric; and optional filter parameter adaptor 325 can be configured so as to adaptively adjust one or more parameters of linear time domain filter 323 so as to optimize said signal quality metric.

In some embodiments, interference suppression circuit 320 illustrated in FIG. 3A is coupled to optional signal construction circuit 325 configured to generate an output baseband signal with reduced interference based on the phases and the processed amplitudes of the samples. In some embodiments, signal construction circuit 325 illustrated in FIG. 3A or signal construction circuit 130 illustrated in FIGS. 1A-1B can be coupled to linear time-domain amplitude filter 323 so as to receive therefrom processed amplitudes of the samples with reduced interference, and can be coupled to an amplitude circuit (e.g., amplitude circuit(s) 211 such as described above with reference to FIG. 2A, optional rectangular to polar converter 321 of interference suppression circuit 320) so as to receive therefrom phases of those samples, and can be configured to generate an output baseband signal based thereon.

Examples in which interference is reduced based on an estimate of the amplitude of the interference are provided elsewhere herein, e.g., with reference to FIGS. 2A-2E. It is anticipated that embodiments that reduce or obviate the need to obtain an estimate of the amplitude of the interference, e.g., embodiments in which interference is reduced based on using a linear time domain filter, can effectively be applied in cases where an estimate of the amplitude of the interference may be difficult to obtain, such as at low ISR values. Additionally, the present linear time domain filter can be readily used concurrently with previously known I/Q domain adaptive notch filters and spatial-nulling algorithms by simultaneously optimizing filter weights in the I/Q domain, amplitude domain, and spatial domain to realize enhanced performance using an increased number of degrees of freedom, so as to mitigate an interference signal.

For example, as applied to suppression of interference in communication or navigation systems, an adaptive temporal amplitude filter can be used to notch out the frequency components of the interference that vary differently than do the frequency components of the desired signal. Illustratively, based upon the amplitude of the interference signal being substantially constant, or slowly varying relative to the rate of the desired signal, the frequency spectrum of the interference amplitude can appear to be narrow relative to that of the desired signal, even if the frequency spectra of the interference signal and the desired signal completely overlap in the I/Q domain. Alternatively, one or more adaptive linear time domain filters can be used to mitigate interference having an envelope that varies in time and produces non-zero frequency components in the amplitude domain (non-constant envelope).

Figure 3B:
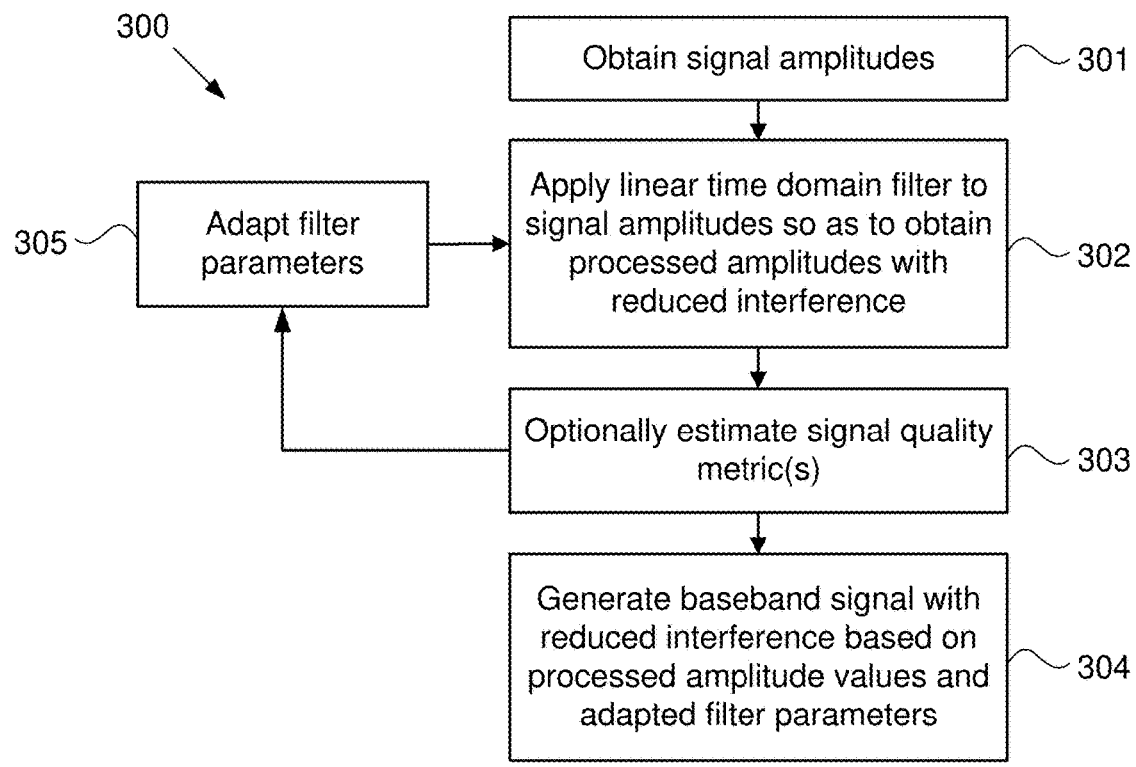
FIG. 3B illustrates steps in an exemplary method for reducing an interference signal that spectrally overlaps a desired signal based on a linear time domain amplitude filter, according to some embodiments of the present invention.

FIG. 3B illustrates steps in an exemplary method for reducing an interference signal that spectrally overlaps a desired signal based on a linear time domain amplitude filter, according to some embodiments of the present invention. In some embodiments, method 300 can be used so as to process complex in-phase and quadrature samples of a baseband signal that includes a desired signal and an interference signal that spectrally overlaps the desired signal. Illustratively, method 300 can include obtaining amplitudes (and optionally also phases) of at least a first subset of the complex in-phase and quadrature samples of the received baseband signal (step 301). For example, in some embodiments, interference suppression circuit 320 described above with reference to FIG. 3A can include envelope detector 322 configured to obtain the amplitudes, and optionally also the phases, of in-phase and quadrature samples of the received baseband signal. In other embodiments, other circuitry can be configured so as to obtain such amplitudes and phases.

Method 300 illustrated in FIG. 3B also includes applying a linear time domain filter to the amplitudes so as to obtain processed amplitudes of the samples with reduced interference (step 302). For example, linear time domain amplitude filter 323 can process the amplitudes of the samples in a manner such as described above with reference to FIG. 3A so as to obtain processed amplitudes of the samples with reduced interference. Method 300 illustrated in FIG. 3B further can include generating an output baseband signal with reduced interference based on the phases and the processed amplitudes of the samples (step 303). For example, linear time domain amplitude filter 323 illustrated in FIG. 3A can provide to optional signal construction circuit 325 or to signal construction circuit 130 illustrated in FIGS. 1A-1B the processed amplitudes, and envelope detector 322 such as provided in interference suppression circuit 320 of FIG. 3A or envelope detector 212 of threshold circuit 210 of FIG. 2A can provide to signal construction circuit 130 or 325 the phases, based upon which signal construction circuit 130 or 325 can generate an output baseband signal with reduced interference.

As noted above, in some embodiments, the linear time domain filter includes a time domain notch filter. In some embodiments, the linear time domain filter includes a plurality of time domain notch filters, at least one of said time domain notch filters being centered at DC (e.g., a high pass filter), at least one of said time domain notch filters not being centered at DC. In some embodiments, method 300 further includes adaptively adjusting said linear time domain filter so as to minimize an interference to noise ratio (INR) or to maximize a carrier power to noise spectral density ratio (C/No) or a signal to noise ratio (SNR), e.g., using any suitable combination of optional signal quality estimator 324 and optional filter parameter adapter 326 illustrated in FIG. 3A.

Figure 3C:
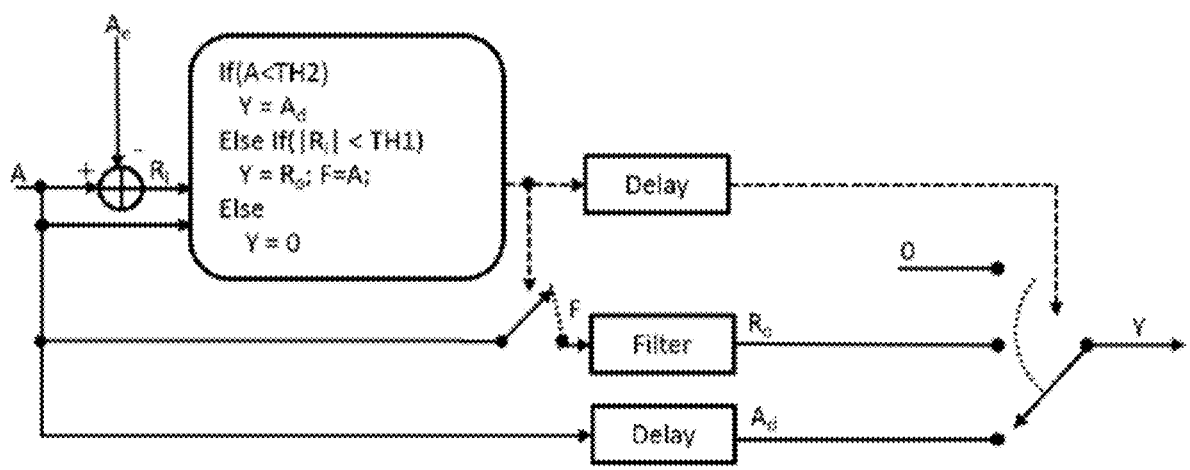
FIG. 3C schematically illustrates exemplary circuit components configured to apply exemplary thresholds to an exemplary signal that includes an interference signal that spectrally overlaps a desired signal, according to some embodiments of the present invention.

FIG. 3C schematically illustrates exemplary circuit components configured to apply exemplary thresholds to an exemplary signal that includes an interference signal that spectrally overlaps a desired signal, according to some embodiments of the present invention. In the exemplary embodiment illustrated in FIG. 3C, two amplitude thresholds are defined such that interference suppression is performed when the amplitude of a sample of the received signal is above a predetermined first threshold and within a predetermined value relative to a prior estimate of the interference signal. Based upon both of such conditions being satisfied, the interference signal is suppressed by an estimate of the amplitude of that interference signal within the sample. Based upon either of such conditions not being satisfied, the sample is inhibited from contributing to future amplitude estimates by gating the input to an estimation circuit (e.g., filter), and the value of the sample amplitude is replaced by a constant value less than or equal to the average noise amplitude, in a manner similar to that described above with reference to FIGS. 2A-2E.

In the exemplary embodiment illustrated in FIG. 3C, an output amplitude residual $R_o$ is created by filtering the input amplitude signal "A" with at least a high pass notch filter. The filter may also include notches at other frequencies, and may include a combination of several filters, and can have an arbitrary frequency response that includes at least some rejection of the DC component. An (optionally delayed) input amplitude signal $A_d$ is produced from the input amplitude signal, "A". An average of the input amplitude A, denoted here as "$A_e$" is obtained from a separate circuit (e.g., amplitude averager 213 illustrated in FIG. 2A), not shown. This average amplitude is denoted Ae in figure FIG. 3C. A second input amplitude residual $R_i$ is created by subtracting an average of the input amplitude Ae from the input amplitude A (e.g., using a circuit such as residual computation circuit 215 describe above with reference to FIG. 2A). Based upon the input amplitude A being less than a second threshold TH2, then that input amplitude is blocked from entering the filter, and after an optional delay (corresponding to the optional delay of the signal $A_d$, residual $R_o$), that input amplitude is passed to the output. In such a manner, TH2 can be set such that the interference is low enough such that suppression is not necessary for that input amplitude value. Based upon the input amplitude residual being less than a first threshold TH1, then, the amplitude can be input into the filter and after an optional delay corresponding to the optional delay of the signal $A_d$, residual $R_o$ can be passed to the output Y for further processing. Based upon none of these conditions are met, e.g., based upon $R_i$ being larger than (or equal to) TH1, the input amplitude which caused this large residual can be blocked from the averaging computation, and after an optional delay, a constant is sent to the output Y. In FIG. 3, the constant is zero for illustrative purposes; other values suitably can be used.

In an alternative implementation, the first and optional second thresholds and integration period parameters can be adapted based on the characteristics of the measured signal and noise parameters in a manner analogous to that described in U.S. Pat. No. 8,515,335, the entire contents of which are incorporated by reference herein.

Figure 3D:
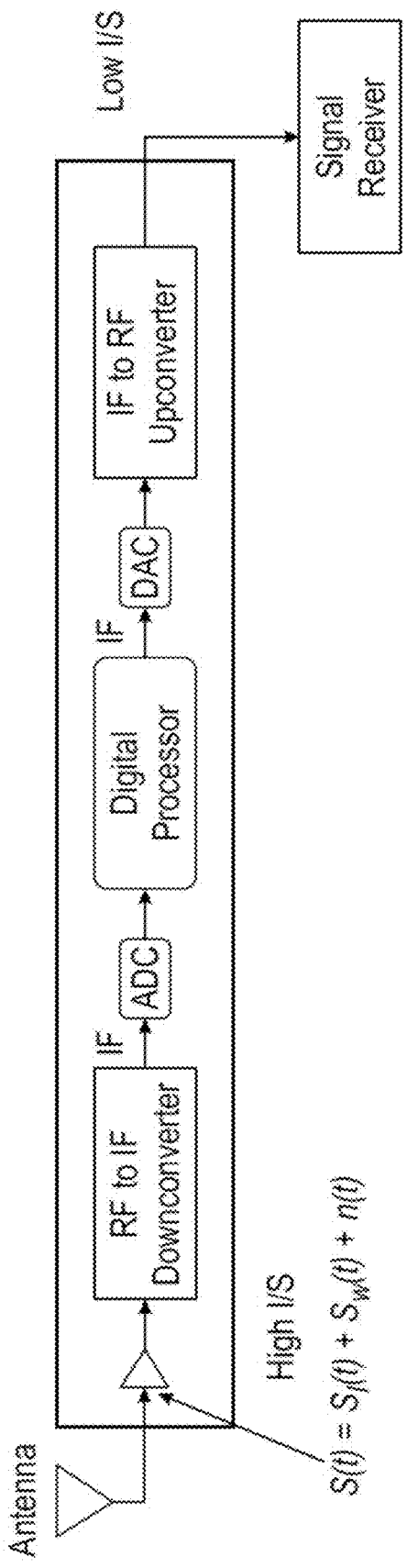
FIG. 3D schematically illustrates selected components of an exemplary appliqué implementation for reducing an interference signal that spectrally overlaps a desired signal based on a linear time domain amplitude filter, according to some embodiments of the present invention.

Signal processing based on linear time domain filters, such as provided herein, can be implemented using any suitable combination of hardware and software, e.g., can be implemented as an appliqué, as a signal processing circuit, or as an algorithm in a suitably programmed radio frequency receiver. For example, FIG. 3D schematically illustrates selected components of an exemplary appliqué implementation for reducing an interference signal that spectrally overlaps a desired signal based on a linear time domain amplitude filter, according to some embodiments of the present invention. In the embodiment of FIG. 3D, the signal processing is implemented as an appliqué in which a suitably programmed processor reduces the interference power to signal ratio (FS). In the embodiment illustrated in FIG. 3D, an antenna receives a composite radio frequency (RF) signal S(t) in which the desired signal $S_w(t)$ is corrupted by relatively strong interference $S_I(t)$ and by noise n(t), S(t) $=S_w(t)+S_I(t)+n(t)$. The composite signal S(t) is amplified by a low noise amplifier (LNA), then translated to an intermediate frequency (IF) using a downconverter where it is sampled by an analog-to-digital converter (ADC) and digitally converted to an in-phase (I) and quadrature (Q) baseband signal inside of the digital processor. The processor processes the in-phase and quadrature signals in a manner using a linear time domain filter in a manner such as described above with reference to FIGS. 3A-3B, so as to generate an output baseband signal with reduced interference. The processed in-phase and quadrature baseband signals then are converted back to an IF carrier, where they are converted to analog signals using a digital-to-analog converter (DAC) and translated back to RF using an upconverter before they enter an RF receiver.

Figure 3E:
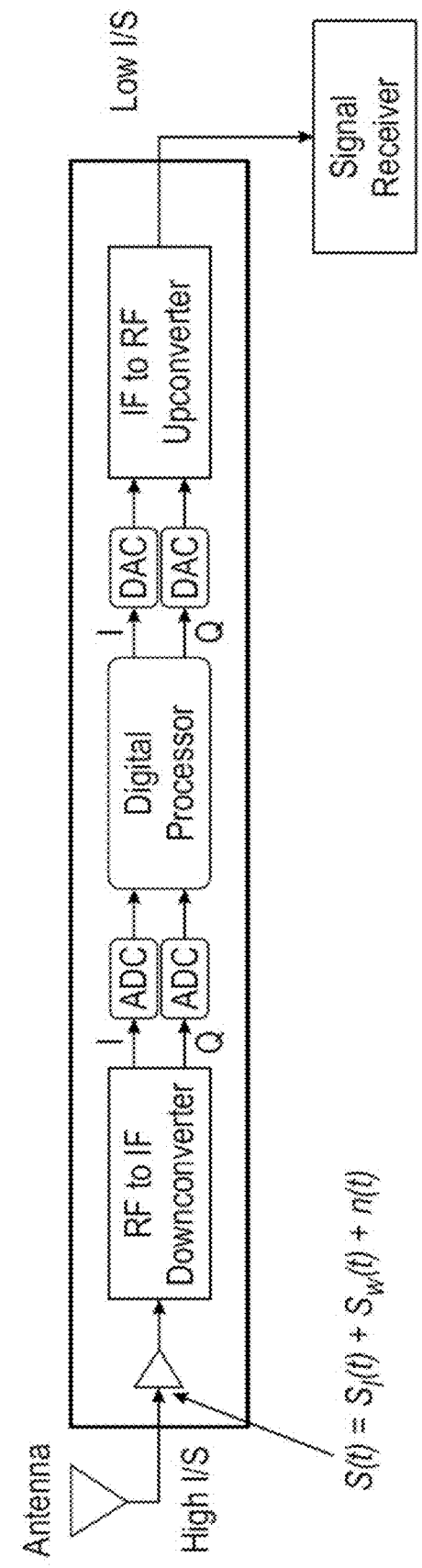
FIG. 3E schematically illustrates selected components of an alternative exemplary appliqué implementation for reducing an interference signal that spectrally overlaps a desired signal based on a linear time domain amplitude filter, according to some embodiments of the present invention.

FIG. 3E schematically illustrates selected components of an alternative exemplary appliqué implementation for reducing an interference signal that spectrally overlaps a desired signal. In the illustrative implementation illustrated in FIG. 3E, the signals are converted to and from I/Q (baseband) in the RF domain. In that implementation, the I and Q signals are digitized using two ADCs (one for I and one for Q), then processed directly by the processor without further translation. After passing through the processor, the processed I and Q signals are converted to the analog domain using two DACs. In both cases, the processor reduces the interference into the receiver. Note that the embodiments illustrated in FIGS. 3D and 3E suitably can be applied to any aspect of the present circuits and methods, e.g., time domain filtering, power domain analysis, or multiple clusters. FIGS. 3D and 3E illustrate two exemplary ways to implement one or more of such techniques in the form of an add-on appliqué to a receiver.

In some embodiments, the present circuits and methods can transform a high I/S ratio into a low I/S ratio after processing. In some embodiments, a processing device in the receiver can be used such that a DAC and upconversion step need not necessarily be used, and optionally can be omitted, after digital processing. In such embodiments, the receiver's ADC, LNA, and downconverter can be used. The processing device in the receiver can include the receiver's existing processor, or an additional processing device can be connected to a pre-existing receiver processor.

In embodiments such as illustrated in FIGS. 3D and 3E, the processor can include any suitable processing device configured to implement one or more steps of FIG. 3B. Illustratively, the processor can include a digital processor. Devices in the receiver capable of performing the actions of the processor include, but are not limited to, an FPGA, an ASIC, a CPU, a GPU, or other similar digital processing device. Alternatively, digital processors such as illustrated in FIGS. 3D and 3E can be replaced with an analog processor.

Figure 3F:
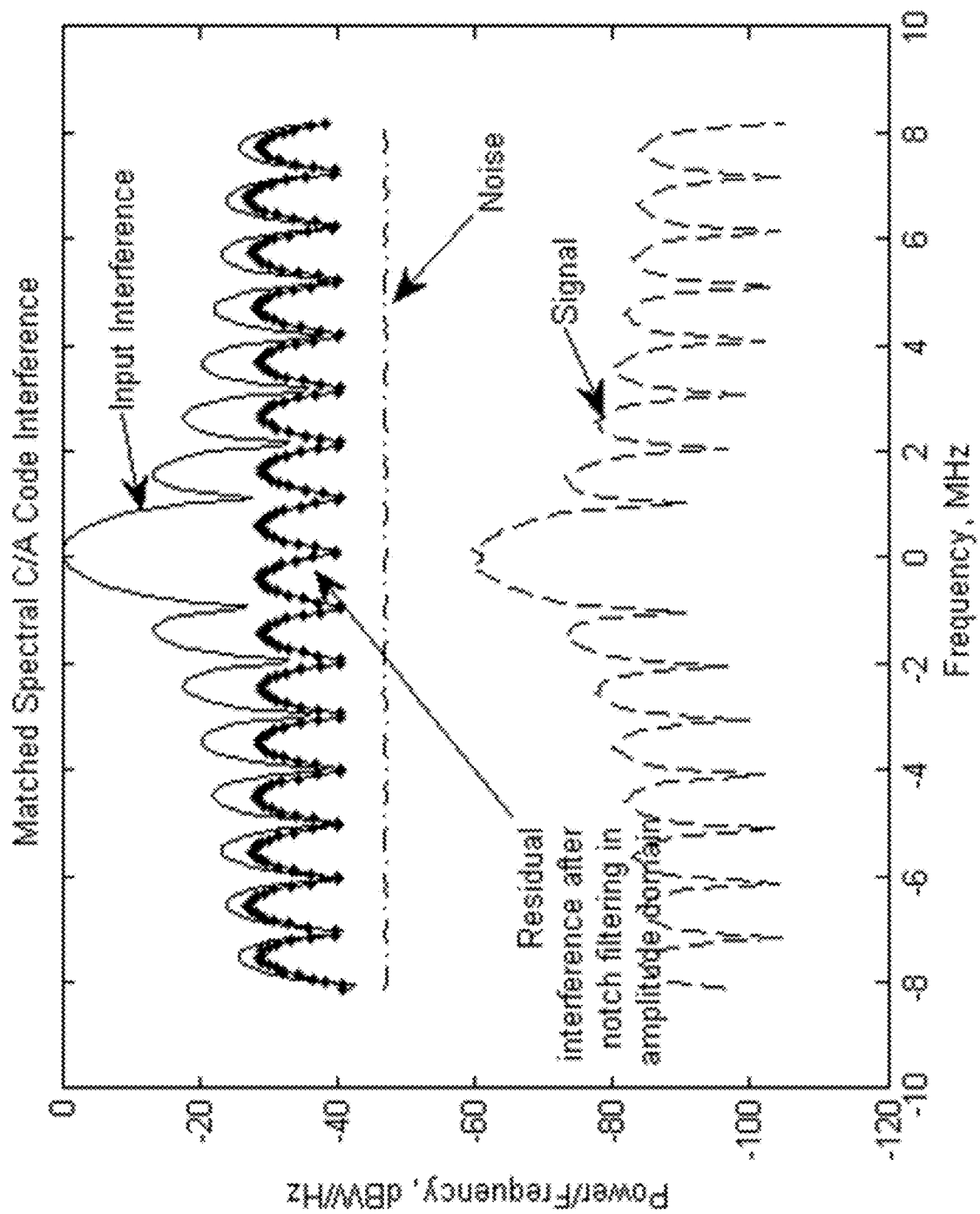
FIG. 3F illustrates the spectrum of an example received spread spectrum signal compared to that of noise and matched spectral interference, according to one non-limiting example of the present invention.
Figure 3G:
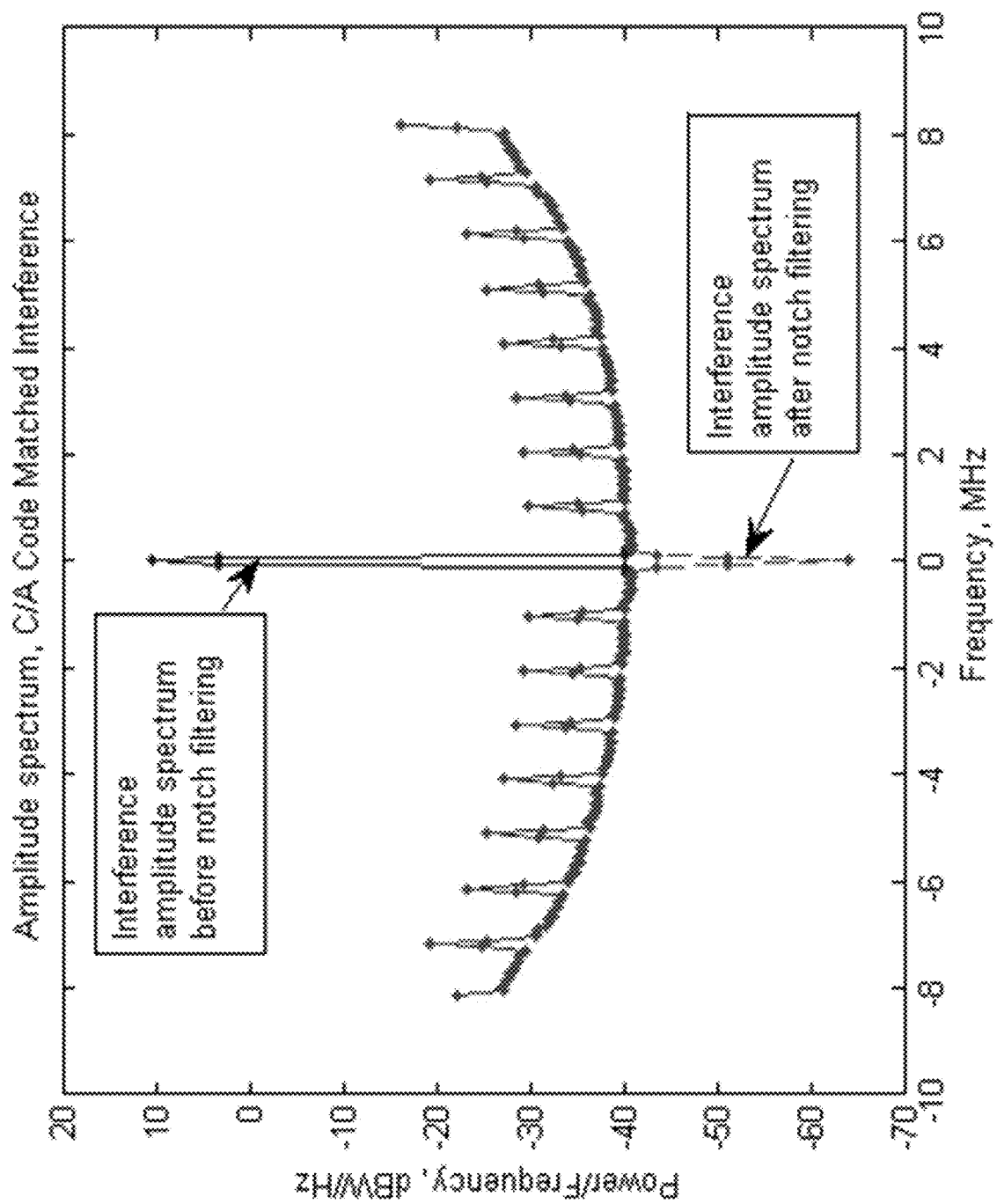
FIG. 3G illustrates the resultant frequency spectrum of the amplitude before and after applying a linear time domain filter to the example signal illustrated in FIG. 3F, according to one non-limiting example of the present invention.

FIG. 3F illustrates the spectrum of an example received spread spectrum signal compared to that of the noise and matched spectral interference. The resultant frequency spectrum after high-pass filtering in the amplitude domain is shown also. Notice that the power of the interference signal has been reduced. The example received signal included a matched spectral C/A code interferer chipped at 1.023 Mchips/sec, with an I/S=60 dB. Note that the interference spectrum in the I/Q domain completely overlaps the signal of interest. As such, application of a temporal notch filter in the I/Q domain can filter not only the interference signal, but also the desired signal. FIG. 3G illustrates the resultant frequency spectrum of the amplitude before and after applying a linear time domain filter to the example signal illustrated in FIG. 3F, according to some embodiments of the present invention. In this example, the linear time domain filter included a time-domain high-pass Butterworth filter, which can be considered to be equivalent to a notch filter at zero frequency in the amplitude domain. The Butterworth filter's stopband attenuation was 80 dB, the passband frequency was 700 kHz, and the stop-band frequency was 5.8 kHz. Alternative linear time domain filters also can be used. The spectrum illustrated in FIG. 3G is related to the Fourier transform of the amplitude samples. From FIG. 3G, it can be understood that although the interference signal completely overlaps the desired signal in the I/Q spectral domain, the interference signal is localized in the amplitude domain. Additionally, from FIG. 3G, it can be understood that the filter reduces the large center peak due to the interference signal. A linear time domain filter, e.g., a time domain high-pass Butterworth filter or other suitable filter, can be adapted so as to remove such interference while reducing or inhibiting impact on the desired signal.

Figure 3H:
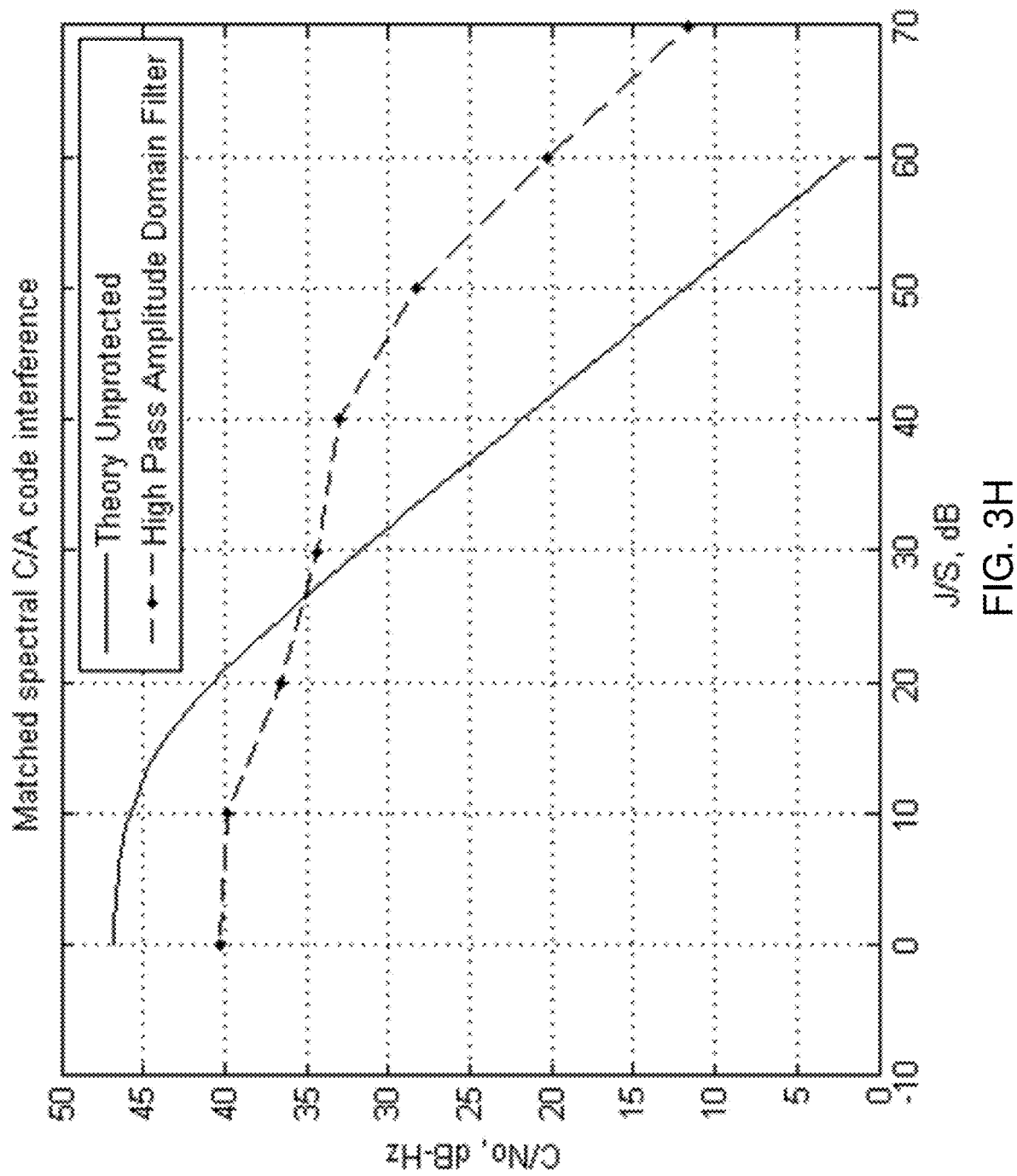
FIG. 3H illustrates a comparison of the C/No for interference suppression based on applying a linear time domain filter to the example signal illustrated in FIG. 3F, according to one non-limiting example of the present invention.

FIG. 3H illustrates a comparison of the C/No for interference suppression based on applying a linear time domain filter to the example signal illustrated in FIG. 3F, according to some embodiments of the present invention. In this example, the "high pass amplitude domain filter" curve was prepared by applying the Butterworth filter described above with reference to FIG. 3G, and applying that Butterworth filter in the amplitude domain with reference to FIG. 3B, and the "theory unprotected" curve was prepared without attempting to suppress interference. From FIG. 3H, it can be understood that applying a high pass filter in the time domain suppresses interference. As in known in the art, C/No is a measure of the quality of the desired C/A code signal. A high C/No ratio indicates good signal quality. As can be seen from FIG. 3H, at a J/S ratio of 60 dB, the unprotected receiver has less than 5 dB of C/No, while the receiver which has a time domain high pass notch implemented can achieve 20 dB of C/No, showing that the interference has been suppressed without completely removing the desired signal.

Accordingly, it can be understood that the present linear time domain filters provide an effective amplitude domain interference suppression technique that can be readily integrated, for example, with existing adaptive antenna suppression systems so as to provide additional degrees of freedom for improved performance of modern mean-forming null-steering antijam antenna systems, as well as other exemplary systems such as mentioned elsewhere herein.

Reducing Interference Based on Using a Non-Unity Power of the Amplitude of the Signals Some embodiments of the present invention can separate the desired signal from the interference signal in one or more alternate domains, some or all of which are a non-linear function of the signal amplitude. Illustratively, an amplitude domain processing technique can be used together with a non-linear function domains so as to enhance interference suppression against a wider range of interference types. Additionally, or alternatively, processing can be performed in a plurality of domains, including any suitable combination of the polar amplitude domain, I/Q domain, and non-linear amplitude domain, e.g., so as to mitigate a wide range of interference types. Non-linear amplitude domains can be expressed as $D(n)=A^n$, where A corresponds to amplitude and n is a real number that is not equal to 1 or 0. As one nonlimiting example in which n=2, interference suppression can be performed in the power ($A^2$) domain of the signals.

For example, as noted above with reference to FIGS. 1A-1B, interference suppression circuit 120 can be configured so as to receive a signal that includes a desired signal and an interference signal that spectrally overlaps the desired signal, and to reduce the contribution of the interference signal using any suitable circuitry. For example, in some embodiments, interference suppression circuit 120 can be configured to reduce the interference signal based on using a non-unity power of the amplitude of the received signal, e.g., in a manner such as described with reference to FIGS. 4A-4L. Interference suppression circuit 120 suitably can receive the signal from optional threshold circuit 110, from A/D converter 12, from antenna/analog conditioner 11 or any other suitable source. Although interference suppression circuit 120 is compatible with optional threshold circuit 110, note that optional threshold circuit 110 suitably can be omitted.

Figure 4A:
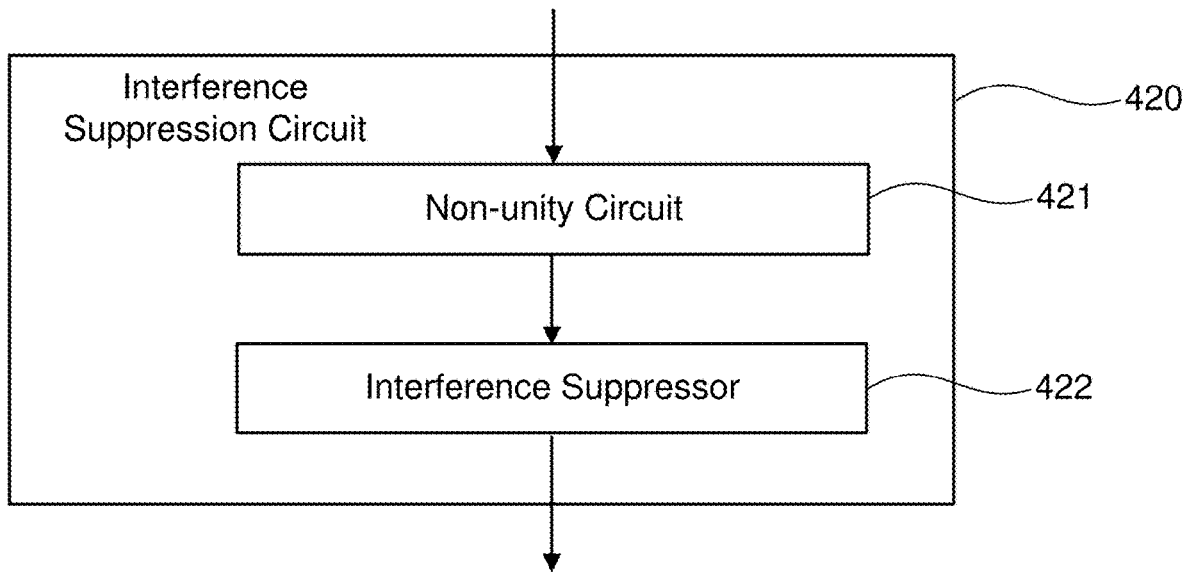
FIG. 4A schematically illustrates an exemplary interference suppression circuit for use in reducing an interference signal that spectrally overlaps a desired signal based on a non-unity power of the amplitude of the signals, according to some embodiments of the present invention.

FIG. 4A schematically illustrates an exemplary interference suppression circuit for use in reducing an interference signal that spectrally overlaps a desired signal based on a non-unity power of the amplitude of the signals, according to some embodiments of the present invention. In the nonlimiting embodiment illustrated in FIG. 4A, circuit 420 includes non-unity circuit 421 and interference suppressor 422. In some embodiments, non-unity circuit 421 can be coupled to optional threshold circuit 110 via a suitable pathway so as to receive amplitudes of the received signal from threshold circuit 110. In other embodiments, interference suppression circuit can include an amplitude circuit (not specifically illustrated) configured to receive the signal from optional threshold circuit 110, from A/D converter 12, from antenna/analog conditioner 11, or from any other suitable source, and configured to obtain an amplitude of the received signal. Additionally, the amplitude circuit optionally can be configured to obtain a phase of the received signal. For example, in some embodiments, the received signal can be in rectangular coordinates, and the amplitude circuit can include an optional rectangular to polar converter configured to obtain an amplitude and a phase of the received signal. The amplitude circuit can be coupled so as to provide the amplitude to non-unity circuit 421, and, in embodiments in which the phase also is obtained, optionally can be coupled so as to provide the phase to signal construction circuit 130 illustrated in FIGS. 1A-1B. In one nonlimiting embodiment, the received signal is a digitized baseband signal, and the amplitude circuit is configured to obtain amplitudes and phases of the complex in-phase and quadrature samples of the received baseband signal.

Non-unity circuit 421 illustrated in FIG. 4A can be configured to obtain a first non-unity power of amplitude of the received signal, and optionally also to obtain a phase of the received signal; alternatively, the phase of the received signal can be obtained by another circuit such as mentioned elsewhere herein. Illustratively, the non-unity power to which A is raised can be ½, 2, ⅓, 3, or more than 3, or any other suitable value that is not equal to 1. In some embodiments, the particular non-unity power can be based upon the interference signal type received. For example, some interference signal types may be more separable from the desired signal by using a given non-unity power domain than they are by using a unity power domain, or by using a different particular non-unity power. FIG. 4C is a plot of the frequency spectra of components of an exemplary received signal, according to one nonlimiting example of the present invention. More specifically, FIG. 4C shows the spectrum of a desired C/A code signal with the spectrum of an interference signal which is a BPSK signal with a 1.023 MHz symbol rate which has been further AM modulated with 0.9 MHz sine wave. As is known in the art, multiplying the BPSK signal by a 0.9 MHz sine wave produces two "subcarriers" at +/−0.9 MHz, as can be seen in the interference signal of FIG. 4C. The amplitude spectrum and power spectrum frequency content of both the amplitude and the squared amplitude of this AM-modulated BPSK signal is shown in FIG. 4D, which is a plot of the frequency spectra of the amplitude and the power for the exemplary received signal of FIG. 4C. The spectrum of the amplitude in FIG. 4D shows peaks at multiple frequencies spaced every 2*0.9 MHz that fold back at the Nyquist frequency. Interference suppression could be performed on this amplitude signal by notching every peak seen in the FFT of the amplitude, however, it could also be performed by notching every peak seen in the FFT of the square of the amplitude. The FFT of the square of the amplitude of this exemplary AM-modulated BPSK interferer is also shown in FIG. 4D, and it is clear that there are fewer peaks to excise/notch in the squared amplitude spectrum as compared to the amplitude spectrum. Accordingly, less of the desired signal can be removed when removing the interference signal when excising peaks in the FFT of the squared amplitude, as compared to excising peaks in the FFT of the amplitude. The non-unity power can be chosen based upon the interference signal type, so as to reduce or to minimize the loss incurred when excising the interference. In one example, non-unity circuit 421 illustrated in FIG. 4A can be configured to obtain the first non-unity power of the amplitude directly based upon in-phase and quadrature components of the received signal. As another example, non-unity circuit 421 can be configured to obtain the first non-unity power of the amplitude based on determining an amplitude based upon in-phase and quadrature components of the received signal, and then taking that amplitude to a first non-unity power. Exemplary hardware implementations of non-unity circuit 421 include circuits that use multipliers configured so as to multiply the amplitude by itself, to achieve a non-unity power of 2 for example.

In the embodiment illustrated in FIG. 4A, interference suppression circuit 420 also includes an interference suppressor 422 configured to apply an interference suppression algorithm to the non-unity power of the amplitude to output a processed amplitude with reduced contribution from the interference signal. Interference suppressor 422 can be coupled to non-unity circuit 421 via any suitable pathway so as to receive the first non-unity power of the amplitude therefrom. In some embodiments, the interference suppression algorithm includes one or more of frequency domain excision, time domain filtering, and wavelet excision. Illustratively, the time domain filtering can include application of a time domain notch filter at DC (e.g., a high pass filter) or a time domain notch filter with multiple notches. The interference can also be suppressed in the frequency domain of the non-unity power signal. For example, the FFT of the non-unity power signal can be computed, and frequency domain excision performed. Exemplary hardware implementations of interference suppressor include circuits that perform FFT excision. FFT excision, as is known in the art, includes performing an FFT, finding the largest peaks in the resulting frequency domain signal, setting those FFT bins to zero or some constant value, and subsequently performing an IFFT of the signal. For illustrative purposes, based upon non unity circuit 421 being configured to raise the amplitude to a power of 2, then, following the IFFT, another circuit (not specifically illustrated) would take the square root of the resulting IFFT signal to return back to the amplitude domain.

In some embodiments, interference suppression circuit 420 illustrated in FIG. 4A is coupled to a signal construction circuit configured to generate an output signal with reduced contribution from the interference signal interference based on a phase and the processed amplitude. For example, signal construction circuit 130 illustrated in FIGS. 1A-1B can be coupled to interference suppressor 422 so as to receive therefrom a processed amplitude with reduced interference, and can be coupled to an amplitude circuit (e.g., amplitude circuit(s) 211 such as described above with reference to FIG. 2A, or an amplitude circuit of interference suppression circuit 420, not specifically illustrated) so as to receive therefrom phases of those samples, and can be configured to generate an output signal based thereon.

Optionally, interference suppressor 422 illustrated in FIG. 4A further can be configured to apply interference suppression to the amplitude of the received signal, and to output the processed amplitude based on the interference suppressed amplitude. For example, interference suppressor 422 can include a linear time domain amplitude filter 323 such as described above with reference to FIG. 3A, or can be configured to reduce the interference signal based on an estimate of the amplitude of the interference in the received signal, such as described above with reference to FIGS. 2A-2E.

As another option, non-unity circuit 421 optionally can be configured to obtain a second non-unity power of the amplitude, wherein the first non-unity power is different than the second non-unity power. Interference suppressor 422 further can be configured to apply interference suppression to the second non-unity power of the amplitude to output the processed amplitude based on the interference suppressed second non-unity power of the amplitude.

Figure 4B:
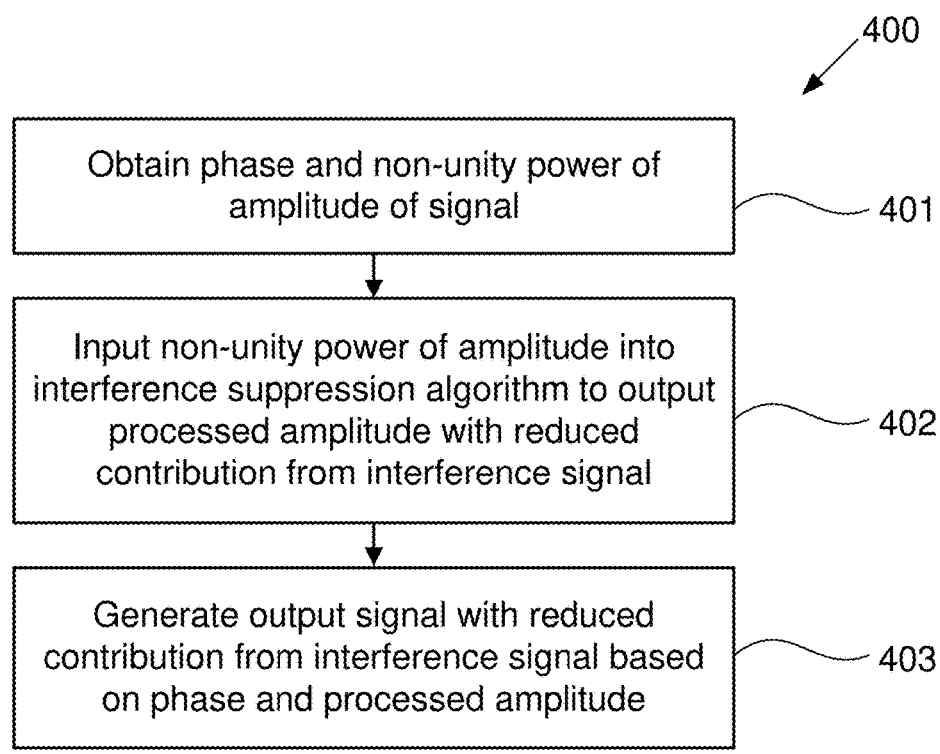
FIG. 4B illustrates steps in an exemplary method for reducing an interference signal that spectrally overlaps a desired signal based on a non-unity power of the amplitude of the signals, according to some embodiments of the present invention.
Figure 4C:
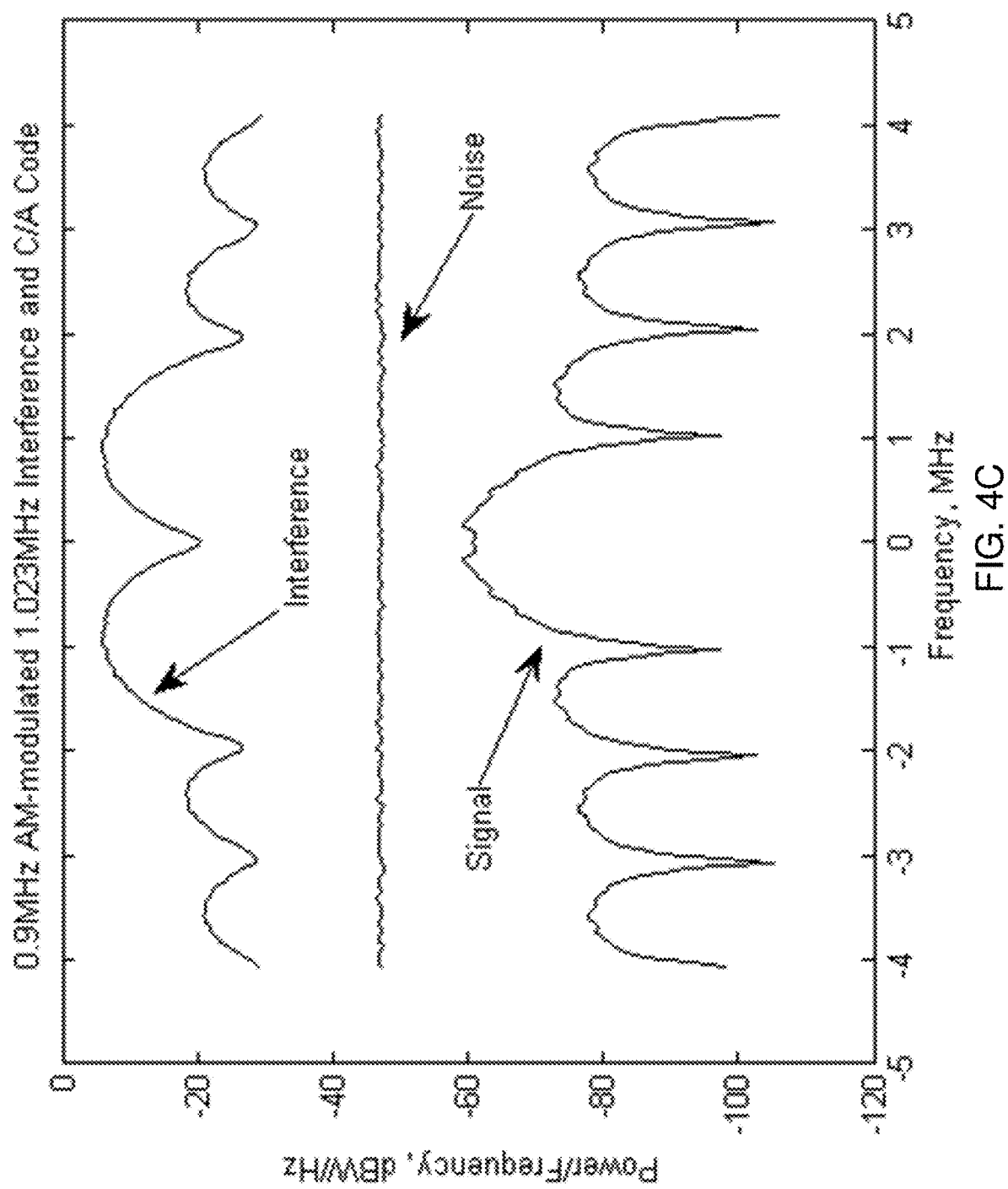
FIG. 4C is a plot of the frequency spectra of components of an exemplary received signal, according to one non-limiting example of the present invention.
Figure 4D:
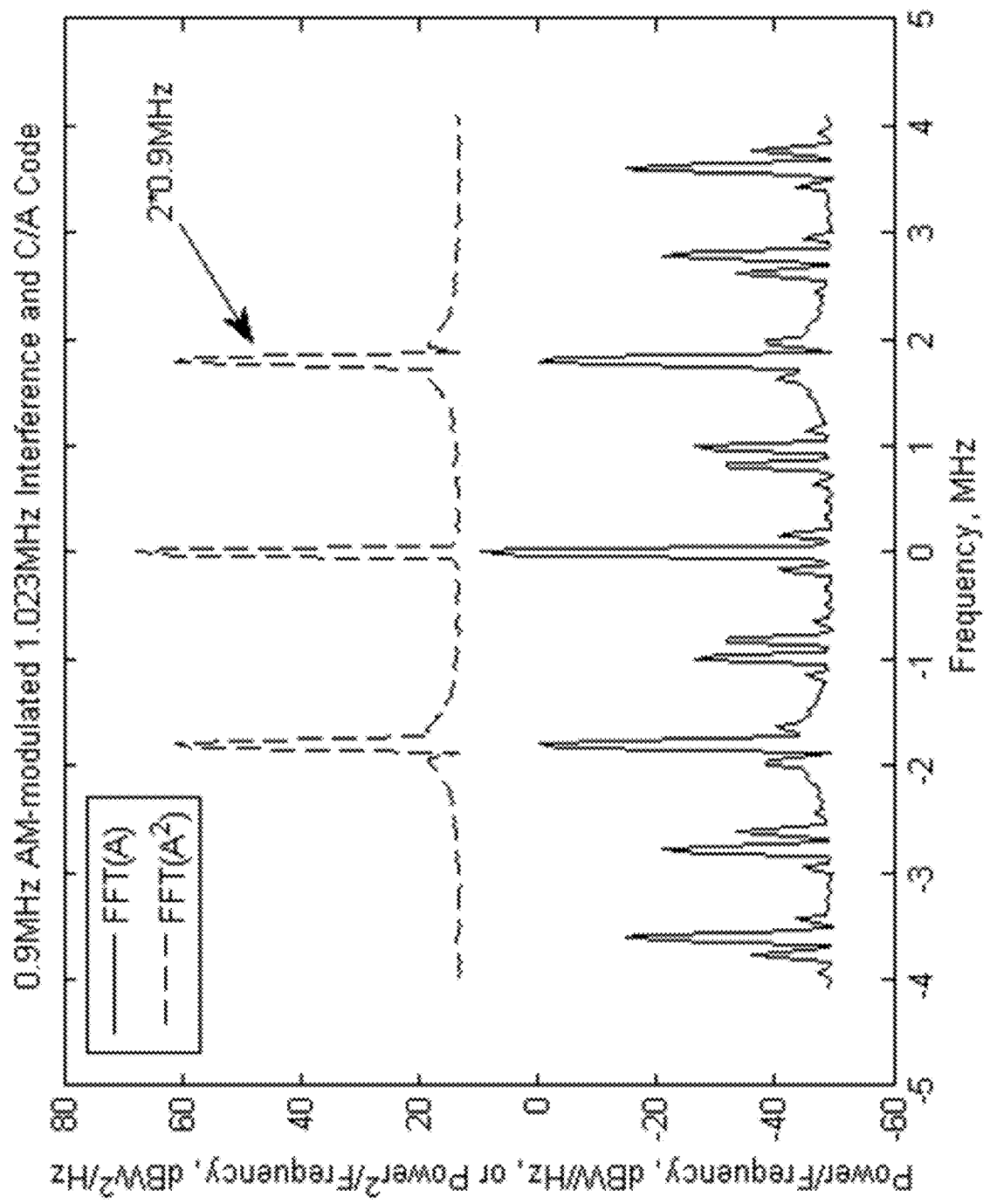
FIG. 4D is a plot of the frequency spectra of the amplitude and the power for the exemplary received signal of FIG. 4C, according to one non-limiting example of the present invention.

FIG. 4B illustrates steps in an exemplary method for reducing an interference signal that spectrally overlaps a desired signal based on a non-unity power of the amplitude of the signals, according to some embodiments of the present invention. Method 400 illustrated in FIG. 4B can include obtaining a phase and a first non-unity power of amplitude of the received signal (step 401). As noted above with reference to FIG. 4A, non-unity circuit 421 can be configured to obtain a first non-unity power of amplitude of the received signal, and optionally also to obtain a phase of the received signal; alternatively, the phase of the received signal can be obtained by another circuit such as mentioned elsewhere herein. Illustratively, the non-unity power to which A is raised can be ½, 2, ⅓, 3, or more than 3, or any other suitable value that is not equal to 1. Some signal types may be more separable from the desired signal when raised to a specific non-unity power, depending on the characteristics of the signal. Depending on the interference signal type, a particular non-unity power may incur less signal loss when suppression is performed in that domain versus a different non-unity power. In one example, step 401 includes directly obtaining the first non-unity power of the amplitude based upon in-phase and quadrature components of the received signal. In another example, step 401 includes obtaining the first non-unity power of the amplitude by determining an amplitude based upon in-phase and quadrature components of the received signal, and then taking that amplitude to a first non-unity power.

Method 400 illustrated in FIG. 4B further can include inputting the first non-unity power of the amplitude into an interference suppression algorithm to output a processed amplitude with reduced contribution from the interference signal (step 402). Exemplary interference suppression algorithms that can be applied at step 402 include one or more of frequency domain excision, time domain filtering, wavelet excision, time domain frequency excision, and subtracting an estimated amplitude of the interference signal. Illustratively, the time domain filtering can include applying a time domain notch filter at DC (i.e., a high pass filter).

Method 400 illustrated in FIG. 4B also can include generating an output signal with reduced contribution from the interference signal based on the phase and the processed amplitude. For example, signal construction circuit 130 illustrated in FIGS. 1A-1B can be coupled to interference suppressor 422 illustrated in FIG. 4A so as to receive therefrom a processed amplitude with reduced interference, and can be coupled to an amplitude circuit (e.g., amplitude circuit(s) 211 such as described above with reference to FIG. 2A, or an amplitude circuit of interference suppression circuit 420, not specifically illustrated) so as to receive therefrom phases of those samples, and can be configured to generate an output signal based thereon.

Optionally, method 400 illustrated in FIG. 4B further can include applying interference suppression to the amplitude of the received signal, wherein the processed amplitude is based on the interference suppressed amplitude. For example, interference suppressor 422 illustrated in FIG. 4A can include a linear time domain amplitude filter 323 such as described above with reference to FIG. 3A, or can be configured to reduce the interference signal based on an estimate of the amplitude of the interference in the received signal, such as described above with reference to FIGS. 2A-2E.

As another option, method 400 illustrated in FIG. 4B can include obtaining a second non-unity power of the amplitude, wherein the first non-unity power is different than the second non-unity power, and applying interference suppression to the second non-unity power of the amplitude, wherein the processed amplitude is based on the interference suppressed second non-unity power of the amplitude. For example, interference suppressor 422 illustrated in FIG. 4A can be configured to apply interference suppression to the second non-unity power of the amplitude to output the processed amplitude based on the interference suppressed second non-unity power of the amplitude.

As noted above, non-linear amplitude domains can be expressed as $D(n)=A^n$, where A corresponds to amplitude and n is a real number that is not equal to 1 or 0. As one nonlimiting example in which n=2, interference suppression can be performed in the power ($A^2$) domain of the signals. For example, FIG. 4C is a plot of the spectrum of an exemplary received signal including a desired signal and an interference signal that spectrally overlaps the desired signal. The exemplary received signal illustrated in FIG. 4C includes a 0.9 MHz spectrally overlapping AM modulated BPSK interferer that is 60 dB stronger than the desired signal.

Illustratively, FIG. 4D is a plot of the frequency spectra of the amplitude and the power for the exemplary received signal of FIG. 4C. It can be understood from FIG. 4D that the interference signal is localized to a single frequency in the domain of $A^2$, corresponding to twice the AM rate. As a result, the power ($A^2$) domain substantially does not include aliased harmonics, and the interference can be suppressed without removing the desired signal in a manner such as provided herein. In comparison, the amplitude domain (A) domain includes a significant number of harmonics and other frequency components that can inhibit interference suppression.

In some embodiments of the present invention, suppression of the interference signal within a received signal includes transforming the received signal from the domain of A to the domain of $A^2$ (or other suitable non-linear amplitude domain), then applying a notch filter to remove one or more nonzero frequency components. Alternatively, the input I/Q samples can be directly converted to the domain of $A^2$, after which a notch filter can be applied in the domain of $A^2$. Another alternative would be to remove nonzero interference using a fast Fourier transform (FFT), apply a threshold, and inverse FFT (iFFT) in the $A^2$ or other nonlinear domain. Alternatively, a discrete Fourier transform can be used.

Figure 4E:
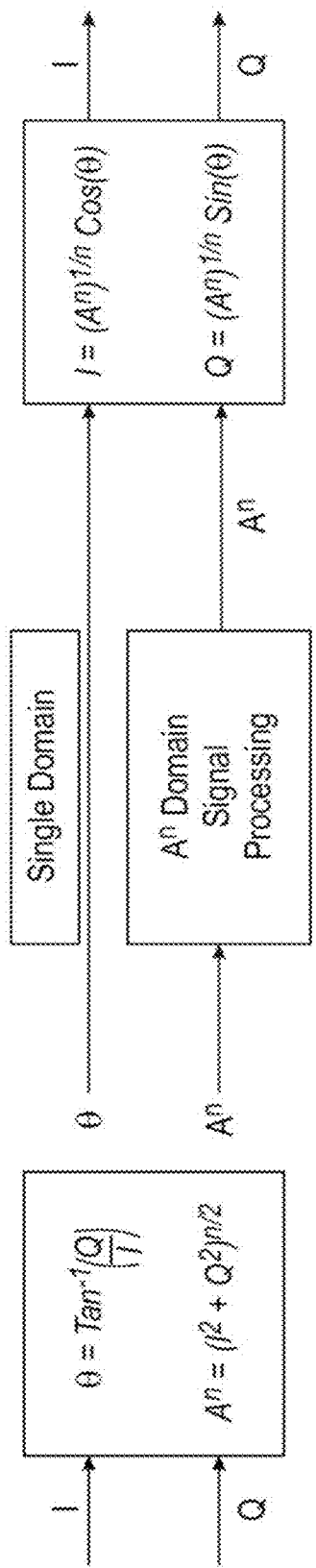
FIG. 4E schematically illustrates selected components of an exemplary interference suppression circuit for use in reducing an interference signal that spectrally overlaps a desired signal based on a non-unity power of the amplitude of the signals, according to some embodiments of the present invention.

Any suitable combination of hardware and software can be used to reduce interference based on a non-unity power ($A^n$, $n \neq 1$) of the amplitude of the received signal. For example, FIG. 4E schematically illustrates selected components of an exemplary interference suppression circuit for use in reducing an interference signal that spectrally overlaps a desired signal based on a non-unity power of the amplitude of the signals, according to some embodiments of the present invention. In FIG. 4E, a suitable circuit or software module obtains the phase θ and non-linear power $A^n$ of the amplitude A based on the in-phase and quadrature components of the received signal. The non-linear power $A^n$ of the amplitude is provided to a suitable circuit or software module that is configured to perform interference suppression (signal processing) on the $A^n$ domain of the received signal so as to reduce the interference signal. The processed signal in the $A^n$ domain and the phase θ then are provided to a suitable circuit or software module that is configured to construct a signal in the I/Q domain that has reduced contribution from the interference signal, based on the processed signal in the $A^n$ domain and the phase θ.

Figure 4F:
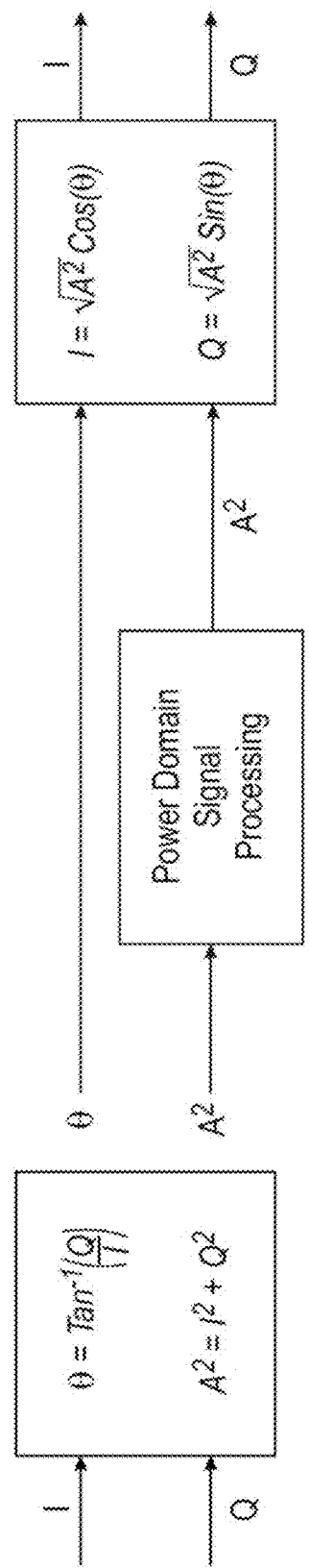
FIG. 4F schematically illustrates selected components of another exemplary interference suppression circuit for use in reducing an interference signal that spectrally overlaps a desired signal based on a non-unity power of the amplitude of the signals, according to some embodiments of the present invention.

Note that the circuit illustrated in FIG. 4E can perform signal processing in the power domain ($A^2$) or in any other suitable nonlinear amplitude domain, e.g., a non-linear amplitude domain in which the interference can be separated from the desired signal. As one example, FIG. 4F schematically illustrates selected components of another exemplary interference suppression circuit for use in reducing an interference signal that spectrally overlaps a desired signal based on a non-unity power of the amplitude of the signals, according to some embodiments of the present invention. In FIG. 4F, n=2, and signal processing is performed in the power domain of the received signal. As noted elsewhere herein, signal processing (interference suppression) in any other suitable domain for which $n \neq 1$ can be used, optionally in combination with signal processing in the amplitude domain for which n=1.

For example, consider the received amplitude values for the $k^{th}$ sample of the received signal, $A_k^2 = I_k^2 + Q_k^2$. For convenience, $P_k = A_k^2$ can correspond to the sampled power values of the received signal. The phase $\theta_k$ of the $k^{th}$ sample of the signal can be obtained based on:

$$\theta_k = \tan^{-1}\left(\frac{Q_k}{I_k}\right). \tag{7}$$

For power domain ($A^2$) based interference suppression, the FFT or DFT of the $p_k$ samples can be obtained based on:

$$P_k = \sum_{k=0}^{N-1} p_k e^{\frac{-j2\pi kn}{N}} \quad (8)$$

Note that a transform alternatively can be implemented using a cosine transform, short time Fourier transform, or related time/frequency transform in at least one non-linear amplitude domain. Additionally, although use of overlapping FFTs or windowing is not specifically described herein, it should be understood that such techniques suitably can be employed in the nonlinear amplitude domain processing provided herein.

The magnitude $M^K$ of the $k^{th}$ FFT value can be expressed as:

$$M_k = \sqrt{Re^2(P_k) + Im^2(P_k)} \quad (9)$$

After the magnitude values are obtained, such values optionally can be compared to a threshold $M_{TH}$, e.g., by applying:

$$M_k \geq M_{TH}? \quad (10)$$

In some embodiments, the threshold can be selected to be a predetermined level above the interference free bins (for example, 10 times the average magnitude of such bins or can be determined by first measuring the average magnitude of such bins in an interference free environment, and then scaling the threshold according to the ADC attenuation resulting from automatic gain control. As such, the threshold can be optimally set as a function of the interference-to-signal power ratio. Another approach is to set the threshold based on the average of the outer bins, with the assumption that such bins are interference free, such as can be the case for matched spectral interference. As another approach, the threshold can be scaled by the receiver's estimate of the interference to noise ratio or interference to signal ratio.

In some embodiments, for each sample for which $M_K$ is equal to or exceeds $M_{TH}$, indicating the presence of interference, the value of the magnitude can be replaced by a constant $M_0$, where $M_0 \geq 0$. For example, in some embodiments, all values of $M_K$ that satisfy this condition can have their real part set to the average noise floor and their imaginary part set to zero. Alternatively, both real and imaginary parts can be set to constants, e.g., that maximize the signal to noise or C/No after interference suppression.

In some embodiments, for a multiple-domain implementation, e.g., involving both power domain and amplitude domain signal processing, values of $M_K$ that are within a predetermined distance from zero frequency will not be thresholded. In other words, the values of $P_k$ within a predetermined distance from zero frequency can be left unaltered.

After such a step, which can be considered to be an excision, an iFFT or iDFT can be applied according to:

$$\acute{p}_k = \frac{1}{N}\sum_{k=0}^{N-1} P_k e^{\frac{j2\pi kn}{N}} \quad (11)$$

where the prime is intended to denote the excised value of power. The resultant processed amplitude can be expressed as:

$$\acute{A}_k = \sqrt{|\acute{p}_k|} \quad (12)$$

In some embodiments, the magnitude of $\acute{p}_k$ can be obtained before applying the square root to recover the processed amplitude $\acute{A}_k$. Optionally, the amplitude can be retained as a complex quantity for further processing at the expense of power loss.

After removing the interference signal, which can be rapidly varying, in the power ($A^2$) domain, the phase and the processed amplitude $\acute{A}_k$ can be converted back to the I/Q domain, e.g., using:

$$I_k + jQ_k = \acute{A}_k e^{j\Theta_k} \quad (13)$$

where $\Theta_k$ is the original phase of the $k^{th}$ sample before interference suppression.

Figure 4G:
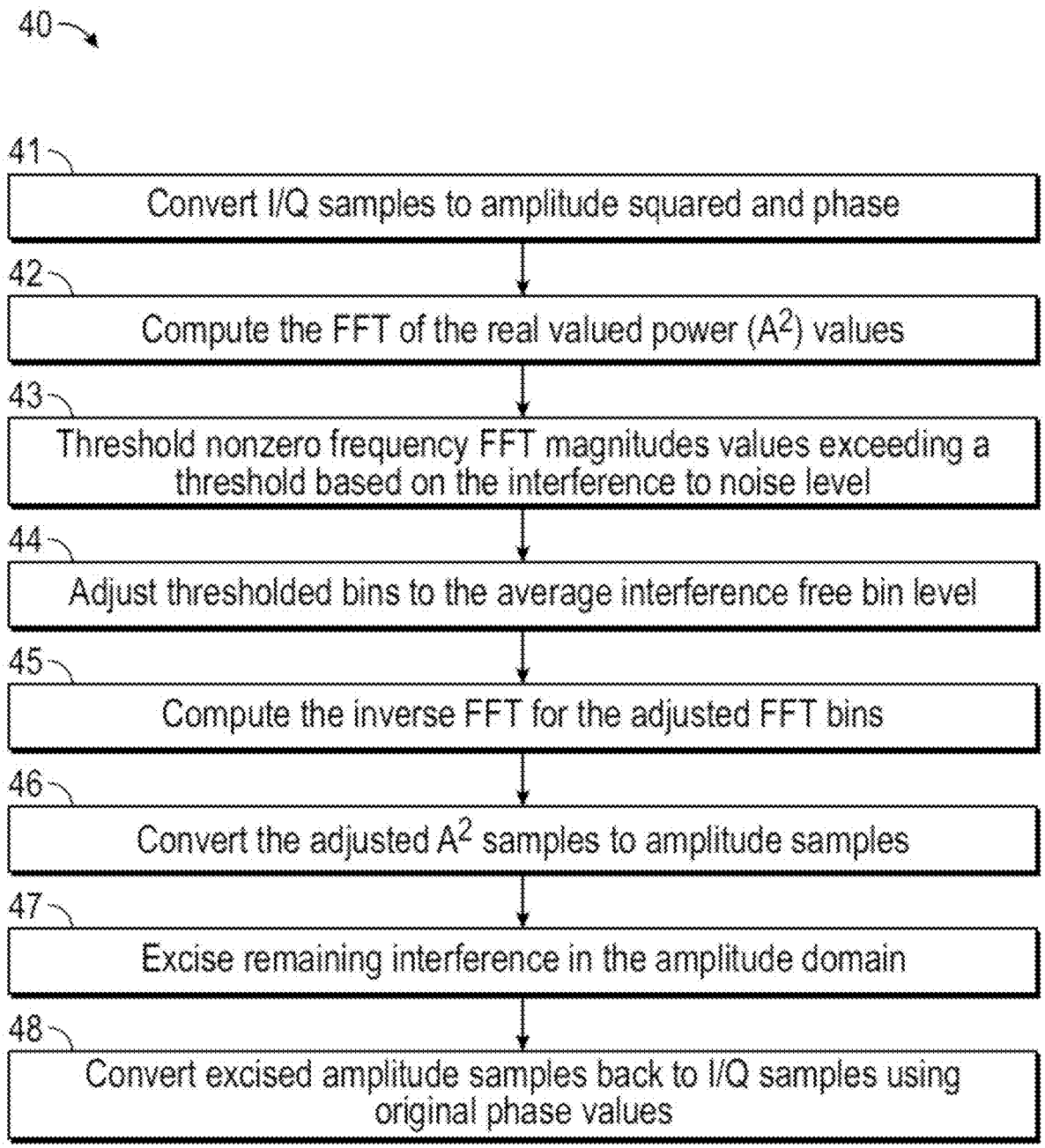
FIG. 4G illustrates steps in another exemplary method for reducing an interference signal that spectrally overlaps a desired signal based on a non-unity power of the amplitude of the signals, according to some embodiments of the present invention.

FIG. 4G illustrates steps in another exemplary method for reducing an interference signal that spectrally overlaps a desired signal based on a non-unity power of the amplitude of the signals, according to some embodiments of the present invention. Method 40 illustrated in FIG. 4G includes converting I/Q samples of a received signal to amplitude squared ($A^2$) and phase (step 41). Method 40 also includes computing the FFT of the real valued power ($A^2$) values (step 42), e.g., as described above with reference to Equation 8. Method 400 also includes thresholding nonzero frequency FFT magnitude values exceeding a threshold based on the interference to noise level (step 43) and adjusting thresholded bins to the average interference free bin level (step 44), e.g., as described above with reference to Equations 9 and 10. Method 40 also includes computing the inverse FFT for the adjusted FFT bins (step 45), e.g., as described above with reference to Equation 11. Method 40 also includes converting the adjusted $A_2$ samples to amplitude (A) samples (step 46), e.g., as described above with reference to Equation 12. Method 40 optionally also includes multiple-domain signal processing, e.g., excising remaining interference in the amplitude domain (step 47). Exemplary methods for suppressing interference in the amplitude domain are provided elsewhere herein. Method 40 also includes converting the excised amplitude samples back to I/Q samples using original phase values (step 48), e.g., as described above with reference to Equation 13.

Figure 4H:
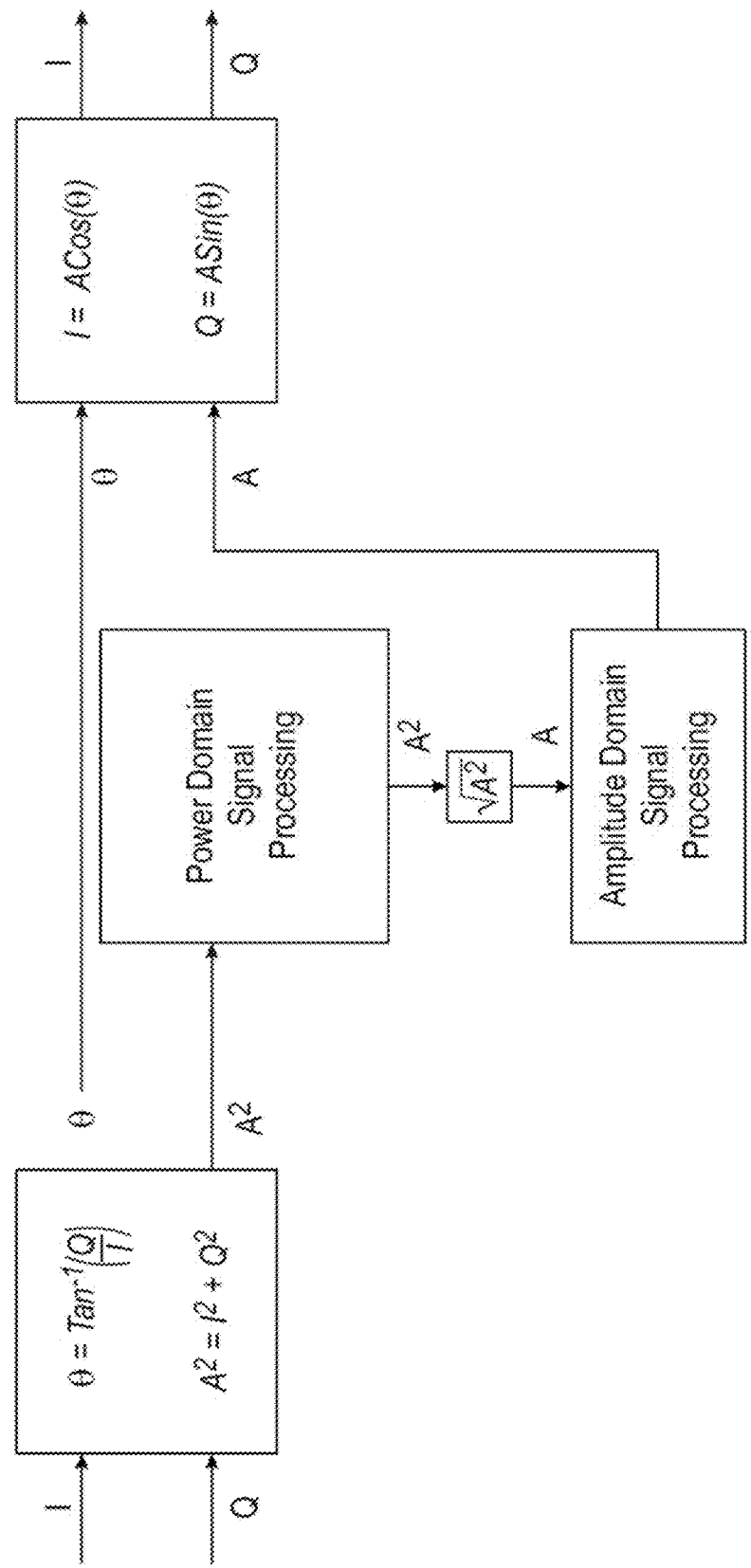
FIG. 4H schematically illustrates selected components of another exemplary interference suppression circuit for use in reducing an interference signal that spectrally overlaps a desired signal based on a non-unity power of the amplitude of the signals, according to some embodiments of the present invention.
Figure 4I:
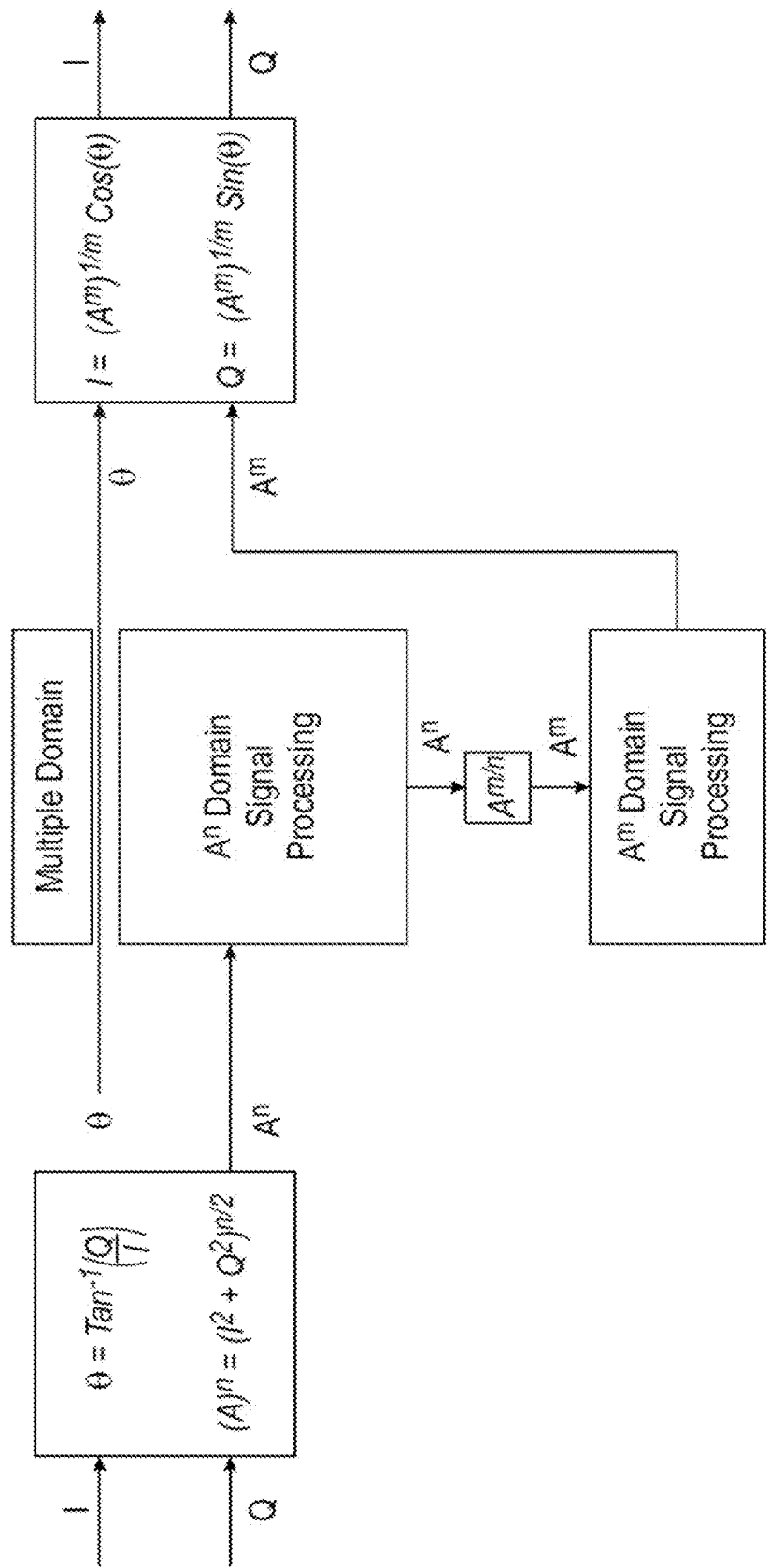
FIG. 4I schematically illustrates selected components of another exemplary interference suppression circuit for use in reducing an interference signal that spectrally overlaps a desired signal based on a non-unity power of the amplitude of the signals, according to some embodiments of the present invention.
Figure 4J:
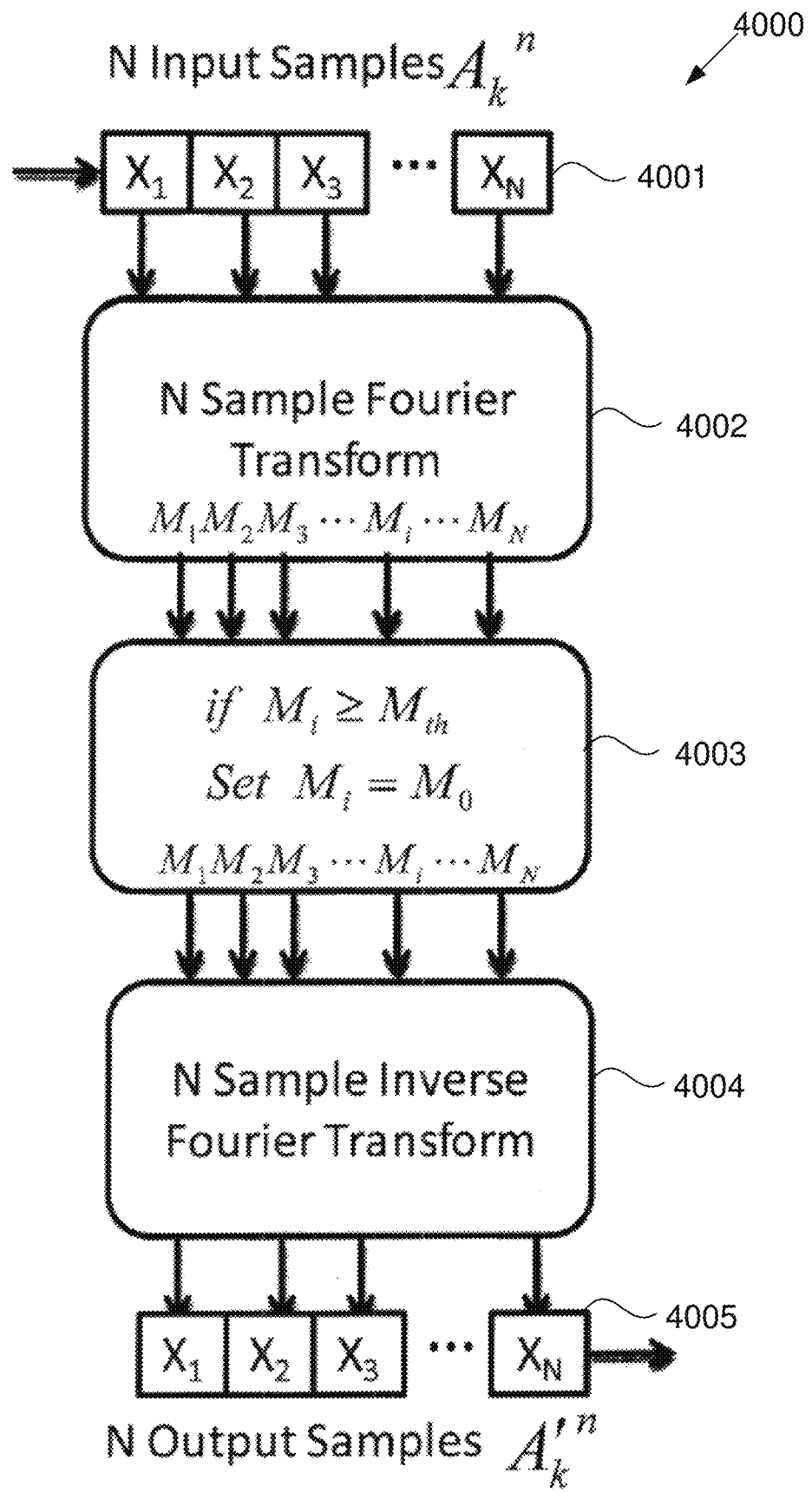
FIG. 4J illustrates steps in another exemplary method for reducing an interference signal that spectrally overlaps a desired signal based on a non-unity power of the amplitude of the signals, according to some embodiments of the present invention.

In an exemplary multiple-domain implementation such as illustrated in FIG. 4G, rapidly varying amplitude contributions from the interference signal can be removed in a nonlinear domain, such as the power domain, using FFT, thresholding, and inverse FFT such as illustrated in FIG. 4J. FIG. 4J illustrates steps in another exemplary method for reducing an interference signal that spectrally overlaps a desired signal based on a non-unity power of the amplitude of the signals, according to some embodiments of the present invention. In FIG. 4J, N samples $X_1, X_2, \ldots X_N$ of a received signal having amplitudes $A_k^n$ are obtained (step 4001). The N samples are Fourier transformed to obtain corresponding magnitudes $M_1, M_2, \ldots M_N$ (step 4002). For each of the magnitudes, if that magnitude $M_i$ equals or exceeds a threshold $M_{th}$, the magnitude is set to $M_0$ (step 4003), e.g., such as described above with reference to Equation 12. The processed magnitudes are inversely Fourier transformed (step 4004) to obtain processed samples $X_1, X_2, \ldots X_N$ having processed amplitudes $A'^n_k$ (step 4005). In some embodiments, FFT bins near zero frequency (e.g., within a predetermined distance from zero frequency, such as described elsewhere herein) are not excised. Instead, the interference in such bins can be removed using a subsequent step, e.g., amplitude domain processing such as described with reference to FIG. 4H, or alternative nonlinear domain processing such as described with reference to FIG. 4I. Alternatively, substantially all interference can be removed in the power domain.

In power-domain signal processing such as illustrated in FIGS. 4G and 4J, the signal can be converted to the amplitude domain and subsequently processed to remove interference contributions that have slowly varying amplitudes. Note that a power-domain notch filter or other type of filter may also be used to selectively remove rapidly varying interference in the power domain. Alternatively, a short-term Fourier transform or similar transform-domain excision approach also can be used to separate interference from the desired signal in the power ($A^2$) domain. Illustratively, the implementations of FIGS. 2 and 3C, the exemplary implementations described in U.S. patent application Ser. No. 14/262,532, or any other suitable amplitude domain interference suppression algorithm, can be used to perform the amplitude domain signal processing. Alternatively, a second FFT/iFFT such as described in Henttu can be applied in the amplitude domain.

FIG. 4H schematically illustrates selected components of another exemplary interference suppression circuit for use in reducing an interference signal that spectrally overlaps a desired signal based on a non-unity power of the amplitude of the signals, according to some embodiments of the present invention. In FIG. 4H, a suitable circuit or software module obtains the phase $\theta$ and non-linear power $A^n$ of the amplitude A based on the in-phase and quadrature components of the received signal. The non-linear power $A^n$ of the amplitude is provided to a suitable circuit or software module that is configured to perform interference suppression (signal processing) on the $A^2$ (power) domain of the received signal so as to reduce the interference signal. The processed signal in the $A^2$ (power) domain and the phase $\theta$ then are provided to a suitable circuit or software module that is configured to transform the processed signal back to the A (amplitude) domain, e.g., by taking the square root of the output from the power domain processing. The amplitude A then is provided to a suitable circuit or software module that is configured to perform signal processing (interference suppression) in the amplitude domain, such as provided elsewhere herein. The processed amplitude then is provided to a suitable circuit or software module that is configured to construct a signal in the I/Q domain that has reduced contribution from the interference signal, based on the processed signal in the A domain and the phase $\theta$.

Note that the circuit illustrated in FIG. 4H can be configured so as to perform signal processing in the power domain ($A^2$) or in any suitable number and combination of linear and non-linear amplitude domains, e.g., a plurality of non-linear amplitude domains in which the interference can be separated from the desired signal. As one example, FIG. 4I schematically illustrates selected components of another exemplary interference suppression circuit for use in reducing an interference signal that spectrally overlaps a desired signal based on multiple non-unity powers of the amplitude of the signals, according to some embodiments of the present invention. In FIG. 4I, a suitable circuit or software module obtains the phase $\theta$ and a first non-linear power $A^n$ of the amplitude A based on the in-phase and quadrature components of the received signal. The non-linear power $A^n$ of the amplitude is provided to a suitable circuit or software module that is configured to perform interference suppression (signal processing) on the $A^n$ domain of the received signal so as to reduce the interference signal. The processed signal in the $A^n$ domain and the phase $\theta$ then are provided to a suitable circuit or software module that is configured to transform the processed signal to a second non-linear domain of power m ($m \neq n \neq 0$) e.g., by taking the m/n root of the output from the power domain processing. The $A^m$ domain signal then is provided to a suitable circuit or software module that is configured to perform signal processing (interference suppression) in the $A^m$ domain, such as provided elsewhere herein. The processed amplitude then is provided to a suitable circuit or software module that is configured to construct a signal in the I/Q domain that has reduced contribution from the interference signal, based on converting the processed signal in the $A^m$ domain back to the A domain, and the phase $\theta$. Signal processing (interference suppression) in any other suitable domain for which $m \neq n \neq 1$ can be used, optionally in combination with signal processing in the amplitude domain for which n=1. Note that m and n can be independently selected integers or fractions.

Note that thresholds $M_{TH}$, $M_{th}$ such as described herein can be set so that the interference is detected above the noise level. For example, the threshold can be set by measuring the power of the interference-free FFT bins and setting the threshold to be a multiple of the interference-free bin power. Other approaches known in the art can be used to set the FFT threshold $M_{th}$. In one example, the threshold can be set to be equal to the average magnitude in dB plus a constant $\alpha$ selected as a function of the ISR, INR, or some other suitable quantity, as follows:

$$M_{th} = \frac{1}{N_{FFT}} \sum_{k=1}^{N_{FFT}} 10 * \log_{10}(Z_k) + \alpha \qquad (14)$$

Alternatively, this can be used as an initial threshold and iteratively changed so as to optimize, for example, received signal to noise ratio or C/No. The threshold also may be determined before the interference is detected, by measuring the average FFT bin magnitude in the $A^2$ domain due to the signal and noise contributions and setting the threshold to be, for example, 10 dB above this level. In another example, the threshold can be based on the measured interference to noise level, e.g., as determined by an ADC.

Figure 4K:
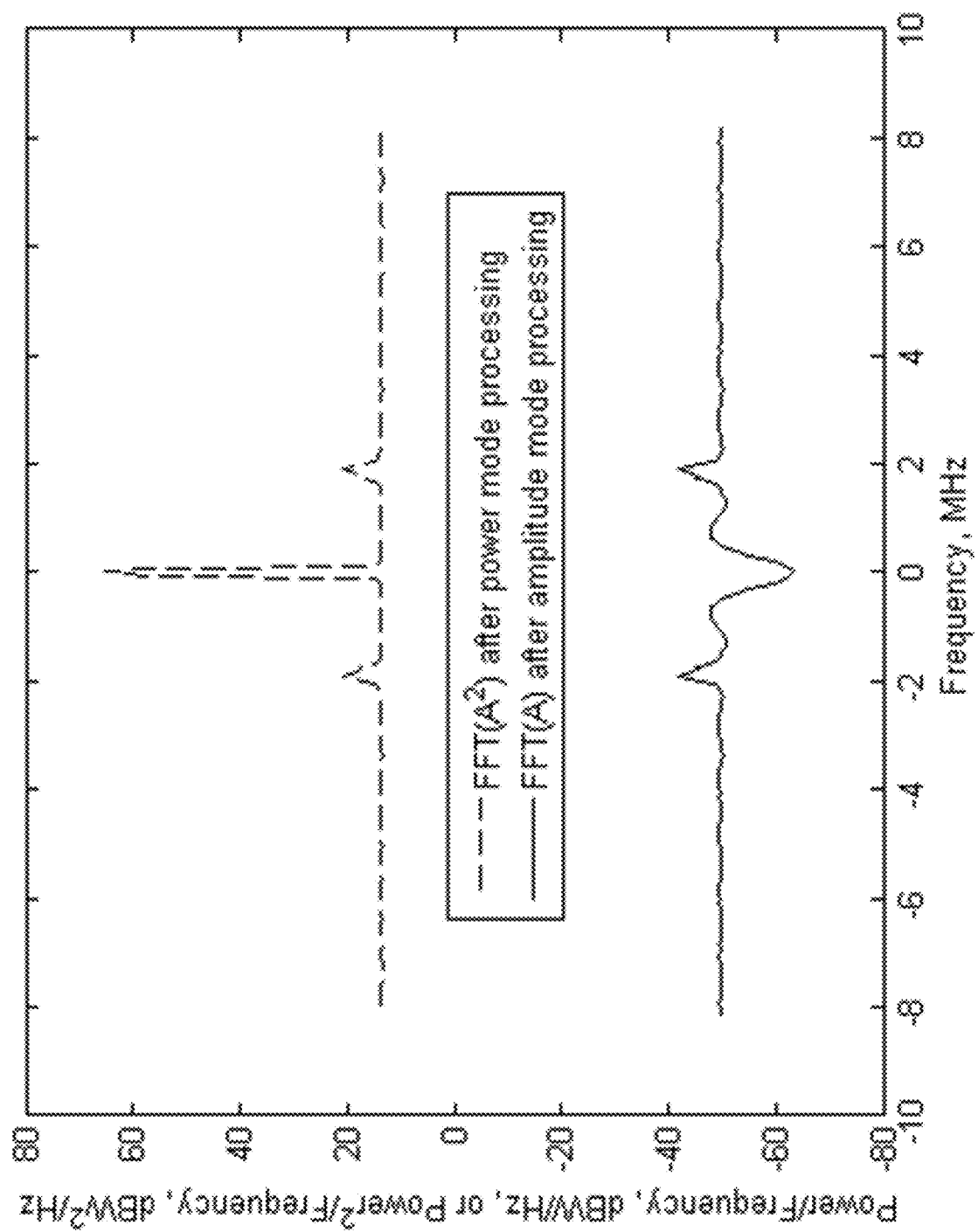
FIG. 4K is a plot of the frequency spectra of the amplitude and the power for the exemplary received signal of FIG. 4C after interference suppression using the method of FIG. 4G, according to one non-limiting example of the present invention.

FIG. 4K is a plot of the frequency spectra of the amplitude and the power for the exemplary received signal of FIG. 4C after interference suppression using the method of FIG. 4G, according to some embodiments of the present invention. After applying both power-domain and amplitude-domain signal processing, note that the frequency components near zero frequency in the power domain have been retained. Subsequently, the amplitude domain processing of FIG. 2E was used to remove low frequency amplitude spectral components including remaining near constant amplitude components of the interference signal. In other words, the AM modulation of the PRN code interferer was removed in the power domain, with the nearly constant envelope portion of the interferer removed in the amplitude domain according to an exemplary multiple-domain implementation.

Figure 4L:
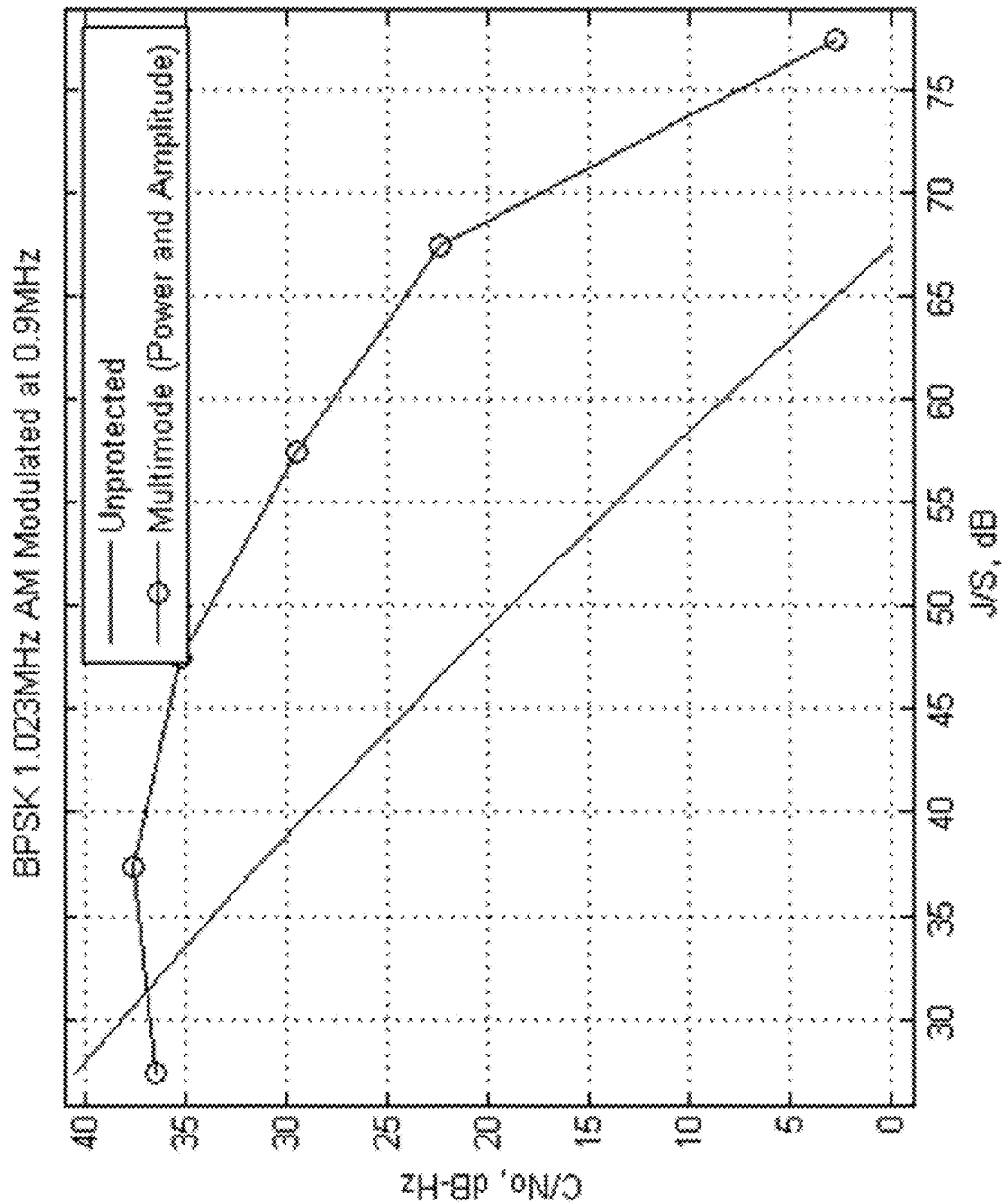
FIG. 4L illustrates a comparison of the C/No for interference suppression based on applying multiple domain interference suppression using the method of FIG. 4G to the example signal illustrated in FIG. 4C, according to some embodiments of the present invention, according to one non-limiting example of the present invention.

FIG. 4L illustrates a comparison of the C/No for interference suppression based on applying multiple domain interference suppression using the method of FIG. 4G to the example signal illustrated in FIG. 4C according to some embodiments of the present invention. More specifically, FIG. 4L illustrates the results of a simulation for the 0.9 MHz AM modulated BPSK interference signal as a function of interference to signal ratio for the case of a 1.023 MCPS C/A code signal. While results are shown for a C/A code signal received by a GPS receiver, it should be understood that non-linear domain processing, and multiple-domain processing, suitably can be applied to any signal receiver of interest, including other GNSS signal receivers, wireless system receivers, Bluetooth receivers, WiFi receivers, satellite communication receivers, radar system receivers, and the like.

Note that while the examples provided with reference to FIGS. 4K-4L illustrate a multiple-domain approach, using amplitude-squared and amplitude excision using an amplitude estimation approach, in other embodiments the interference signal can be reduced strictly in the $A^2$ domain by applying an FFT, setting to zero all bins that exceed a threshold, and transforming back to the amplitude domain before transforming to the I/Q domain. Alternative amplitude-domain approaches also can be used such as the approach of FIG. 3C or by performing FFT-based excision in the nonlinear amplitude domain or in the linear polar amplitude domain. As noted above with reference to FIG. 4I, any suitable number of linear and non-linear amplitude domains can be used for interference suppression. Additionally, any suitable number of linear and non-linear amplitude domains can be combined with previously known I/Q domain processing, such as narrow-band excision processing.

Reducing Interference Based on Clustering the Amplitudes of the Signals

In some embodiments, single or multiple broadband interference signal(s) that spectrally overlap a desired signal can be suppressed based on clustering amplitudes of the signals. For example, rather than having a constant envelope, the interference signal(s) can have multiple discrete amplitude levels over a given time period that potentially can make it difficult to suppress the interference. As provided herein, clustering amplitudes of the received signal can be used so as to identify and suppress the interference. In some embodiments, the present circuits and methods convert digitized in-phase (I) and quadrature (Q) samples of a received signal, which includes a desired signal and an interference signal that overlaps the desired signal, to amplitude and phase samples. The present circuits and methods can identify one or more clusters of amplitude samples with a similar amplitude as one another, can estimate the amplitude of each cluster over time, can assign each amplitude sample to an appropriate (e.g., nearest) cluster, and, when indicated by a decision circuit, can perform interference suppression on the assigned amplitude sample. Illustratively, an appropriate amplitude can be subtracted from the assigned amplitude sample. The residual amplitude of the signal can be combined with the unaltered phase samples, to generate an output in the I and Q signal domain. The net effect can be the suppression of many kinds of interference signals in which the amplitude of the interference signal(s) can vary significantly over time.

For example, as noted above with reference to FIGS. 1A-1B, interference suppression circuit 120 can be configured so as to receive a signal that includes a desired signal and an interference signal that spectrally overlaps the desired signal, and to reduce the contribution of the interference signal using any suitable circuitry. For example, in some embodiments, interference suppression circuit 120 can be configured to reduce the interference signal based on clustering the amplitudes of the signals, e.g., in a manner such as described with reference to FIGS. 5A-5Q. Interference suppression circuit 120 suitably can receive the signal from optional threshold circuit 110, from A/D converter 12, from antenna/analog conditioner 11 or any other suitable source. Although interference suppression circuit 120 is compatible with optional threshold circuit 110, note that threshold circuit 110 suitably can be omitted.

Figure 5A:
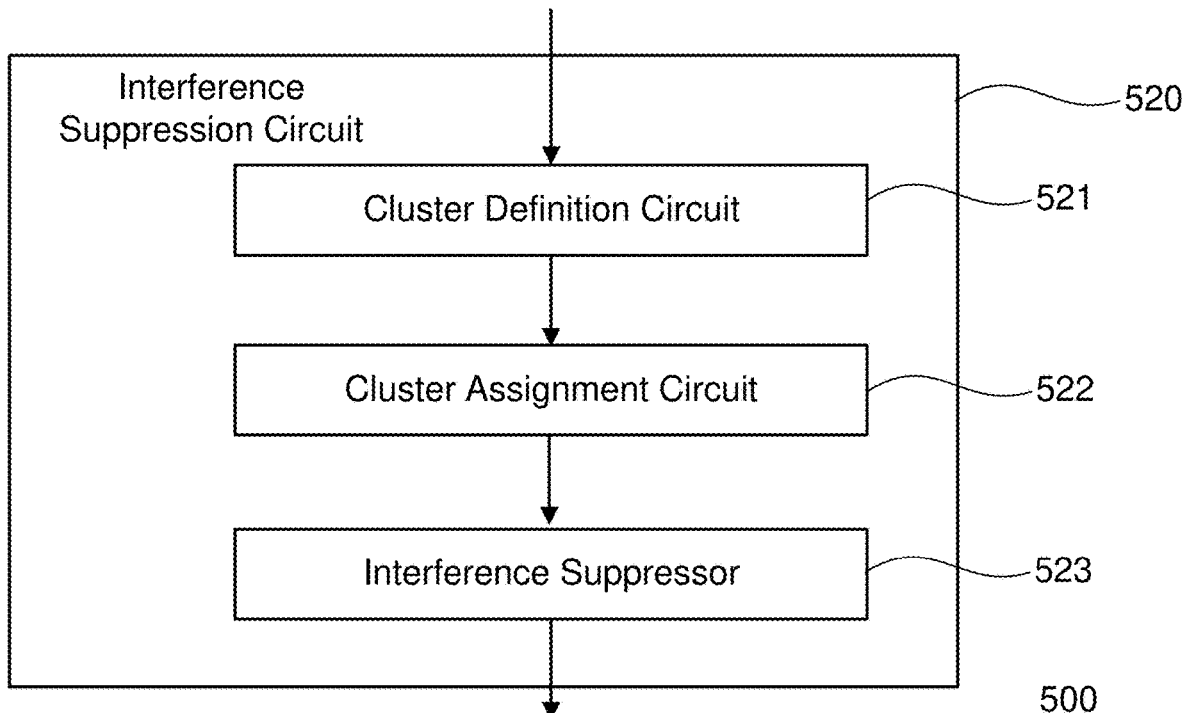
FIG. 5A schematically illustrates an exemplary interference suppression circuit for use in reducing an interference signal that spectrally overlaps a desired signal based on clustering the amplitudes of the signals, according to some embodiments of the present invention.

FIG. 5A schematically illustrates an exemplary interference suppression circuit for use in reducing an interference signal that spectrally overlaps a desired signal based on clustering the amplitudes of the signals, according to some embodiments of the present invention. In the non-limiting embodiment illustrated in FIG. 5A, circuit 520 includes cluster definition circuit 521, cluster assignment circuit 522, and interference suppressor 523. In some embodiments, cluster definition circuit 521 can be coupled to optional threshold circuit 110 via a suitable pathway so as to receive amplitudes of samples of the received signal from threshold circuit 110. In other embodiments, interference suppression circuit can include an amplitude circuit (envelope estimator, not specifically illustrated) configured to receive samples of the amplitude (also referred to as amplitude samples) of the signal from optional threshold circuit 110, from A/D converter 12, from antenna/analog conditioner 11, or from any other suitable source, and configured to obtain an amplitude of the received signal. Additionally, the amplitude circuit (envelope estimator) optionally can be configured to obtain a phase of samples of the received signal (also referred to as phase samples). For example, in some embodiments, the received signal can be in rectangular coordinates, and the amplitude circuit can include an optional rectangular to polar converter configured to obtain an amplitude and a phase of the received signal. The amplitude circuit can be coupled so as to provide the amplitude to cluster definition circuit 521, and, in embodiments in which the phase also is obtained, optionally can be coupled so as to provide the phase to signal construction circuit 130 illustrated in FIGS. 1A-1B. In one nonlimiting embodiment, the received signal is a digitized baseband signal, and the amplitude circuit is configured to obtain amplitudes and phases of the complex in-phase and quadrature samples of the received baseband signal.

Cluster definition circuit 521 illustrated in FIG. 5A can be configured to define a plurality of clusters, each cluster of the plurality having a corresponding cluster amplitude. Cluster definition circuit 521 can be configured to define, and optionally to update over time, the plurality of clusters in any suitable manner such as described in greater detail below. As one example, FIG. 5C illustrates an example amplitude (magnitude of I+jQ) for the sum of 4 randomly phased BPSK interference signals. Notice that in this example, 8 amplitude levels are clearly present for 4 interference signals. In some embodiments, cluster definition circuit 521 can be configured to define a plurality of clusters based upon a distribution of amplitudes that are present in the received signal. Using the example illustrated in FIG. 5C, cluster definition circuit 521 can be configured to define 8 clusters, each corresponding to an amplitude level present in the received signal. Other exemplary methods and circuits for defining clusters are provided further below.

Interference suppression circuit 520 illustrated in FIG. 5A also includes cluster assignment circuit 522. Cluster assignment circuit 522 can be configured so as to receive via a suitable pathway the cluster definitions defined by cluster definition circuit 521, and also so as to receive via a suitable pathway the sample amplitudes from the amplitude circuit (not specifically illustrated in FIG. 5A). Cluster assignment circuit 522 can be configured to assign each sample of a subset of the samples to one of the clusters based on the amplitude of that sample and based on one or more of the cluster amplitudes. As one nonlimiting example, cluster assignment circuit 522 can be configured to compare the amplitude of each sample of a subset of the samples to one or more of the clusters, and to assign each sample to the respective closest one of the clusters. Using the example illustrated in FIG. 5C, cluster assignment circuit 522 can be configured to compare the amplitude of each sample of the subset to the 8 clusters defined by cluster definition circuit 521, and to assign each sample to the closest one of those 8 clusters for that sample. Note, however that cluster assignment circuit 522 optionally can be configured so as not to assign certain samples to a cluster. For example, based upon the amplitude of the sample exceeding a threshold, then cluster assignment circuit 522 can be configured to discard the sample or to set the amplitude for that value to zero or other constant. Or, for example, based upon the amplitude of the sample exceeding a threshold, then cluster assignment circuit 522 can be configured to send an appropriate signal to interference suppression circuit 520 that the sample has an amplitude exceeding the threshold, and interference suppression circuit 520 can be configured to discard the sample or to set the amplitude for that value to zero or other constant.

Interference suppression circuit 520 illustrated in FIG. 5A further includes interference suppressor 523 configured to receive via a suitable pathway the cluster definitions defined by cluster definition circuit 521, so as to receive via a suitable pathway the sample amplitudes from the amplitude circuit (not specifically illustrated in FIG. 5A), and to receive via a suitable pathway the cluster assignments from cluster assignment circuit 522. Interference suppressor 523 can be configured to suppress interference to each sample of the first subset of the samples based on the amplitude of that sample and based on the cluster amplitude of the cluster to which that sample is assigned so as to obtain a processed amplitude of that sample with reduced interference. As one example, interference suppressor 523 can be configured to subtract the amplitude of that sample from the cluster amplitude of the cluster to which that sample is assigned, or to apply any other suitable interference suppression algorithm to that sample. For example, interference suppressor 523 can be configured to transform that sample into a transform domain representation, excise at least a portion of the interference in the transform domain, and perform an inverse transform to obtain the processed amplitude of that sample. The transform can be a Fourier transform, a wavelet transform, or any other suitable transform.

Interference suppressor 523 optionally can be configured so as to suppress interference in only a subset of the samples that it receives from cluster assignment circuit 522. For example, interference suppressor 523 can be configured to determine that contribution of interference need not be suppressed for at least one sample of a second subset of the samples, based on the cluster to which that sample's amplitude is assigned. Illustratively, interference suppressor 523 optionally can be configured, based upon the amplitude of at least one of the samples of the second subset and a first threshold, to output the amplitude of that sample as the processed amplitude of that sample. Or, as mentioned above, interference suppressor 523 can be configured to determine, e.g., based on the cluster to which the sample's amplitude is assigned or other suitable signal from cluster assignment circuit 522, that interference is sufficiently high for that sample that the sample amplitude should be modified or discarded. For example, interference suppressor 523 can be configured, based upon the amplitude of at least one of the samples of the second subset and a second threshold, to a predetermined value as the processed amplitude of that sample.

In some embodiments, interference suppression circuit 520 illustrated in FIG. 5A is coupled to a signal construction circuit configured to generate an output signal with reduced contribution from the interference signal interference based on a phase and the processed amplitude. For example, signal construction circuit 130 illustrated in FIGS. 1A-1B can be coupled to interference suppressor 523 so as to receive therefrom a processed amplitude with reduced interference, and can be coupled to an amplitude circuit (e.g., amplitude circuit(s) 211 such as described above with reference to FIG. 2A, or an amplitude circuit (envelope estimator) of interference suppression circuit 520, not specifically illustrated) so as to receive therefrom phases of those samples, and can be configured to generate an output signal based thereon.

Note that in some circumstances, one or more characteristics (such as amplitude levels present) of the interference signal or the desired signal, or both, can remain substantially constant over time. In other circumstances, one or more characteristics (such as amplitude levels present) of the interference signal or the desired signal, or both, can vary over time. In such circumstances, it can be useful for interference suppression circuit 520 illustrated in FIG. 5A to be configured so as to provide flexibility in the definition of clusters, and assignment of amplitudes to clusters, over time. In some embodiments, cluster definition circuit 521 can be configured to estimate each cluster amplitude over a period of time. Cluster definition circuit 521 can be configured to estimate cluster amplitudes in any suitable manner. For example, cluster definition circuit 521 optionally can be configured to estimate the cluster amplitude of each cluster based on averaging, over the period of time, the amplitudes of the samples assigned to that cluster. Such averaging can be performed using any suitable circuitry. For example, cluster definition circuit 521 can include a finite impulse response (FIR) or infinite impulse response (IIR) type digital filter configured to perform such averaging. In some embodiments, the FIR or BR type digital filter can be configured to receive as input only the amplitudes of the samples assigned to the corresponding cluster, and to update an output of the filter based only upon a sample having a new amplitude being assigned to the corresponding cluster. For example, based upon the levels of amplitude samples assigned to a cluster increasing or decreasing over time, cluster definition circuit 521 (e.g., an FIR or IIR type digital filter of cluster definition circuit 521) can be configured to modify the definition of that cluster. In a manner analogous to that described above, interference suppressor 523 can be configured to subtract the amplitude of that sample from the estimated cluster amplitude of the cluster to which that sample is assigned. In embodiments in which cluster definition circuit 521 includes an FIR or IIR type digital filter, interference suppressor 523 also can be configured to compensate for the group delay of the FIR or IIR type filter prior to performing the subtraction.

Figure 5B:
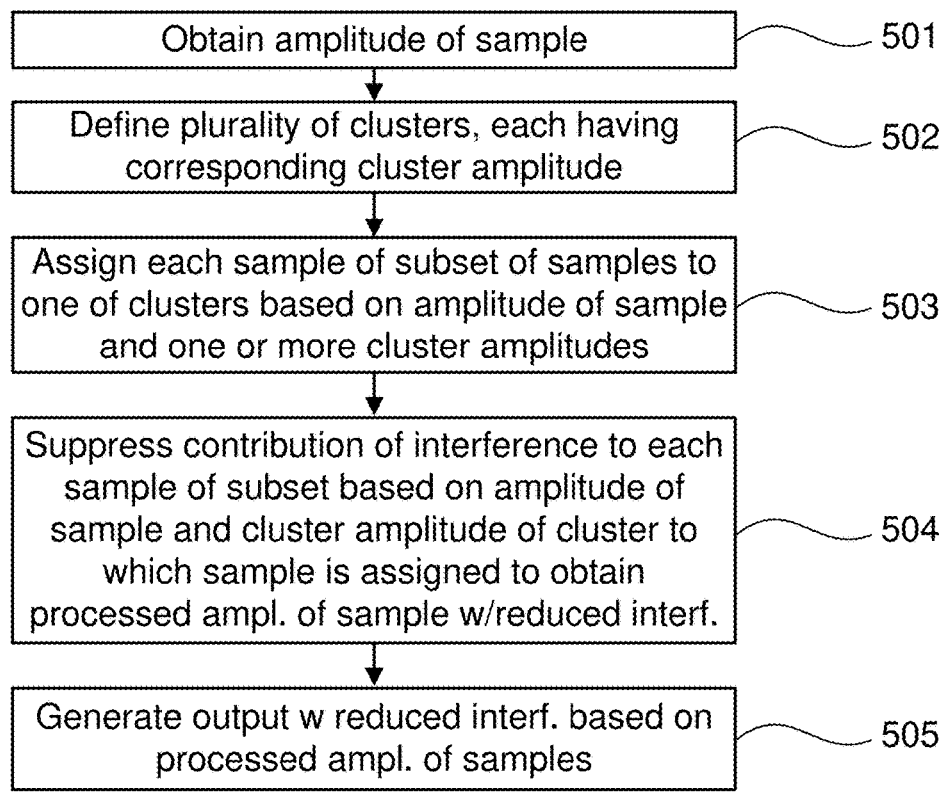
FIG. 5B illustrates steps in an exemplary method for reducing an interference signal that spectrally overlaps a desired signal based on clustering the amplitudes of the signals, according to some embodiments of the present invention.
Figure 5C:
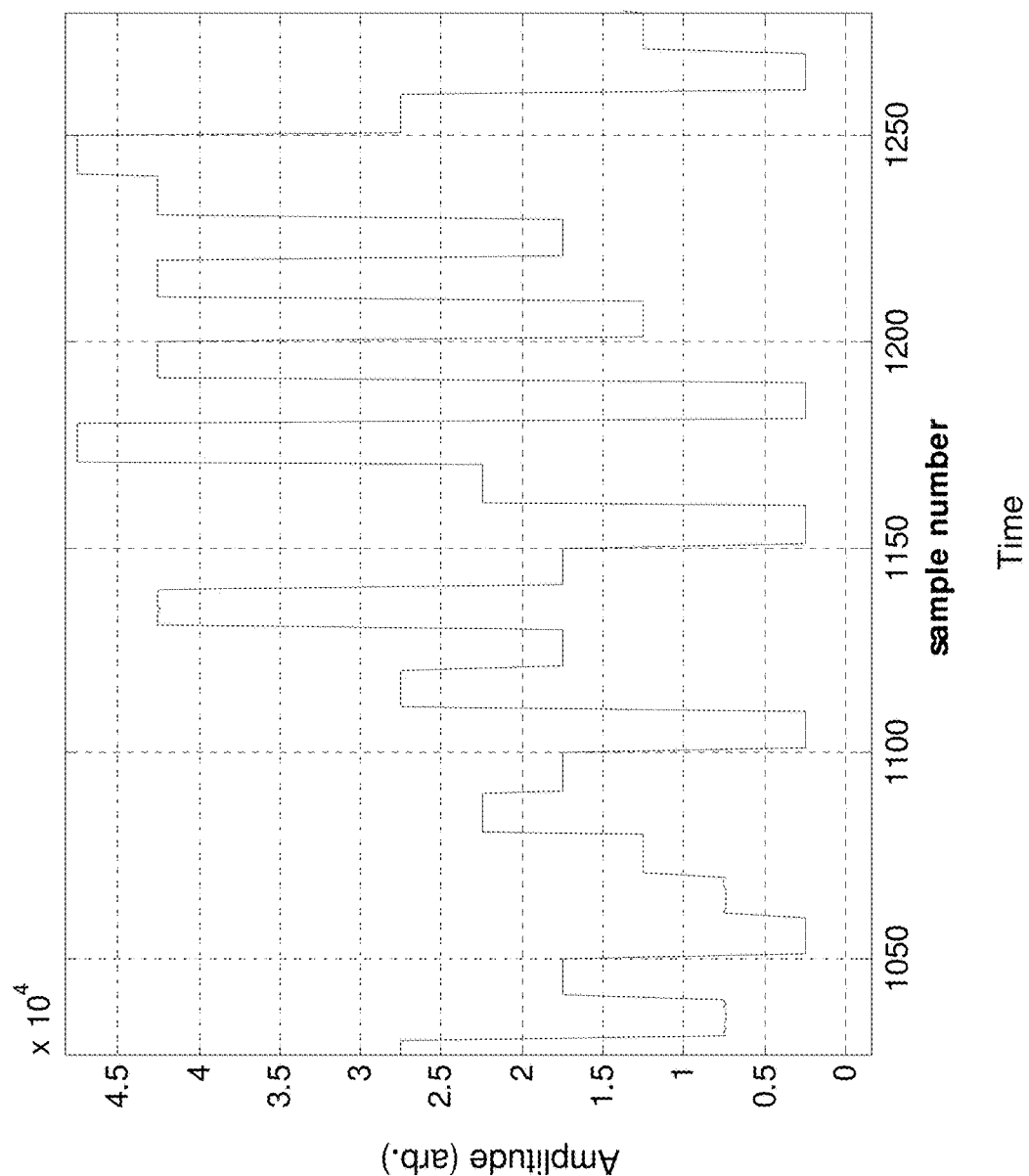
FIG. 5C illustrates amplitudes as a function of sample number for the sum of four exemplary interference signals.
Figure 5D:
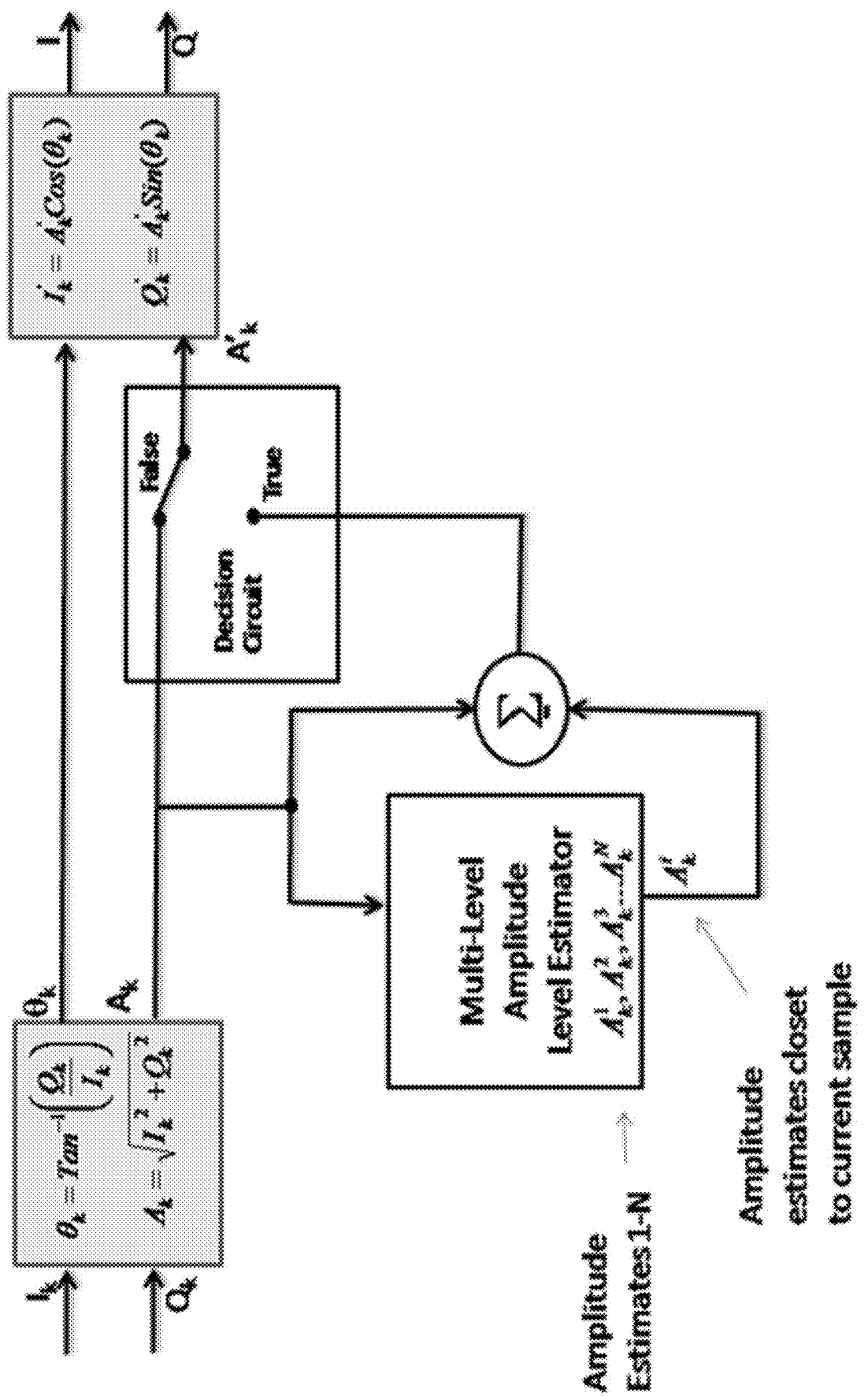
FIG. 5D schematically illustrates selected components of an exemplary interference suppression circuit for use in reducing an interference signal that spectrally overlaps a desired signal based on based on clustering the amplitudes of the signals, according to some embodiments of the present invention.
Figure 5E:
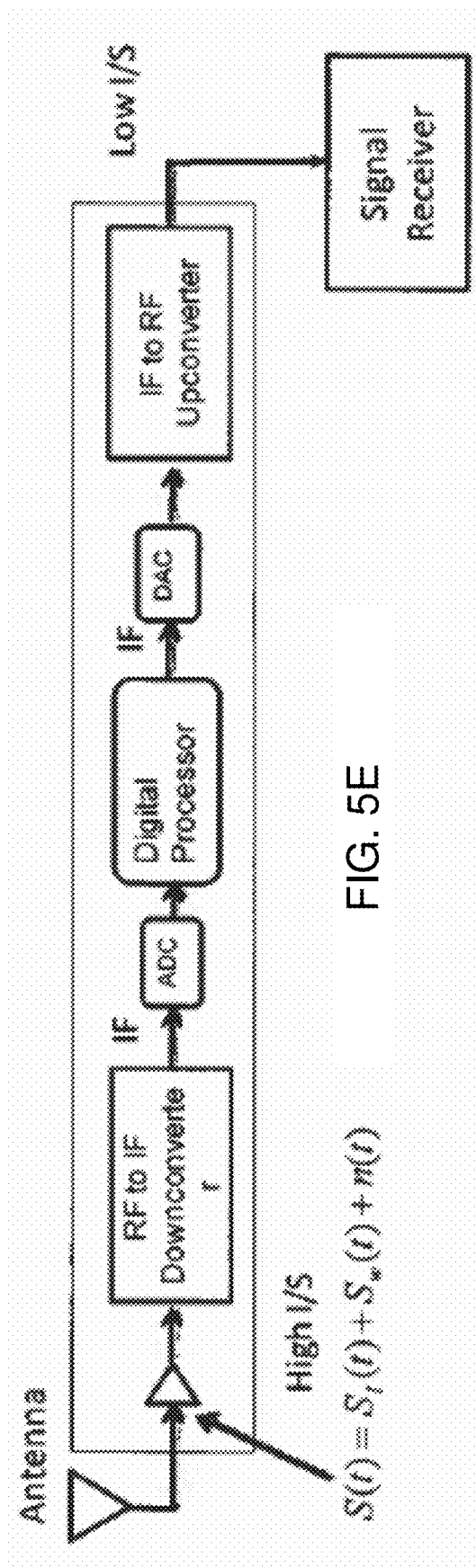
FIGS. 5E-5F schematically illustrate exemplary appliqué implementations for reducing an interference signal that spectrally overlaps a desired signal based on clustering the amplitudes of the signals, according to some embodiments of the present invention.
Figure 5F:
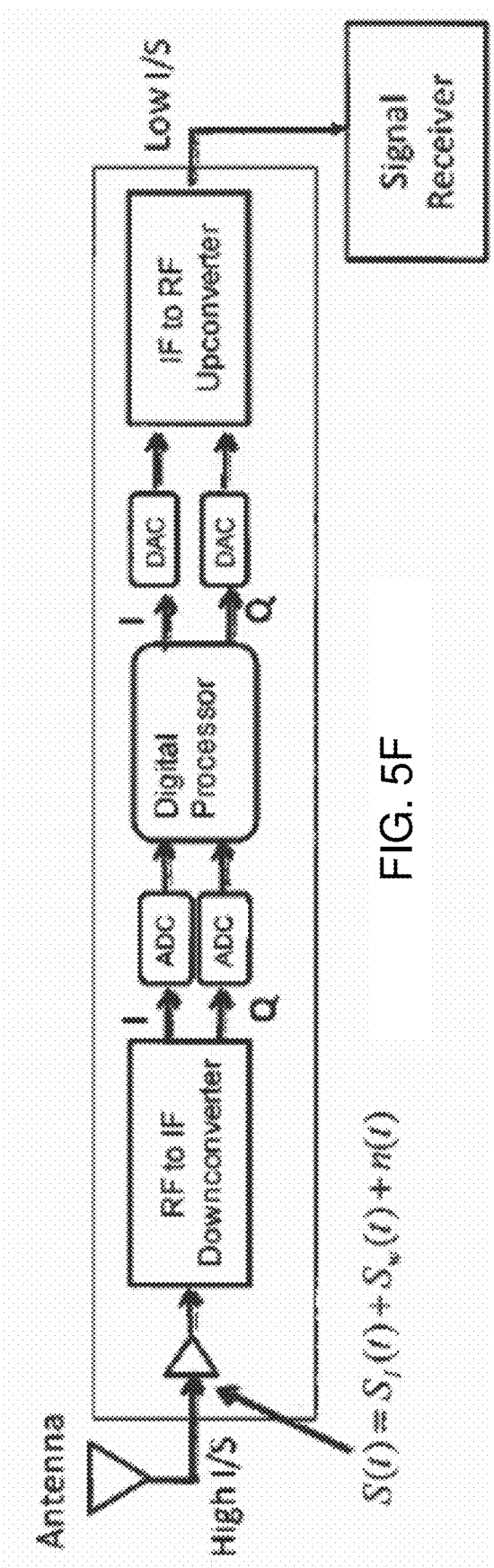
Figure 5G:
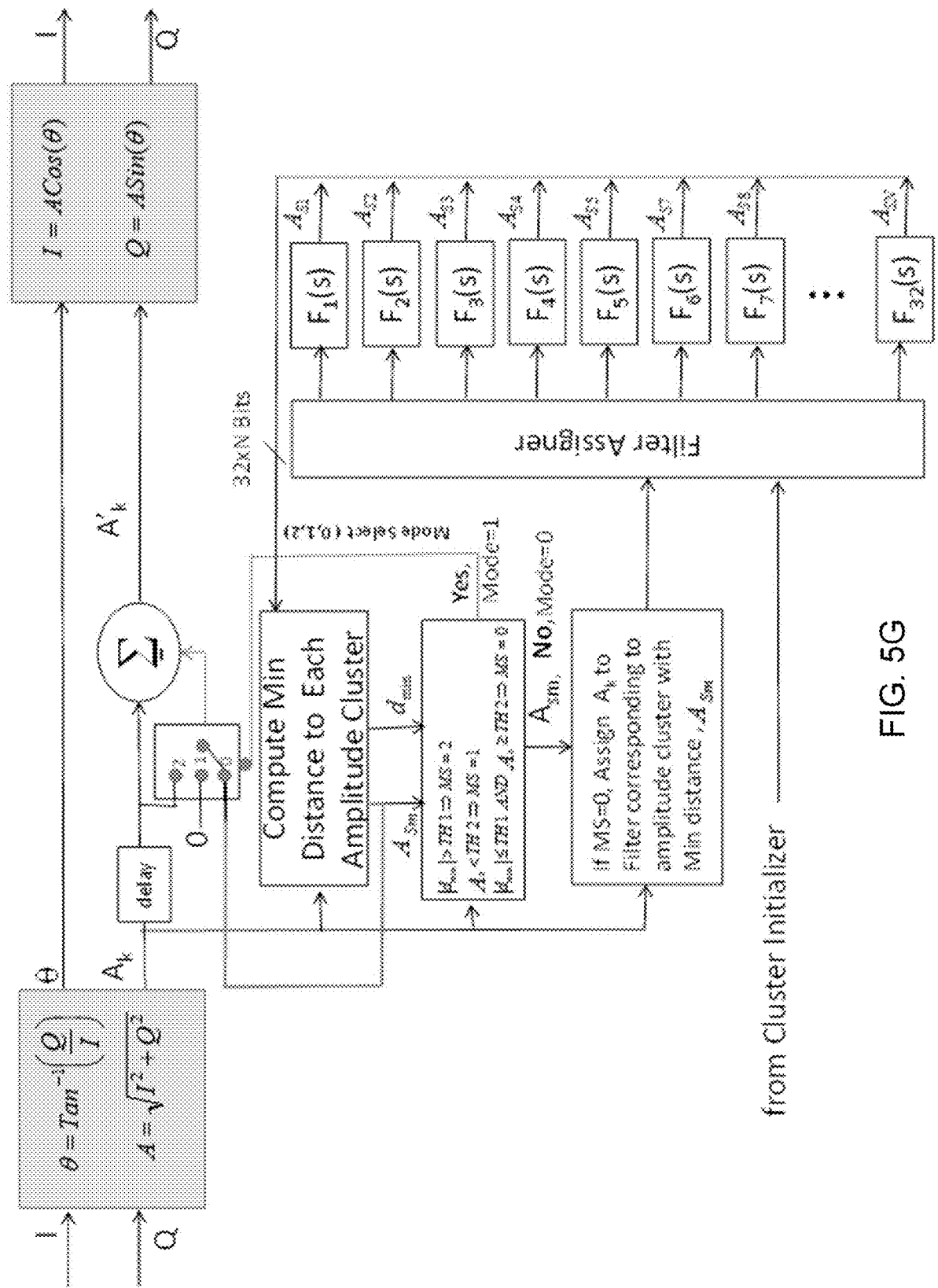
FIG. 5G schematically illustrates selected components of another exemplary interference suppression circuit for use in reducing an interference signal that spectrally overlaps a desired signal based on based on clustering the amplitudes of the signals, according to some embodiments of the present invention.
Figure 5H:
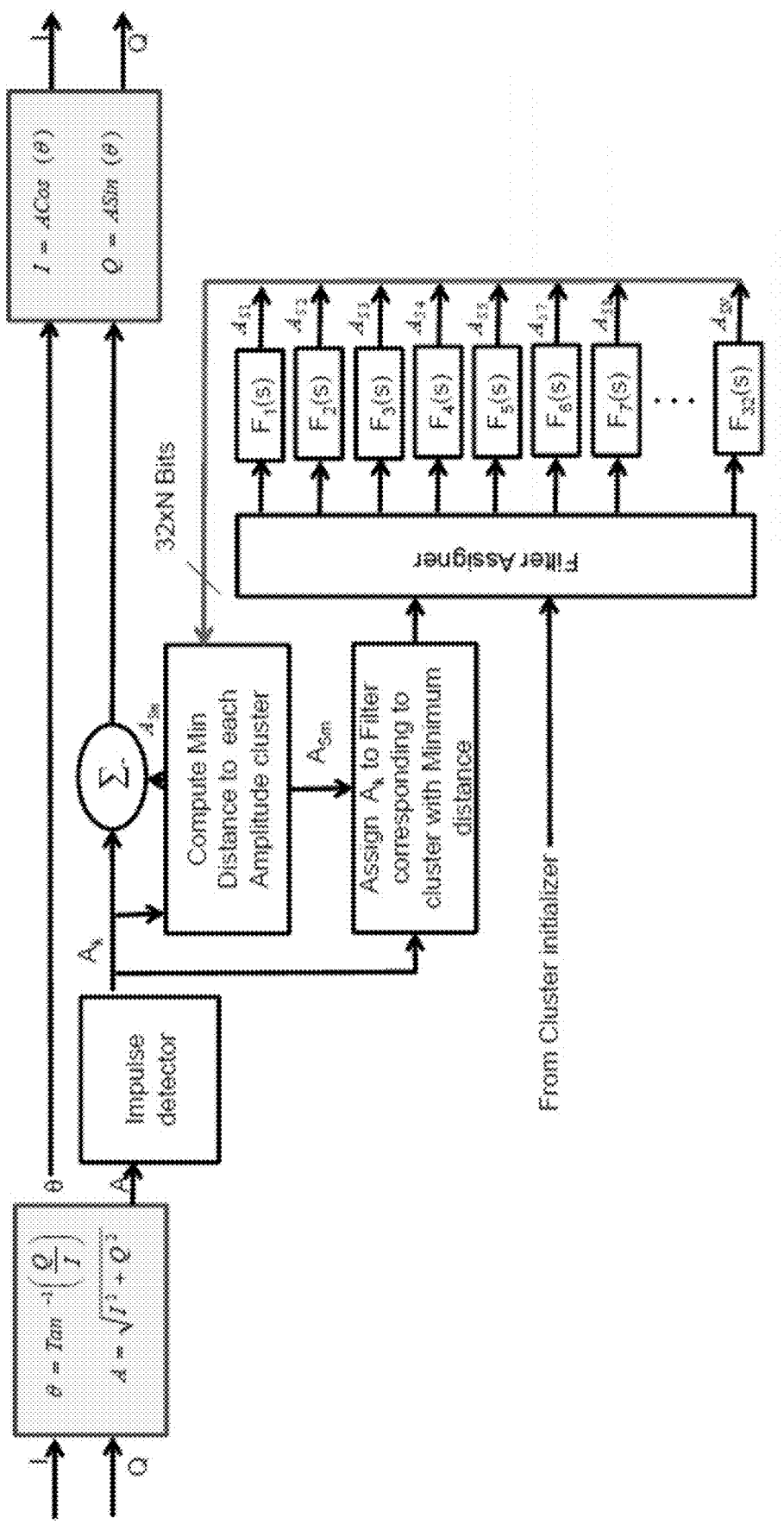
FIG. 5H schematically illustrates selected components of another exemplary interference suppression circuit for use in reducing an interference signal that spectrally overlaps a desired signal based on based on clustering the amplitudes of the signals, according to some embodiments of the present invention.
Figure 5I:
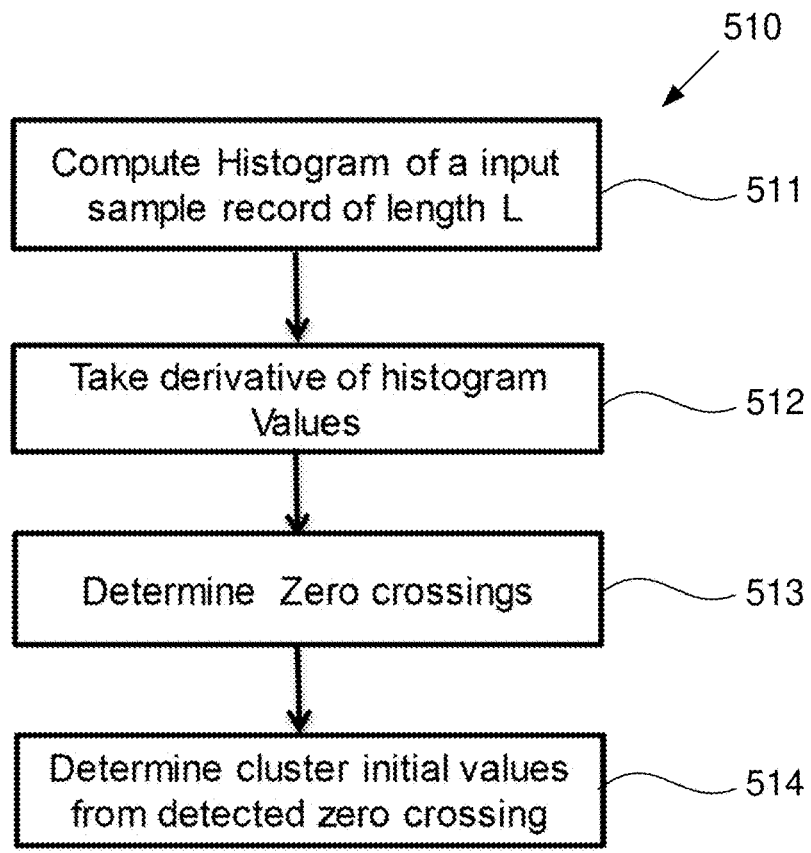
FIG. 5I illustrates steps in an exemplary method for initializing amplitude cluster values, according to some embodiments of the present invention.
Figure 5J:
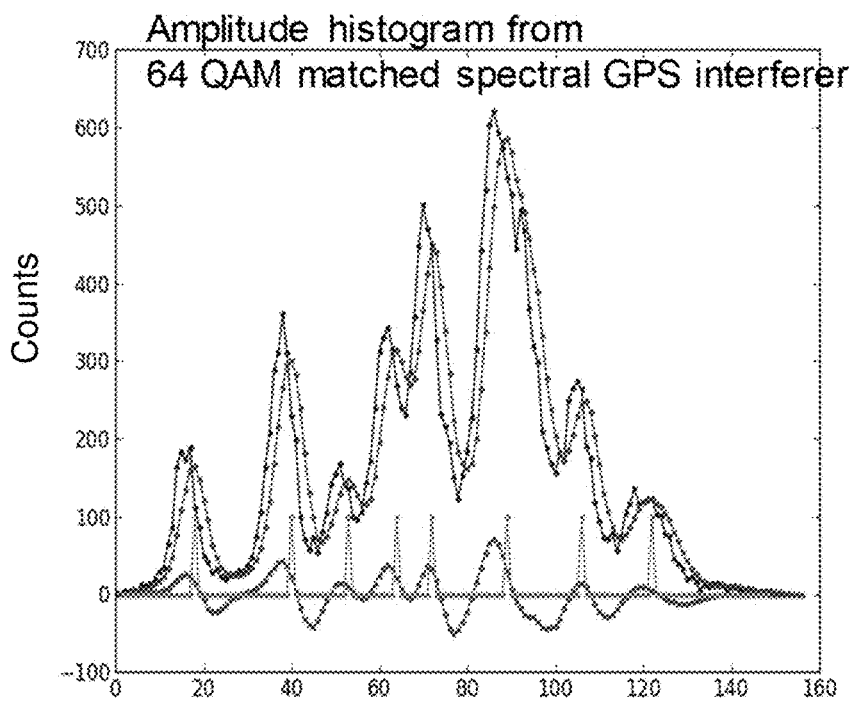
FIG. 5J illustrates an example of output of the cluster initialization method illustrated in FIG. 5I, according to some embodiments of the present invention.
Figure 5N:
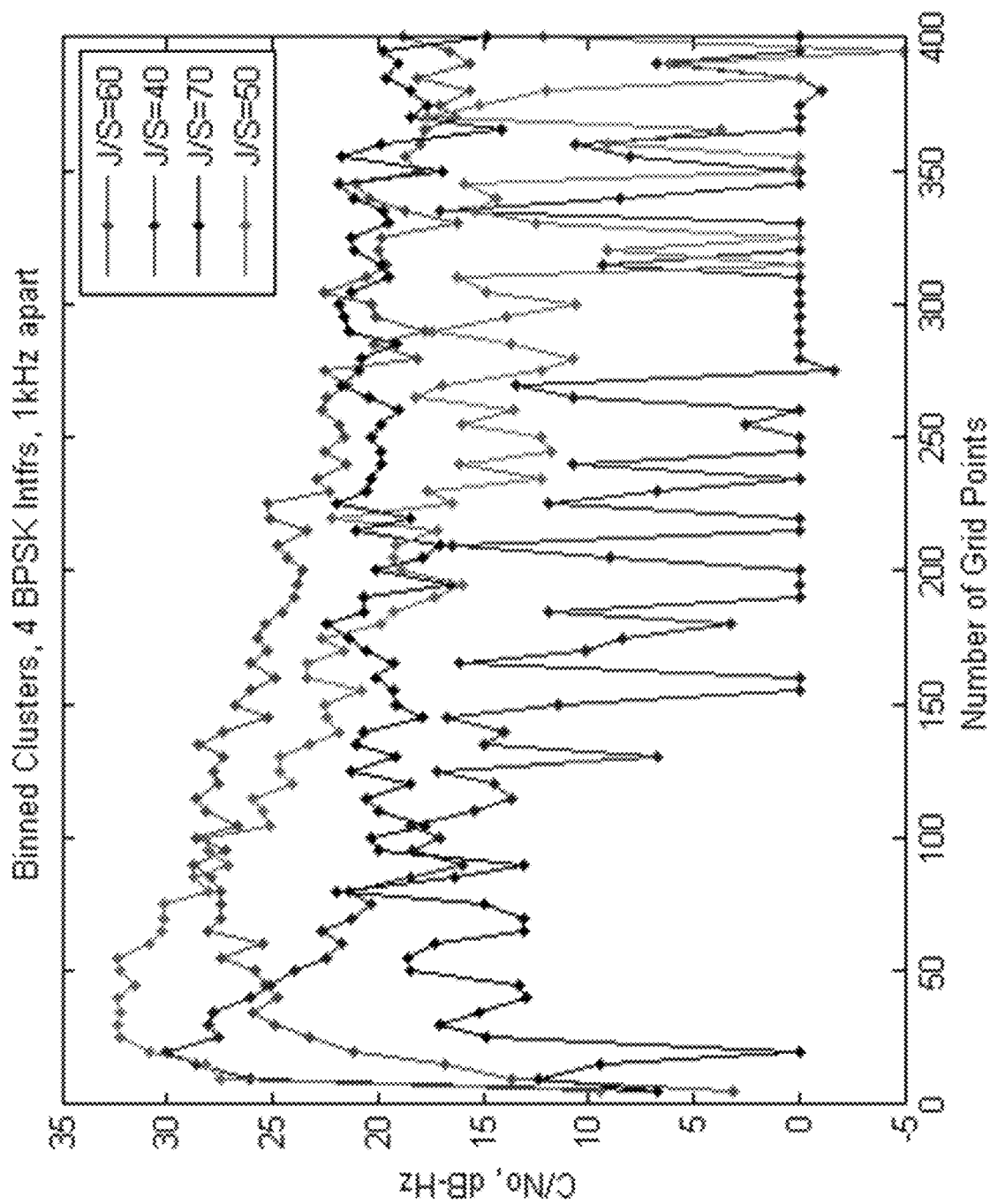
FIG. 5N illustrates the simulated C/No for different sizes of bins in a binned cluster implementation, according to one non-limiting example of the present invention.
Figure 50:
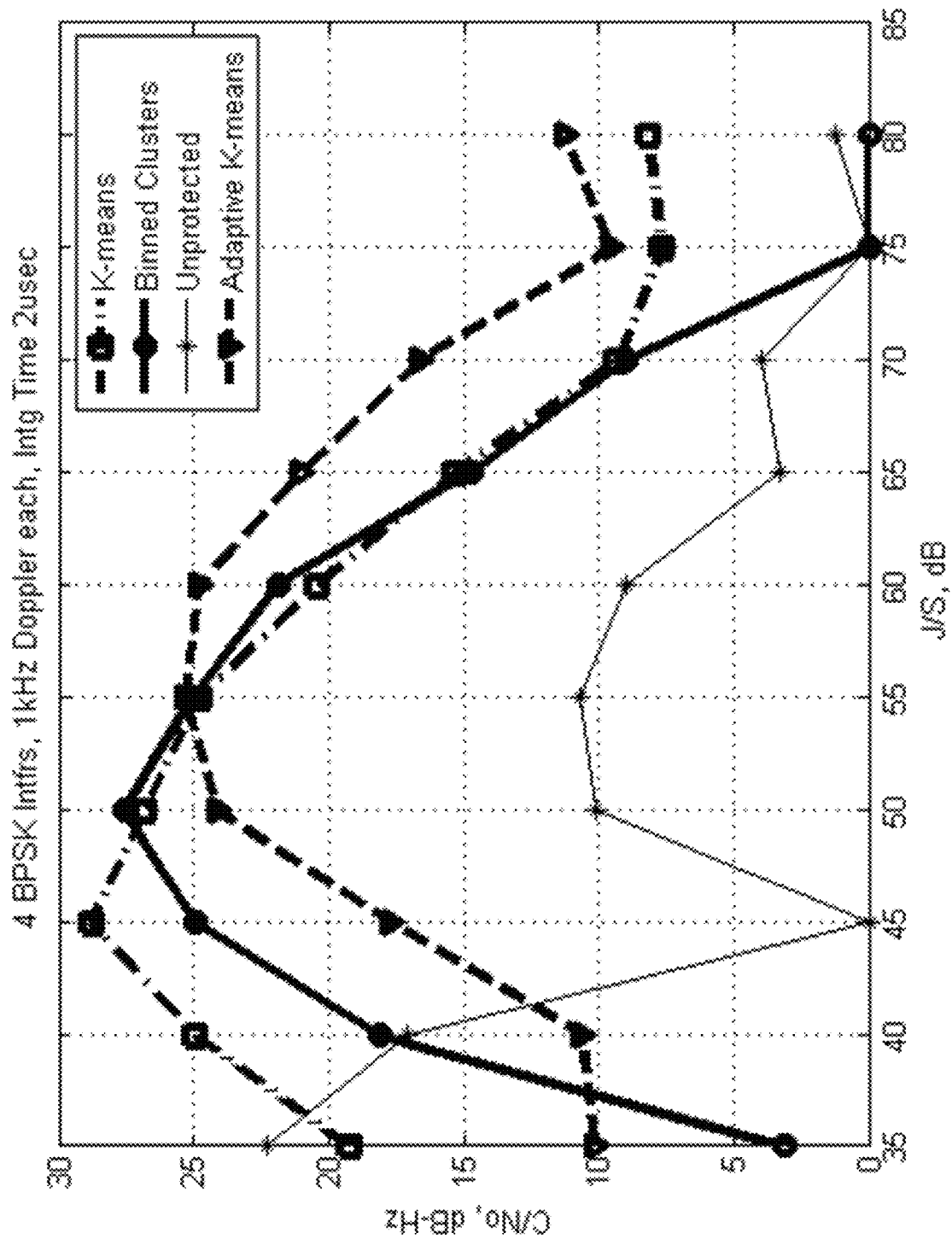
Figure 5P:
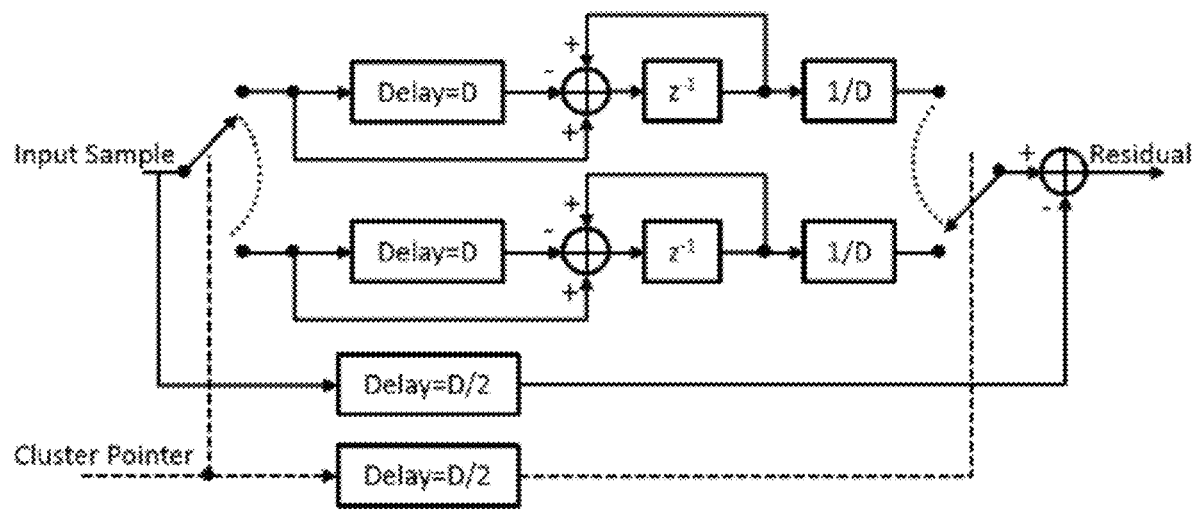
FIGS. 5P-5Q illustrate exemplary circuits for use in a binned cluster implementation, according to some embodiments of the present invention.

For example, FIG. 5P schematically illustrates selected components of an exemplary circuit which shows one possible FIR implementation of interference suppressor 523. For this exemplary circuit, there are two clusters shown. Each cluster averages incoming samples with a recursive running sum, a structure well known in the art, which includes a delay line followed by an integrator. The output of the recursive running sum is divided by D, the number of taps in the delay line, so as to produce a moving average of the input sample amplitudes. The cluster assignment circuit 522 produces cluster pointers which direct the incoming sample into of one of two cluster averaging circuits. In this exemplary circuit there are only 2 clusters, however there could be any suitable number of clusters. The cluster pointer and the incoming sample are delayed to compensate for the group delay of the recursive running sum averager. In this example, the group delay of the recursive running sum is D and the compensating delay is D/2, however any compensating delay can be chosen, including no delay. The delayed cluster pointer chooses which of two cluster averager outputs to choose, and the delayed input amplitude sample is subtracted from the corresponding cluster average to produce an amplitude residual.

It will be clear to those skilled in the art that the subtraction performed in FIG. 5P can be configured to subtract the average cluster amplitude from the amplitude sample, or can be configured to subtract the amplitude sample from the average cluster amplitude. Both configurations can provide an amplitude residual which can be used in further processing to suppress the interference and recover the desired signal.

Figure 5Q:
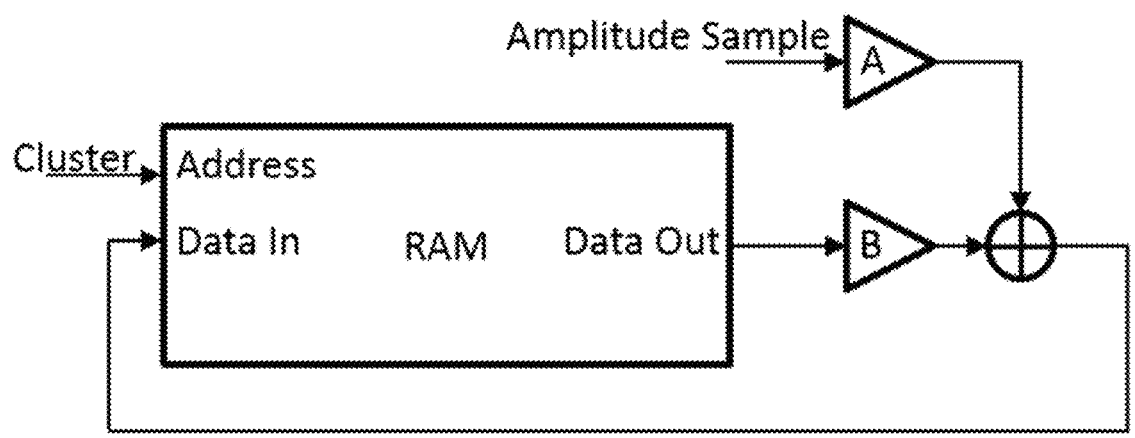

Interference suppression circuit 520 illustrated in FIG. 5A can include a random access memory (RAM) (not specifically illustrated) configured so as to store, and optionally to update over time, cluster definitions obtained by cluster definition circuit 521. For example, in embodiments in which cluster definition circuit 521 includes an IIR type filter, cluster definition circuit 521 can be configured to generate an output of the filter using steps that include storing the cluster average into a RAM at an address corresponding to the cluster. Optionally, cluster definition circuit 521 also can be configured to update the respective cluster average every sample by reading a value of the average from the RAM. In some embodiments, cluster definition circuit 521 further can be configured to multiply the read value of the average by a coefficient, to add the multiplied coefficient to a multiplied version of the amplitude of that sample to produce the filter output, and to re-write the new cluster average back into RAM at the address corresponding to the cluster. In one non-limiting embodiment, a single IIR filter is being implemented by the RAM, multipliers, and adder. Each cluster average is stored in memory and the need for dedicated multipliers and adders for each cluster IIR filter is obviated, e.g., the multipliers can be time-shared amongst the clusters to reduce hardware complexity. An exemplary schematic of this implementation is shown in FIG. 5Q, where the output of a RAM is multiplied by a coefficient B and added to a multiplied version of an input amplitude sample. The output of this addition is stored back in RAM at the address designated for that particular cluster. Thus the RAM stores the cluster averages for all the clusters, and several IIR filters are implemented while only using up 2 multipliers and a single adder unit. As another example, in embodiments in which cluster definition circuit 521 includes an FIR moving average filter, the FIR moving average filter can be configured to implement a recursive running sum.

It should be understood that such circuitry for defining and updating cluster definitions is merely exemplary, and that cluster definition circuit 521 can be configured so as to define or update a cluster in any suitable manner. For example, in some embodiments, cluster definition circuit 521 can be configured to define the clusters at a first time based on a histogram of the amplitudes of the samples of the received signal at the first time, in a manner such as described further below. Optionally, cluster definition circuit 521 can be configured to re-define the clusters at a second time based on a histogram of the amplitudes of the samples of the received signal at the second time. As another example, in some embodiments, cluster definition circuit can be configured to create or destroy at least one cluster or merging at least two clusters according to a set of rules. Illustratively, cluster definition circuit 521 can be configured to measure respective intra-cluster distances between pairs of clusters based on the cluster amplitudes of those clusters. The set of rules, which can be stored in RAM or can be implemented in hardware, can be defined such that based upon any two clusters having an intra-cluster distance that is less than a threshold, those two clusters are to be merged. In some embodiments, cluster definition circuit 521 can be configured to merge two clusters by, for example, averaging the cluster amplitudes of those two clusters, deleting one of the two clusters, and assigning the average of the cluster amplitudes of those two clusters to the other of the two bins. Optionally, cluster definition circuit 521 also can be configured to measure a minimum distance between the amplitude of at least one of the samples and at least a subset of the cluster amplitudes. The set of rules can define that based upon the smallest minimum distance between that amplitude and any of the cluster amplitudes of the subset exceeding a threshold, a new cluster having a cluster amplitude equal to the amplitude for that sample is to be added. In still other embodiments, cluster definition circuit 521 can be configured to define the plurality of clusters based on partitioning an available digital amplitude space into a plurality of bins. The bins can be spaced approximately evenly across the available amplitude space, or can be spaced unevenly across the available amplitude space. Cluster definition circuit 521 optionally can be configured to update the number of bins and locations of bins based upon one or more properties of the received signal.

Additionally, it should be understood that cluster assignment circuit 522 can be configured to assign an amplitude sample to one of the clusters defined by cluster definition circuit 521 using any suitable technique. As one nonlimiting example, cluster assignment circuit 522 can be configured to assign each sample of the first subset of the samples to one of the clusters based on a respective minimum distance between the amplitude of that sample and a plurality of the cluster amplitudes, and to assign the sample to the cluster for which the minimum distance is the smallest. Other techniques suitably can be used.

FIG. 5B illustrates steps in an exemplary method for reducing an interference signal that spectrally overlaps a desired signal based on clustering the amplitudes of the signals, according to some embodiments of the present invention. Method 500 illustrated in FIG. 5B can include obtaining amplitudes (and optionally) phases of the samples of the received signal (501). For example, interference suppression circuit 520 illustrated in FIG. 5A or interference reduction circuit 100 illustrated in FIGS. 1A-1B suitably can include an amplitude circuit (envelope estimator) configured so as to obtain an amplitude (and optionally a phase) of each sample of the received signal. Method 500 illustrated in FIG. 5B also can include defining a plurality of clusters, each cluster of the plurality having a corresponding cluster amplitude (502). For example, interference suppression circuit 520 illustrated in FIG. 5A can include cluster definition circuit 521 configured so as to define a plurality of clusters, each cluster having a corresponding amplitude. Method 500 illustrated in FIG. 5B further can include assigning each sample of a first subset of the samples to one of the clusters based on the amplitude of that sample and based on one or more of the cluster amplitudes (503). For example, interference suppression circuit 520 illustrated in FIG. 5A can be configured so as to assign each sample of a first subset of the samples to one of the clusters based on the amplitude of that sample and based on one or more of the cluster amplitudes. Method 500 illustrated in FIG. 5B further can include suppressing contribution of interference to each sample of the first subset of the samples based on the amplitude of that sample and based on the cluster amplitude of the cluster to which that sample is assigned so as to obtain a processed amplitude of that sample with reduced interference (504). For example, interference suppression circuit 520 illustrated in FIG. 5A can include interference suppressor 523 configured to suppress contribution of interference to each sample of the first subset of the samples based on the amplitude of that sample and based on the cluster amplitude of the cluster to which that sample is assigned so as to obtain a processed amplitude of that sample with reduced interference. Method 500 illustrated in FIG. 5B also can include generating an output signal with reduced interference based on the phases and the processed amplitudes of the samples of the first subset of the samples (505). Any suitable combination of hardware and software in interference suppression circuit 520 illustrated in FIG. 5A and interference reduction circuit 100 illustrated in FIGS. 1A-1B can be used so as to generate an output signal with reduced interference based on the phases and the processed amplitudes of the samples of the first subset of the samples.

It should be understood that any suitable combination of hardware and software can be used so as to implement interference suppression circuit 520 illustrated in FIG. 5A or method 500 illustrated in FIG. 5B. As one example, any suitable circuits of interference suppression circuit 520 can be implemented using a suitably programmed microprocessor (which can be coupled to RAM storing instructions for implementing some or all steps of method 500), or an FPGA or graphics processing unit configured so as to implement some or all steps of method 500. Additionally, it should be understood that interference suppression circuit 520 illustrated in FIG. 5A or method 500 illustrated in FIG. 5B can suppress interference in any suitable type of received signal, including received signals that include one or more interference signals that include nearly constant envelopes, are based on quadrature amplitude shift keying (QAM), are based on amplitude shift keying (ASK), are based on BPSK, or any other multi-level interference signal or combination of single-level or multi-level interference signals.

FIG. 5D schematically illustrates selected components of an exemplary interference suppression circuit for use in reducing an interference signal that spectrally overlaps a desired signal based on based on clustering the amplitudes of the signals, according to some embodiments of the present invention. In FIG. 5D, a suitable circuit or software module obtains the phase $\theta_k$ and amplitude $A_k$ of k samples based on the in-phase and quadrature components of the received signal. The amplitudes $A_k$ of the samples of the received are provided to a suitable circuit or software module configured as a multi-level amplitude cluster estimator that is configured to estimate some number of amplitude levels over a period of time, e.g., using N digital filters, so as to define a plurality of amplitude clusters $A_k^1$, $A_k^2$, $A_k^3$, ..., $A_k^N$. A suitable circuit or software module compares the amplitude of each incoming sample to one or more of the amplitude clusters, and assigns that amplitude to one of the clusters $A'_k$, e.g., assigns that amplitude to the cluster with the amplitude that is closest to the sample's amplitude. A suitable decision circuit or software module applies a criterion such as whether or not the interference to noise level for that sample is above a predefined level (e.g., resulting in the "True" condition illustrated in FIG. 5D), or whether interference need not be suppressed in the sample (e.g., resulting in the "False" condition illustrated in FIG. 5D). For samples for which the decision circuit or software module determined a "True" condition, a suitable circuit or software module then subtracts the sample's amplitude from the amplitude of the cluster to which it was assigned. In an alternative implementation (not specifically illustrated in FIG. 5D), the decision circuit or software module also can choose to set the amplitude of a sample to zero or to a predefined value (which can be referred to "blanking" the sample) based upon that sample's amplitude being too far away from any of the amplitude clusters. The processed amplitude $A'_k$ resulting from the subtraction and the phase $\theta$ then are provided to a suitable circuit or software module that is configured to construct a signal in the I/Q domain that has reduced contribution from the interference signal.

In an actual hardware or software implementation, the circuit illustrated in FIG. 5D optionally can be modified so as to include delay lines on one or both of the phase samples and the amplitude samples. The phase samples can be delayed before being converted back to the I/Q domain, so as to match the overall circuit processing time. Also, because the multi-level amplitude cluster estimator can take a fixed amount of time to determine the estimation (cluster) value, this delay can be accounted for in both the decision circuit and the subtraction. Amplitude samples can be inserted into a delay line prior to the summation illustrated in FIG. 5D so that the delay matches that of the estimator processing time. Additionally, the amplitude samples inserted into the "False" branch of the decision circuit also can have some delay that matches the time necessary to compute a decision.

Additionally, note that interference suppression circuit 520 illustrated in FIG. 5B or the circuit illustrated in FIG. 5D suitably can be configured so as to implement any suitable combination of steps for suppressing interference in a received signal. In one example, such a combination of steps includes some or all of the following:

1. Sample a received analog signal with an analog converter. Convert signal samples into amplitude samples and retain phase values for each signal sample.

2. Identify cluster(s) of amplitude samples with a similar amplitude and determine an initial value for each cluster.

3. Compute current output of N amplitude level estimators, or amplitude clusters using a time domain filter (e.g., FIR, IIR).

4. Optionally adapt the number of amplitude clusters N, based on their inter-cluster distance (or other suitable metric).

5. Subtract the amplitude level of the cluster that is closest to the current amplitude sample from the current amplitude sample whenever directed to by a decision circuit or application of a rule.

6. Convert the residual after subtraction to an I/Q signal value using the phase corresponding to the amplitude sample before subtraction.

7. I/Q samples can be processed normally by a digital receiver or optionally converted to the analog domain for an appliqué implementation.

8. Optionally re-initialize the amplitude clusters.

9. Repeat steps 3-8.

Additionally, note that interference suppression circuit 520 illustrated in FIG. 5B or the circuit illustrated in FIG. 5D suitably can be configured so as apply any suitable time-domain or frequency-domain processing in one or more amplitude or non-linear amplitude domains so as to separate non-constant interference from a desired signal in a receiver. The in-phase and quadrature components of the received signal can be transformed to an amplitude domain A, or to a domain based on a nonlinear function of the amplitude $A^m$ where $m \neq 1$, in a manner analogous to that described above with reference to FIGS. 4A-4L.

Consider the case of amplitude-domain processing first. Let $S(t)=Re(Ae^{j\theta}e^{j\omega t})=I\cos(\omega t)-Q\sin(\omega t)$. I is the in-phase component of the signal and Q is the quadrature component of the signal. The amplitude can be computed from these components as can be expressed by:

$$A(t)=\sqrt{I^2+Q^2}=\sqrt{(I+jQ)\times(I+jQ)^*} \quad (15)$$

Let the weak signal of interest be denoted by $S_w(t)=jQ_w$. Additionally, let the strong interference source be denoted by $S_I(t)=I_I+jQ_I$. Additionally, let the noise in the receiver system be denoted by $n(t)=n_I+jn_q$.

The received signal can be expressed as the sum $S(t)=S_w(t)+S_I(t)+n(t)$. Therefore, the composite amplitude $A(t)$ of $S(t)$ can be written as:

$$A(t)=\sqrt{(I_I+I_w+n_I)^2+(Q_I+Q_w+n_Q)^2} \quad (16)$$

Notice that Equation 16 can be rewritten in terms of component amplitudes as:

$$A(t) = \sqrt{A_I^2 + A_w^2 + A_n^2 + 2(I_w I_I + I_I n_I + I_w n_I) + 2(I_w I_I + I_I n_I + I_w n_I)}. \quad (17)$$

Here, $A_I$ corresponds to the amplitude of the interference signal, which can be strong relative to the amplitude $A_w$ of the desired signal, and $A_n$ corresponds to the noise amplitude. In the case where the amplitude of the interference signal is significantly greater than the amplitudes of the noise or the desired signal, an approximation for $A(t)$ can be expressed as:

$$A(t)\approx\sqrt{A_I^2}=|A_I| \quad (18)$$

For the case of N constant envelope Binary Phase Shift Keying (BPSK) interference signals, each having a constant envelope $A_i$ where $i=1,\ldots,N$, the composite envelope (amplitude) can be expressed as:

$$A_I = \sqrt{(\sum_{i=1}^{N} A_i C_i(t)e^{j\phi_i(t)})(\sum_{i=1}^{N} A_i C_i(t)e^{-j\phi_i(t)})} \quad (19)$$

where $Re^2(C_i(t))+Im^2(C_i(t))=1$ for the general case of constant envelope phase shift keying. While the present circuits and methods suitably can be used for interference signals that use BPSK modulated symbols, the present circuits and methods also can be used in circumstances in which the received signal has a finite number of amplitude levels over the averaging period of the filters (1-N).

Without loss of generality, consider the case for two BPSK interference signals. In that case, $C_i(t)=\pm 1$, for $i=1,2$ and $$A_I = \sqrt{A_1^2 + A_2^2 + 2A_1 A_2 C_1(t)C_2(t)\cos(\varphi_1(t) - \varphi_2(t))} \quad (20)$$

In this case, the amplitude is no longer constant and can assume two discrete values as long as $\varphi_1(t)-\varphi_2(t)$ is approximately equal to $\varphi_0$, where $\varphi_0$ is approximately constant over the time in which interference suppression processing is taking place. For example, $\varphi_0$ in a receiver can be a function of the Doppler offset between the receiver's carrier frequency and the incoming frequency plus some constant phase term, which can be denoted by $\Delta_{\omega i}$. Let $\theta_i$ be an arbitrary phase offset. The difference $\varphi_1(t)-\varphi_2(t)$ can be expressed as:

$$\Delta\varphi=\varphi_1(t)-\varphi_2(t)\Delta\omega_1-\Delta\omega_2 t+\theta_1-\theta_2 \quad (21)$$

Take for example the case of two 1.023 Mchip/sec BPSK interference signals having Doppler frequency offsets of $\Delta\omega_1$ and $\Delta\omega_2$. Define $\theta_1-\theta_2=\Delta\theta_0$. Then, $$\cos(\varphi_1(t)-\varphi_2(t)=\cos((\Delta\omega_1-\Delta\omega_2)t+\Delta\theta_0) \quad (22)$$

should be approximately constant over the period in which the average amplitude is determined. Without loss of generality, let $\Delta\theta_0=0$.

Letting $$\Delta f = \frac{(\Delta\omega_1 - \Delta\omega_2)}{2\pi},$$

equation 20 then can be rewritten as:

$$A_I=\sqrt{A_1^2+A_2^2+2A_1 A_2 C_1(t)C_2(t)\cos(\Delta ft)} \quad (23)$$

As noted above, $C_i(t)=\pm 1$. As a result, it can be understood that there are two distinct amplitude levels for two interference signals, so long as $\cos(\Delta ft)$ is approximately constant over the averaging period (e.g., sliding window of samples used to determine the average (mean) value of the interference).

Similarly, for three interference signals, the composite amplitude $A_I$ of the interference signal can be expressed as:

$$A_I = \sqrt{\begin{array}{l} A_1^2 + A_2^2 + A_3^2 + 2A_1 A_2 C_1(t)C_2(t)\cos(\Delta f_{12}t) + \\ 2A_2 A_3 C_2(t)C_3(t)\cos(\Delta f_{23}t) + 2A_1 A_3 C_1(t)C_3(t)\cos(\Delta f_{13}t) \end{array}} \quad (24)$$

Table 1 lists the code states used to determine possible amplitude values for three signals. Equation 24 above shows that there are three terms which depend on the sign of the terms $C_1(t)$, $C_2(t)$, and $C_3(t)$, and which will contribute to the composite amplitude. Denoting the composite amplitude levels as $L_0 \ldots L_3$, it can be seen from Table 1 that there are 4 distinct composite amplitude levels as a result of combining the three sign-dependent terms.

TABLE 1

| $C_1(t)$ | $C_2(t)$ | $C_3(t)$ | $C_1(t)C_2(t)$, $C_2(t)C_3(t)$, $C_3(t)C_1(t)$ | Amplitude Level |
|---|---|---|---|---|
| 1 | 1 | 1 | 1, 1, 1 | $L_0$ |
| 1 | 1 | −1 | 1, −1, −1 | $L_1$ |
| 1 | −1 | 1 | −1, −1, 1 | $L_2$ |
| 1 | −1 | −1 | −1, 1, −1 | $L_3$ |
| −1 | 1 | 1 | −1, 1, −1 | $L_3$ |
| −1 | 1 | −1 | −1, −1, 1 | $L_2$ |
| −1 | −1 | 1 | 1, −1, −1 | $L_1$ |
| −1 | −1 | −1 | 1, 1, 1 | $L_0$ |

Notice that there are four unique possibilities for three interference signals, corresponding to a maximum of four unique amplitude values. Similarly, with four interferers, such as shown in FIG. 5C, there are a maximum of eight possible amplitude levels. In general, M interference signals can generate up to $N=2^{M-1}$ possible amplitudes. As one nonlimiting example, to apply the present circuits and methods to a received signal that includes six interference signals, 32 amplitude filters (mean estimation circuits) can be used.

Some embodiments of the present circuits and methods can include use of N simultaneous amplitude estimation circuits. For example, cluster definition circuit 521 illustrated in FIG. 5A or the circuit illustrated in FIG. 5D can include N amplitude estimation circuits, such as FIR or IIR filters, configured to define respective amplitude clusters based on the values of the last $F_s*T_i$ amplitude samples, where $F_s$ corresponds to the sample rate of the filter and $T_i$ corresponds to the window length (in time) over which the filter is determining the amplitude value. As one example, the following FIR filter can be used for each amplitude estimation circuit:

$$y_k = \frac{1}{F_s T_i} \sum_{n=1}^{F_s T_i} x_{k-n} \quad (25)$$

Note, however, that other FIR filters suitably can be used. As another example, an IIR filter can be used, such as:

$$y_{k+1} = \delta x_k + (1-\delta) y_k \quad (26)$$

where $\delta$ corresponds to a parameter selected based on the desirable response time of the filter, e.g., in the case of an IIR filter, the approximate time over which the estimate is being performed.

In some embodiments, the present circuits and methods suitably can be implemented as an appliqué, signal processing circuit, or algorithm in a radio frequency receiver. For example, FIGS. 5E-5F schematically illustrate exemplary appliqué implementations for reducing an interference signal that spectrally overlaps a desired signal based on clustering the amplitudes of the signals, according to some embodiments of the present invention. In the implementations illustrated in FIG. 5E-5F, the processor reduces the interference power to signal ratio (I/S).

In the appliqué implementation illustrated in FIG. 5E, the received radio frequency (RF) signal, $S_w(t)$, is corrupted by interference $S_I(t)$. The composite signal is received at an antenna, amplified by a low noise amplifier (LNA), and then translated to an intermediate frequency (IF) using a downconverter where it is sampled by an analog-to-digital converter (ADC) and digitally converted to an in-phase (I) and quadrature (Q) baseband signal inside of the processor. The in-phase and quadrature signals are processed by the processor to suppress the interference signal, e.g., in accordance with method 500 described above with reference to FIG. 5B. After passing through the processor, the processed in-phase and quadrature baseband signals are converted back to an IF carrier where they are converted to analog signals before using a digital-to-analog converter (DAC) and translating the signals back to RF using an upconverter before they enter an RF receiver. FIG. 5F illustrates an alternative implementation in which the signals are converted to and from I/Q (baseband) in the RF domain. In this implementation, the I and Q signals are digitized using two ADCs (one for I and one for Q), then processed directly by the processor (e.g., in accordance with method 500 described above with reference to FIG. 5B) without further translation. After passing through the processor, the processed I and Q signals are converted to the analog domain using two DACs. In the implementations illustrated in FIGS. 5E-5F, the processor reduces the interference into the receiver, e.g., transforms a high I/S ratio to a low I/S ratio. In some embodiments, a processing device in the receiver can be used so as to avoid the need for a separate DAC and upconversion circuit following the processor. In such a case, the receiver's ADC, LNA, and downconverter can be used. The processor illustrated in FIGS. 5E-5F can include the receiver's existing processor, or an additional processing device connected to a pre-existing receiver processor. In such embodiments, a DAC may not necessarily be needed.

The signal receiver can include a global navigation satellite system receiver (GNSS) such as GPS, Glonass, Compass, or Galileo, or a cellular wireless communications receiver, WiFi, Bluetooth, or other radio frequency receiver. For example, the present circuits and methods can be applied to radar receivers or satellite communication system receivers.

In some embodiments, the present circuits and methods suitably can be implemented using a digital processor. Devices in the receiver capable of performing some or all actions of the processor illustrated in FIGS. 5E-5F or the circuits illustrated in FIGS. 5A and 5D can include a field programmable gate array (FPGA), application specific integrated circuit (ASIC), central processor unit (CPU), graphics processor unit (GPU), or other similar digital processing device. Alternatively, the present circuits and methods suitably can be implemented using an analog processor.

FIG. 5G schematically illustrates selected components of another exemplary interference suppression circuit for use in reducing an interference signal that spectrally overlaps a desired signal based on based on clustering the amplitudes of the signals, according to some embodiments of the present invention. In the embodiment illustrated in FIG. 5G, the multi-level amplitude estimation circuit (estimator) includes a bank of amplitude estimation filters, and the decision circuit computes the minimum distance to each cluster so as to decide whether or not interference suppression should take place for a current sample. It also compares the value of the current sample's amplitude with a threshold so as to determine whether the interference to noise level is sufficiently high that suppression is desirable. Note that the embodiment illustrated in FIG. 5G (as well as other embodiments provided herein) also can suppress multiple non-constant envelope interference signals having a finite number of amplitude levels over the averaging period, as well as multi-leveled QAM, ASK, or other multi-leveled interference signals.

Note that the present circuits and methods further can be used to suppress interference signals having impulsive interference, such as non-ideal pulses (sudden spikes or dips) or pulsed interference or interference that changes faster than the averaging period. For example, based upon a given interference amplitude sample being less than a second threshold TH2, the sample amplitude may not be suppressed and the amplitude value may not be assigned to a cluster (e.g., may not enter one of the N-averaging filters). This can inhibit pulsed interference from degrading the average for a given cluster and from causing the interference suppression to fail or lose effectiveness. The threshold TH2 can be set as a function of the interference to noise ratio or quantity or in a manner analogous to that described in greater detail above. As is shown FIG. 5G, if the given interference amplitude sample is less than TH2, it can be sent directly to the output of the suppression algorithm unprocessed. In the embodiment shown in FIG. 5G, subtracting zero from the input amplitude sample passes that sample to the output as the amplitude residual. The first threshold illustrated in FIG. 5G, TH1, can inhibit rapid amplitude changes (much faster than the filter averaging period) from causing errors in the cluster estimate for the mean value of the constant level. Then based upon the minimum distance exceeding the first threshold, TH1, the amplitude residual value associated with that minimum distance can be set to zero or other suitable constant, and the interference suppression operation (e.g., subtraction of $A_{sm}$ in FIG. 5G) is not performed. In some embodiments, halting the interference suppression operation can be achieved by subtracting the input amplitude from itself, for the corresponding amplitude sample in which the minimum distance $d_{min}$ exceeds the second threshold., such that the output amplitude residual will be zero for that corresponding amplitude sample. In some embodiments, in addition to halting the interference suppression operation, none of the filters are updated when TH1 is exceeded.

Accordingly, in some embodiments, whenever TH1 is exceeded by the minimum distance or the incoming amplitude sample is less than TH2, the filters are not updated. As a result of such thresholding and the fact that only one of the N filters is updated each sample, the filter's effective sampling rate can be lower than the sampling rate of the incoming amplitude samples. In other words, in some embodiments, the filters can be discontinuously sampled.

Note that for clarity of representation, FIG. 5G does not show delay lines that can be provided in a hardware or software implementation so as to properly time-align the amplitude samples, amplitude estimates (cluster definitions), and phase samples. In some embodiments, the decision making block and the filters can incur some fixed amount of time when implemented, and the phase samples can be delayed to match. Additionally, the amplitude samples subtracted from the amplitude estimates also can be pipelined before reaching the summation block so as to allow time for the proper estimate to appear at the summation.

Additionally, note that the designations "first" and "second" thresholds herein—with regards to these and other embodiments—do not require or imply a particular order of operation.

FIG. 5H schematically illustrates selected components of another exemplary interference suppression circuit for use in reducing an interference signal that spectrally overlaps a desired signal based on based on clustering the amplitudes of the signals, according to some embodiments of the present invention. The implementation illustrated in FIG. 5H excludes the use of thresholding. Again, for clarity of representation, delay lines for time-alignment are not illustrated. Note that the filters illustrated in FIGS. 5G-5H can be configured so as to include an adaptable integration window (time period over which averaging takes place) so as to be adaptable to multiple interference sources that may, in some cases, be constant only over short periods of time.

FIG. 5I illustrates steps in an exemplary method for initializing amplitude cluster values, according to some embodiments of the present invention. Method 510 illustrated in FIG. 5I includes computing a histogram of an input sample record of length L (511); taking a derivative of histogram values (512); determining zero crossings (513), and determining cluster initial values from the detected zero crossing(s) (514). Method 510 illustrated in FIG. 5I can determine the initial cluster values (possible amplitude values) for a given sample set. One possible implementation of method 510 includes computing the histogram of the prior L samples, for example, L=512 or other suitable value.

Note that L can be adapted based on the measured signal to noise ratio based on an LMS algorithm or other suitable technique. Alternatively, L can be a fixed quantity. For example, for a relatively rapidly varying interference signal, L can be smaller than for a more slowly varying interference signal. Additionally, for lower values of interference to signal ratio (I/S), L can be selected to be longer. Alternatively, multiple histogram values (e.g., three) can be computed and average. In an exemplary embodiment, the histogram values can be averaged by a sliding window average using a digital filter. In one example, an example implementation uses the following FIR filter:

$$y_k = 0.2x_{k-1} + 0.2x_{k-2} + 0.2x_{k-3} + 0.2x_{k-4} + 0.2x_k - 5 \qquad (27)$$

In the embodiment illustrated in FIG. 5I, after the histogram is determined (step 511), the derivative of the histogram is computed (step 512). After the derivative is computed, the zero-crossings enumerate the number and value of each initial amplitude cluster (steps 513 and 514). FIG. 5J illustrates an example of output of cluster initialization method 510 illustrated in FIG. 5I, according to some embodiments of the present invention. Note that the green curve in FIG. 5J represents the averaged histogram, the blue curve is the histogram before averaging, the red curve is the estimated derivative of the histogram, and the cyan curve indicated detected histogram peaks that will be loaded into the cluster initializer.

Note that in environments where the nature of the interference signal can be rapidly changing, it can be useful to periodically initialize the clusters (e.g., in accordance with method 510 illustrated in FIG. 5I) so as to account for potential changes in amplitude distribution.

In some embodiments, a non-adaptive k-means technique or an adaptive k-means technique can be used to define clusters, e.g., by cluster definition circuit 521 illustrated in FIG. 5A or during step 502 of method 500 illustrated in FIG. 5B, or to decide to which cluster a given amplitude sample is to be assigned, e.g., by cluster assignment circuit 522 illustrated in FIG. 5A or during step 503 of method 500 illustrated in FIG. 5B. In a non-adaptive k-means implementation, there may in some circumstances be only a fixed number of clusters to which an amplitude sample can be assigned. As such, if a new amplitude sample is far from the existing clusters' amplitudes, then in a non-adaptive k-means technique, the incoming amplitude sample can be thresholded (e.g., ignored) or assigned to the nearest cluster. Additionally, in some real world environments in which each interference signal has a nonzero Doppler frequency, the multiple amplitude levels seen in a multiple-interferer scenario can change over time, which means that eventually k-means clusters that track such amplitudes can become relatively close to one another, e.g., close enough potentially to warrant defining a cluster in which two or more previous clusters are merged with one another. Or, as multiple amplitude levels move apart from one another, it potentially can be useful to define clusters that track a diverging amplitude level.

One exemplary method of allowing a k-means technique to support multiple clusters is to continuously send estimates (which in some embodiments can be obtained via histogram, such as described above with reference to FIGS. 5I-5J) to the cluster definition circuitry, e.g., to the cluster filters. Such estimates can include both an estimate of the number of clusters and the approximate cluster amplitude location.

An alternative implementation can be to allow the number of clusters to be adaptive based on measurements of the "inter-cluster distances." Clusters can be added, destroyed, or merged based on the incoming signal amplitude, the available number of clusters, and the distance between clusters. For example, in some embodiments, a circuit can be configured so as to accommodate up to a maximum number of clusters. An "inter-cluster distance" can be defined to be the distance between any pair of clusters. If any two cluster's distance from one another (any inter-cluster distance) is below a threshold, e.g., if the two clusters are sufficiently close to one another, it can be useful to merge those two clusters into a single cluster. For example, such merging can help in averaging small errors, as well as freeing up resources so that the circuit can define and assign amplitude samples up to the maximum number of clusters using relatively large inter-cluster distances.

FIG. 5K illustrates an exemplary method of merging amplitude clusters, according to some embodiments of the present invention. Method 530 illustrated in FIG. 5K suitably can be used, e.g., by cluster definition circuit 521 illustrated in FIG. 5A or during implementation of step 502 of method 500 illustrated in FIG. 5B, so as to update the cluster definitions before, during, or after assigning amplitude samples to such clusters. For example, in some embodiments, a circuit can be configured so as to define up to a maximum number of clusters, but the circuit may use less than that maximum number. The circuit may have initialized a certain number of amplitude clusters (e.g., filters) using a histogram in a manner such as described above with reference to FIGS. 5I-5J, or any other suitable manner. Method 530 illustrated in FIG. 5K can include measuring the inter-cluster distances between all active clusters (531), e.g., at a defined time interval. Method 530 includes determining whether any two clusters are measured to have an inter-cluster distance that is less than a threshold T3 (532), e.g., by comparing each of the measured inter-cluster distances to threshold T3. Method 530 also includes, based upon any two clusters being measured to have an inter-cluster distance that is less than a threshold T3, merging the two clusters by averaging their values (amplitudes) and deleting one of the two clusters (533). The new amplitude value of the merged clusters can be written into the non-deleted cluster. Method 520 also includes updating the number of active clusters in use (534), e.g., updating the circuit's count of the number of active clusters.

Additionally, or alternatively, in some embodiments, new clusters can be added based upon the incoming amplitude sample's distance to all existing clusters being above a certain threshold. For example, FIG. 5L illustrates an exemplary method of adding new amplitude clusters, according to some embodiments of the present invention. Method 540 illustrated in FIG. 5L suitably can be used, e.g., by cluster definition circuit 521 illustrated in FIG. 5A or during implementation of step 502 of method 500 illustrated in FIG. 5B, so as to update the cluster definitions before, during, or after assigning amplitude samples to such clusters. For example, in some embodiments, a circuit can be configured so as to define up to a maximum number of clusters, but the circuit may use less than that maximum number. The circuit may have initialized a certain number of amplitude clusters (e.g., filters) using a histogram in a manner such as described above with reference to FIGS. 5I-5J, or any other suitable manner. Method 540 illustrated in FIG. 5L can include measuring the distance of the incoming amplitude sample to each cluster (541). Method 540 includes determining whether the smallest of those measured distances exceeds a threshold T4 (542), e.g., by comparing each of the measured distances to threshold T4. Method 540 also includes, based upon the minimum distance (smallest of the measured distances) exceeding the threshold T4, further determining whether the number of active clusters are less than the maximum number of clusters (543). Method 540 also includes, based upon the minimum distance not exceeding threshold T4 or based upon the number of clusters not being less than the maximum, assigning (inputting) the amplitude sample to the cluster associated with the smallest minimum distance (546). Method 540 also includes, based upon the number of active clusters being less than the maximum number of clusters, adding a new cluster with an initial value (amplitude) set to any suitable value, e.g., set to the amplitude of the incoming sample (544). Method 540 also includes updating the number of active clusters in use (545), e.g., updating the circuit's count of the number of active clusters.

Note that in embodiments such as described herein with reference to FIGS. 5K-5L, the thresholds T3 (for merging clusters) and T4 (for adding clusters) optionally can be determined adaptively, e.g., by continuously monitoring the maximum amplitude of the received signal. For example, the circuit can measure the maximum amplitude seen over the past N samples of the received signal, and can divide that maximum by a set threshold T3$d$ or T4$d$, which respectively can produce the threshold T3 or T4.

Accordingly, in some embodiments of an "adaptive k-means" approach, the number of clusters can vary over time, e.g., based upon input rules of inter-cluster distance, maximum allowed distance of each incoming amplitude sample to existing clusters, and the maximum number of available clusters. Such rules are intended to be merely exemplary of an adaptive implementation, and are not intended to be limiting. For example, alternative methods and circuits can be used so as to provide a decision mechanism for assigning an incoming amplitude sample $A_k$ to an amplitude cluster. For example, a k-means based circuit or method can make such a decision based upon the minimum distance between clusters and an amplitude sample, or other similar criterion. Other decisions suitably can be implemented, optionally without initializing clusters.

In one such alternative implementation, the circuits and methods can use binned clusters in which a fixed number of clusters initially are defined having amplitudes that span the available amplitude space relatively evenly. Alternatively, clusters can be excluded from the lower values of the amplitude space, e.g., at I/S levels below which the processing gain of the received signal can be adequate to mitigate interference). In some embodiments, each cluster averages amplitude samples received in a "bin" of amplitude samples, and the cluster definition circuitry (e.g., cluster filter) output may not necessarily move beyond its fixed bin. The incoming signal sample (which can include amplitude, amplitude squared, or some other value of a given domain) can be rounded to the minimum bin size so as to determine to which cluster the incoming sample is to be assigned (injected). The unrounded (full precision) sample then is sent to that cluster, and the average can be updated.

Note that in some embodiments of such binned implementations, there can be a fixed number of clusters that suitably span the available amplitude space, e.g., are spaced linearly or nonlinearly relative to one another. In some embodiments, only signal samples that are within the bin limits of a cluster contribute to the output, e.g., filtered output, of that cluster. For illustration, assume that the binned cluster approach is used, with linearly spaced bins. Assume that $A_{max}$ is the maximum amplitude expected in the incoming signal. The minimum amplitude partition size can be denoted as "minsize." The entire available amplitude space can be quantized into N clusters, where the starting values of the clusters can be expressed as:

$$\text{Initial\_values} = 0, 1*\text{minsize}, 2*\text{minsize}, 3*\text{minsize}, \ldots A_{max} \tag{28}$$

In one example, a decision of where to assign an incoming amplitude sample to one of the N available clusters can be based upon a rounding process in which the incoming amplitude sample $A_{in}$ is quantized to these partitions to obtain a pointer to a cluster filter, as can be expressed by:

$$\text{Pointer} = \text{round}(A_{in}*\text{minsize}) \tag{29}$$

This pointer can take a value $0, 1, 2, \ldots, N$, e.g., can point to one of the N available clusters, e.g., cluster filters. The input amplitude sample $A_{in}$ (full precision) can be assigned to that cluster, e.g., cluster filter, and the output of the can be updated. In such a manner, each cluster, e.g., cluster filter, can receive only values seen within a given amplitude partition space. Based upon an incoming amplitude sample crossing a partition boundary, that sample can be assigned to an appropriate one of the adjacent clusters, and that cluster's average can be updated. As such, each amplitude cluster can be considered to be constrained within a corresponding bin. The amplitude space can be sliced into bins, and an incoming amplitude sample can be considered to be assigned to a given cluster by an amplitude slicer. For example, FIG. 5M illustrates steps in an exemplary method for initializing and updating amplitude cluster values, according to some embodiments of the present invention. Method 550 illustrated in FIG. 5M includes partitioning the amplitude space, e.g., by defining N+1 clusters seeded with initial values of 0, minsize, . . . maxsize (551), e.g., as performed by cluster definition circuit 521 illustrated in FIG. 5A or step 502 of method 500 illustrated in FIG. 5B. Method 550 illustrated in FIG. 5M also includes finding the closest bin, e.g., determining P=round ($A_{in}$/minsize) (552), e.g., as performed by cluster assignment circuit 522 illustrated in FIG. 5A or step 503 of method 500 illustrated in FIG. 5B. Method 550 illustrated in FIG. 5M also includes injecting (assigning) the incoming amplitude sample $A_{in}$ into the cluster filter pointed to by P, and updating that cluster's filter (553), e.g., as performed by cluster assignment circuit 522 illustrated in FIG. 5A or step 503 of method 500 illustrated in FIG. 5B. Steps 552 and 553 can be repeated any suitable number of times for new incoming amplitude samples.

In some embodiments, circuits and methods based on binned clusters can assign an incoming sample to an available cluster based on rounding the amplitude sample and assigning it to the nearest cluster. In some embodiments, it can be useful to select an appropriate bin size. For example, a bin size that maximizes output C/No can be based on the J/S ratio of the interference signal. FIG. 5N illustrates the simulated C/No for different sizes of bins in a binned cluster implementation, according to some embodiments of the present invention. A simulation was run in which different bin sizes were used for varying J/S ratios for a binned clusters based method in which the received signal included four unfiltered BPSK matched spectral interference signals, each spaced 1 kHz apart in Doppler frequency. It can be understood from FIG. 5N that for a J/S of 60 dB, the optimum number of binned clusters is about 100, whereas at a J/S of 50 dB, it can be useful to reduce the number of binned clusters to about 50.

It should be appreciated by one of skill in the art that alternative embodiments of multi-level interference mitigation based on clustering in either k-means, adaptive k-means, binned clusters or any clustering approach described herein may be implemented clustering based on received power or amplitude to a nonlinear power. The techniques to identify and process signals based on amplitude clusters would be replaced with techniques to identify and process signals based on power clusters or cluster of amplitude values to a nonlinear power.

Note that in some embodiments, the number of bins available for circuits and methods based on binned clusters optionally can be adapted in real time, e.g., by measuring the maximum amplitude of the input signal every M samples, where M corresponds to the number of samples used to determine $A_{max}$. In some embodiments, the maximum amplitude is measured and the bin size is adjusted every M samples. In some embodiments, such an adjustment can be made, for example, by dividing the maximum amplitude seen by a number obtained from a look-up table that has been pre-loaded in such a manner that the number of bins available for a given amplitude maximizes the C/No. The number of bins can be adaptively selected based on the measured interference to noise level (e.g., in an appliqué configuration), measured C/No, a combination of the measured C/No and the measured FS, or any other suitable metric or combination of metrics. Illustratively, an LMS or similar algorithm can be used for such adaptive implementations.

Accordingly, some embodiments of the present circuits and methods can provide a single-antenna technique that can suppress non-constant envelope (amplitude) interference signals having multiple levels and that spectrally overlap or are spectrally matched to a desired signal. In some embodiments, estimation of multiple amplitude levels in the amplitude domain (or non-linear amplitude domain(s)) can be used to mitigate an interference signal that has rapid amplitude variations. Illustratively, the present circuits and methods can be implemented as an appliqué and rapidly fielded with an existing system or built into receiver boards with an additional chip, or integrated into future ASICs. The approach can be applicable to GPS and other satellite navigation signals, radar receivers, satellite communications, commercial wireless, WiFi, and other signaling standards including Bluetooth and cellular signals.

FIG. 5O illustrates the simulation performance of 3 non-limiting, exemplary embodiments of the present invention. A simulation was run with 4 matched spectral BPSK interference signals, each separated in Doppler frequency, which were added to the desired signal (in this case, a simulated GPS C/A code signal) and noise. In the simulation the BPSK interference signals were at least 1 kHz apart from each other in Doppler frequency. Three nonlimiting, exemplary embodiments of the present circuits and methods were simulated, along with a simulation of an unprotected receiver. The resulting C/A code C/No after interference suppression is plotted in FIG. 5O for three nonlimiting, exemplary embodiments of the invention. The trace in FIG. 5O labelled "k-means" corresponds to an exemplary implementation where a fixed number of clusters are initially chosen and the average cluster amplitude values are updated every sample based on the average of the samples assigned to that cluster at that time. The trace in FIG. 5O labelled "adaptive k-means" corresponds to a simulation where the number of clusters are not fixed, but instead new clusters can be added over time, and additionally clusters can be merged, as previously described. The trace labelled "binned clusters" corresponds to a simulation where the "binned cluster" approach as previously described is used to reduce the interference. It can be seen from FIG. 5O that all three simulated embodiments show an advantage over the unprotected simulation above about J/S=40 dB.

Alternative Embodiments

It should be appreciated that the present circuits and methods suitably can be implemented so as to reduce the effects of interference in any practical application. As an example application, the present circuits and methods can provide an advantage as compared to cognitive radio. Suppose there are two co-channel signals. If one signal is much stronger than the other, then the strong signal is typically easy to detect and demodulate, but the weaker signal can be lost in the interference without appropriate remediation. For this reason, cognitive radios seek unoccupied parts of the spectrum. The present circuits and methods can work alone, or as a supplement to cognitive radio, by reducing interference at the receiver. This can allow more signals to share the spectrum and provide the opportunity to use whatever portion of the spectrum is needed whenever it is needed.

Other exemplary practical applications that can benefit from the present circuits and methods include, but are not limited to, the following:

Satellite communications, in which the present circuits and methods can facilitate suppression of a wide variety of common interference signals, and can protect SATCOM from local interference;

Mitigating intentional or unintentional interference to satellite navigation receivers including but not limited to GPS receivers, Glonass receivers, Galileo receivers, compass receivers and hybrid satellite navigation. For example, GPS privacy jammers have become a growing concern.

Commercial wireless communications including wireless CDMA and short-range communications such as Bluetooth receivers, that much operate in increasingly interference rich environments.

LPI (low probability of intercept) and LPD (low probability of detection) communications, in which the present circuits and methods can facilitate hiding weak desired signals under strong signals such that only authorized users readily can find the weak desired signals; or more generally Anti jam receivers, in which the present circuits and methods can facilitate resistance to a wide variety of potential jamming sources, whether such sources are intentional or unintentional, including consumer goods that can radiate unauthorized energy into critical military use bands.

While various illustrative embodiments of the invention are described above, it will be apparent to one skilled in the art that various changes and modifications can be made therein without departing from the invention. For example, interference reduction circuit 100 can be configured to work with, and to be coupled to, a pre-existing receiver 10 or interference suppression appliqué 10', but need not necessarily be considered to be an integral part of such a receiver or interference suppression appliqué, and indeed suitably can be used with any circuitry that would benefit from interference reduction. The appended claims are intended to cover all such changes and modifications that fall within the true spirit and scope of the invention.

What is claimed:

1. A method for processing complex in-phase and quadrature samples of a received signal including a desired signal and an interference signal that spectrally overlaps the desired signal, the method comprising:

applying an I/Q domain adaptive filter, narrow-band excision processing, and/or spatial nulling algorithm to partially remove the interference signal from the received signal to obtain I/Q domain processed signal samples ($I_k$) and ($Q_k$) with reduced interference;

using an amplitude circuit to obtain amplitudes ($A_k$) of the complex in-phase and quadrature samples using $A_k = \sqrt{I_k^2 + Q_k^2}$ and to obtain phases of the samples;

using an interference suppression circuit to reduce the interference signal in the amplitudes $A_k$ from the amplitude circuit so as to obtain processed amplitudes of the samples with reduced interference;

receiving, by a signal construction circuit, the phases of the samples from the amplitude circuit;

receiving, by the signal construction circuit, the processed amplitudes of the samples from the interference suppression circuit;

using the signal construction circuit to generate an output signal with reduced interference based on the phases and the processed amplitudes; and optimizing filter weights in the I/Q domain, amplitude domain, and/or spatial domain to further reduce the interference signal.

2. The method of claim 1, wherein the I/Q domain adaptive filter comprises an adaptive linear time domain filter.

3. The method of claim 1, further comprising adaptively adjusting one or more parameters of said interference suppression circuit as to optimize a signal quality metric.

4. The method of claim 3, wherein the signal metric comprises an interference to noise ratio (INR), an interference to signal ratio (ISR), a carrier power to noise spectral density ratio (C/No), or a signal to noise ratio (SNR).

5. The method of claim 1, wherein the interference suppression circuit:

obtains an average amplitude of the received signal based on at least one prior amplitude of the received signal;

subtracts the amplitude from the average amplitude to obtain an amplitude residual; and based upon an absolute value of the amplitude residual being less than or equal to a threshold, inputs the received signal into an interference suppression algorithm.

6. The method of claim 5, wherein the threshold is varied in response to a measured peak to average power ratio.

7. The method of claim 1, wherein the interference suppression circuit comprises a linear time domain filter.

8. The method of claim 7, wherein the linear time domain filter comprises a time domain notch filter.

9. The method of claim 8, wherein the linear time domain filter comprises a time domain high pass filter.

10. The method of claim 1, wherein the interference suppression circuit:

obtains a first non-unity power of the amplitude of the received signal; and inputs the first non-unity power of the amplitude into an interference suppression algorithm.

11. The method of claim 10, wherein the interference suppression algorithm comprises a time domain notch filter.

12. The method of claim 10, wherein the interference suppression algorithm comprises a time domain high pass filter.

13. The method of claim 10, wherein the interference suppression algorithm comprises a Fourier transform based frequency excision algorithm.

14. The method of claim 1, wherein the interference suppression circuit:

defines a plurality of clusters, each cluster having a corresponding cluster amplitude;

assigns each sample of a subset of the samples to one of the clusters based on the amplitude of that sample and based on one or more of the cluster amplitudes; and suppresses contribution of the interference signal to each sample of the subset based on the amplitude of that sample and based on the cluster amplitude of the cluster to which that sample is assigned.

15. A circuit for processing complex in-phase and quadrature samples of a received signal including a desired signal and an interference signal that spectrally overlaps the desired signal, the circuit comprising:

circuitry implementing an I/Q domain adaptive filter, narrow-band excision processing, and/or spatial nulling algorithm to partially remove the interference signal from the received signal to obtain I/Q domain processed signal samples ($I_k$) and ($Q_k$) with reduced interference;

an amplitude circuit configured to obtain amplitudes ($A_k$) of the complex in-phase and quadrature samples using $A_k=\sqrt{I_k^2+Q_k^2}$ and to obtain phases of the samples;

an interference suppression circuit configured to reduce the interference signal in the amplitudes $A_k$ from the amplitude circuit so as to obtain processed amplitudes of the samples with reduced interference;

a signal construction circuit configured to receive the phases of the samples from the amplitude circuit, receive the processed amplitudes of the samples from the interference suppression circuit, and to generate an output signal with reduced interference based on the phases and the processed amplitudes; and circuitry configured to optimize filter weights in the I/Q domain, amplitude domain, and/or spatial domain to further reduce the interference signal.

16. The circuit of claim 15, wherein the I/Q domain adaptive filter comprises an adaptive linear time domain filter.

17. The circuit of claim 15, further comprising circuitry configured to adaptively adjust one or more parameters of said interference suppression circuit as to optimize a signal quality metric.

18. The circuit of claim 17, wherein the signal metric comprises an interference to noise ratio (INR), an interference to signal ratio (ISR), a carrier power to noise spectral density ratio (C/No), or a signal to noise ratio (SNR).

19. The circuit of claim 15, wherein the interference suppression circuit is configured to:
obtain an average amplitude of the received signal based on at least one prior amplitude of the received signal;
subtract the amplitude from the average amplitude to obtain an amplitude residual; and
based upon an absolute value of the amplitude residual being less than or equal to a threshold, input the received signal into an interference suppression algorithm.

20. The circuit of claim 19, wherein the threshold is varied in response to a measured peak to average power ratio.

21. The circuit of claim 15, wherein the interference suppression circuit comprises a linear time domain filter.

22. The circuit of claim 21, wherein the linear time domain filter comprises a time domain notch filter.

23. The circuit of claim 21, wherein the linear time domain filter comprises a time domain high pass filter.

24. The circuit of claim 15, wherein the interference suppression circuit is configured to:
obtain a first non-unity power of the amplitude of the received signal; and
input the first non-unity power of the amplitude into an interference suppression algorithm.

25. The circuit of claim 24, wherein the interference suppression algorithm comprises a time domain notch filter.

26. The circuit of claim 24, wherein the interference suppression algorithm comprises a time domain high pass filter.

27. The circuit of claim 24, wherein the interference suppression algorithm comprises a Fourier transform based frequency excision algorithm.

28. The circuit of claim 15, wherein the interference suppression circuit is configured to:
define a plurality of clusters, each cluster having a corresponding cluster amplitude;
assign each sample of a subset of the samples to one of the clusters based on the amplitude of that sample and based on one or more of the cluster amplitudes; and
suppress contribution of the interference signal to each sample of the subset based on the amplitude of that sample and based on the cluster amplitude of the cluster to which that sample is assigned.

* * * * *